(12) United States Patent
Bunyk et al.

(10) Patent No.: US 12,536,459 B2
(45) Date of Patent: Jan. 27, 2026

(54) SYSTEMS AND METHODS FOR COUPLING BETWEEN QUBITS

(71) Applicant: D-WAVE SYSTEMS INC., Burnaby (CA)

(72) Inventors: Paul I. Bunyk, Pt. Roberts, WA (US); Reza Molavi, North Vancouver (CA); Kelly T.R. Boothby, Vancouver (CA); Mark H. Volkmann, Burnaby (CA)

(73) Assignee: D-WAVE SYSTEMS INC., Burnaby (CA)

( * ) Notice: Subject to any disclaimer, the term of this patent is extended or adjusted under 35 U.S.C. 154(b) by 615 days.

(21) Appl. No.: 18/003,563

(22) PCT Filed: Jun. 29, 2021

(86) PCT No.: PCT/US2021/039625
§ 371 (c)(1),
(2) Date: Dec. 28, 2022

(87) PCT Pub. No.: WO2022/006114
PCT Pub. Date: Jan. 6, 2022

(65) Prior Publication Data
US 2023/0297869 A1   Sep. 21, 2023

Related U.S. Application Data

(60) Provisional application No. 63/046,394, filed on Jun. 30, 2020.

(51) Int. Cl.
*G06N 10/40* (2022.01)
*H10N 60/80* (2023.01)

(52) U.S. Cl.
CPC ............ *G06N 10/40* (2022.01); *H10N 60/805* (2023.02)

(58) Field of Classification Search
USPC ............................................ 716/100
See application file for complete search history.

(56) References Cited

U.S. PATENT DOCUMENTS

| | | |
|---|---|---|
| 4,280,095 A | 7/1981 | Hinton |
| 4,370,359 A | 1/1983 | Fetter et al. |
| (Continued) | | |

FOREIGN PATENT DOCUMENTS

| | | |
|---|---|---|
| CA | 2386426 A1 | 5/2001 |
| CN | 102944855 A | 2/2013 |
| (Continued) | | |

OTHER PUBLICATIONS

Aaronson, "Thanksgiving Special: D-Wave at MIT," Shtetl-Optimized—The Blog of Scott Aaronson, URL=http://www.scottaaronson.com/blog/?p=291, retrieved Apr. 14, 2011 (originally retrieved Nov. 28, 2007), 54 pages.

(Continued)

*Primary Examiner* — Brian Ngo
(74) *Attorney, Agent, or Firm* — Cozen O'Connor

(57) ABSTRACT

A superconducting integrated circuit has a first superconducting device with a first superconducting loop, where the first superconducting loop has a first superconducting trace in a first layer of the superconducting integrated circuit, and a second superconducting device with a second superconducting loop, where the second superconducting loop has a second superconducting trace in a second layer. The first superconducting loop crosses the second superconducting loop in a crossing region. At least a portion of each of the first and the second superconducting trace inside the crossing region is narrower than at least a portion of each of the traces outside the crossing region, and follows a respective circuitous path which is inductively proximate to at least a portion of the other path.

20 Claims, 20 Drawing Sheets

(56) References Cited

U.S. PATENT DOCUMENTS

| | | |
|---|---|---|
| 4,371,796 A | 2/1983 | Takada |
| 4,496,854 A | 1/1985 | Chi et al. |
| 5,095,357 A | 3/1992 | Andoh et al. |
| 5,110,793 A | 5/1992 | De |
| 5,157,466 A | 10/1992 | Char et al. |
| 5,185,527 A * | 2/1993 | Bluzer .................. H10N 60/84 505/848 |
| 5,323,344 A | 6/1994 | Katayama et al. |
| 5,465,049 A | 11/1995 | Matsuura et al. |
| 5,523,914 A | 6/1996 | Weck et al. |
| 5,917,322 A | 6/1999 | Gershenfeld et al. |
| 5,962,781 A | 10/1999 | Veryaskin |
| 6,037,649 A | 3/2000 | Liou |
| 6,058,127 A | 5/2000 | Joannopoulos et al. |
| 6,389,197 B1 | 5/2002 | Iltchenko et al. |
| 6,437,413 B1 | 8/2002 | Yamaguchi et al. |
| 6,459,097 B1 | 10/2002 | Zagoskin |
| 6,495,854 B1 | 12/2002 | Newns et al. |
| 6,504,172 B2 | 1/2003 | Zagoskin et al. |
| 6,597,010 B2 | 7/2003 | Eriksson et al. |
| 6,627,915 B1 | 9/2003 | Ustinov et al. |
| 6,627,916 B2 | 9/2003 | Amin et al. |
| 6,753,546 B2 | 6/2004 | Tzalenchuk et al. |
| 6,784,451 B2 | 8/2004 | Amin et al. |
| 6,791,109 B2 | 9/2004 | Tzalenchuk et al. |
| 6,803,599 B2 | 10/2004 | Amin et al. |
| 6,838,694 B2 | 1/2005 | Esteve et al. |
| 6,885,325 B2 | 4/2005 | Omelyanchouk et al. |
| 6,900,454 B2 | 5/2005 | Blais et al. |
| 6,943,368 B2 | 9/2005 | Amin et al. |
| 6,979,836 B2 | 12/2005 | Zagoskin et al. |
| 6,984,846 B2 | 1/2006 | Newns et al. |
| 6,996,504 B2 | 2/2006 | Novotny et al. |
| 7,002,174 B2 | 2/2006 | Il et al. |
| 7,015,499 B1 | 3/2006 | Zagoskin |
| 7,018,852 B2 | 3/2006 | Wu et al. |
| 7,109,593 B2 | 9/2006 | Freedman et al. |
| 7,230,266 B2 | 6/2007 | Hilton et al. |
| 7,253,654 B2 | 8/2007 | Amin |
| 7,277,872 B2 | 10/2007 | Raussendorf et al. |
| 7,307,275 B2 | 12/2007 | Lidar et al. |
| 7,332,738 B2 | 2/2008 | Blais et al. |
| 7,335,909 B2 | 2/2008 | Amin et al. |
| 7,364,923 B2 | 4/2008 | Lidar et al. |
| 7,533,068 B2 | 5/2009 | Maassen et al. |
| 7,605,600 B2 | 10/2009 | Harris |
| 7,613,764 B1 | 11/2009 | Hilton et al. |
| 7,619,437 B2 | 11/2009 | Thom et al. |
| 7,624,088 B2 | 11/2009 | Johnson et al. |
| 7,639,035 B2 | 12/2009 | Berkley |
| 7,800,395 B2 | 9/2010 | Johnson et al. |
| 7,843,209 B2 | 11/2010 | Berkley |
| 7,847,615 B2 | 12/2010 | Yorozu et al. |
| 7,876,248 B2 | 1/2011 | Berkley et al. |
| 7,880,529 B2 | 2/2011 | Amin |
| 7,898,282 B2 | 3/2011 | Harris et al. |
| 8,022,722 B1 | 9/2011 | Pesetski et al. |
| 8,063,657 B2 | 11/2011 | Rose |
| 8,073,808 B2 | 12/2011 | Rose |
| 8,098,179 B2 | 1/2012 | Bunyk et al. |
| 8,102,185 B2 | 1/2012 | Johansson et al. |
| 8,164,082 B2 | 4/2012 | Friesen |
| 8,169,231 B2 | 5/2012 | Berkley |
| 8,174,305 B2 | 5/2012 | Harris |
| 8,190,548 B2 | 5/2012 | Choi |
| 8,190,553 B2 | 5/2012 | Routt |
| 8,195,596 B2 | 6/2012 | Rose et al. |
| 8,234,103 B2 | 7/2012 | Biamonte et al. |
| 8,421,053 B2 | 4/2013 | Bunyk et al. |
| 8,536,566 B2 | 9/2013 | Johansson et al. |
| 8,738,105 B2 | 5/2014 | Berkley et al. |
| 8,854,074 B2 | 10/2014 | Berkley |
| 9,015,215 B2 | 4/2015 | Berkley et al. |
| 9,059,674 B2 | 6/2015 | Chow et al. |
| 9,129,224 B2 | 9/2015 | Lanting et al. |
| 9,178,154 B2 | 11/2015 | Bunyk |
| 9,183,508 B2 | 11/2015 | King |
| 9,471,880 B2 | 10/2016 | Williams |
| 9,495,644 B2 | 11/2016 | Chudak et al. |
| 9,710,758 B2 | 7/2017 | Bunyk et al. |
| 9,806,711 B1 | 10/2017 | Abdo |
| 10,002,107 B2 | 6/2018 | Lanting |
| 10,037,493 B2 | 7/2018 | Harris et al. |
| 10,068,180 B2 | 9/2018 | Amin et al. |
| 10,074,792 B1 | 9/2018 | Ferguson et al. |
| 10,134,972 B2 | 11/2018 | Oliver et al. |
| 10,268,622 B2 | 4/2019 | Hilton et al. |
| 10,467,545 B2 | 11/2019 | Harris |
| 10,938,346 B2 | 3/2021 | Berkley et al. |
| 11,348,024 B2 | 5/2022 | Harris et al. |
| 11,494,683 B2 | 11/2022 | Amin et al. |
| 2002/0117656 A1 | 8/2002 | Amin et al. |
| 2002/0190381 A1 | 12/2002 | Herr et al. |
| 2003/0027724 A1 | 2/2003 | Rose et al. |
| 2003/0121028 A1 | 6/2003 | Coury et al. |
| 2003/0224753 A1 | 12/2003 | Bremond et al. |
| 2004/0078421 A1 | 4/2004 | Routt |
| 2004/0140537 A1 | 7/2004 | Il et al. |
| 2005/0062072 A1 | 3/2005 | Yamamoto et al. |
| 2005/0127915 A1 | 6/2005 | Schauwecker et al. |
| 2005/0140019 A1 | 6/2005 | Watanabe |
| 2006/0043541 A1 | 3/2006 | Tetelbaum |
| 2007/0212889 A1 | 9/2007 | Abatchev et al. |
| 2008/0052055 A1 | 2/2008 | Rose et al. |
| 2008/0238531 A1 | 10/2008 | Harris |
| 2009/0070402 A1 | 3/2009 | Rose et al. |
| 2009/0153180 A1 | 6/2009 | Herr |
| 2010/0182039 A1 | 7/2010 | Baumgardner et al. |
| 2012/0157319 A1 * | 6/2012 | Tsukamoto ........ G01R 33/0354 29/599 |
| 2014/0229722 A1 | 8/2014 | Harris |
| 2014/0266406 A1 | 9/2014 | Abraham et al. |
| 2014/0345251 A1 | 11/2014 | Mclean et al. |
| 2015/0032991 A1 * | 1/2015 | Lanting .................. G06N 10/40 712/30 |
| 2015/0111754 A1 | 4/2015 | Harris et al. |
| 2016/0267032 A1 | 9/2016 | Rigetti et al. |
| 2017/0047161 A1 | 2/2017 | Ludois et al. |
| 2017/0062692 A1 | 3/2017 | Dial et al. |
| 2017/0178018 A1 * | 6/2017 | Tcaciuc ................. H01F 41/076 |
| 2017/0193388 A1 | 7/2017 | Filipp et al. |
| 2017/0344898 A1 | 11/2017 | Karimi et al. |
| 2018/0247974 A1 | 8/2018 | Oliver et al. |
| 2019/0019098 A1 | 1/2019 | Przybysz |
| 2019/0019099 A1 | 1/2019 | Hoskinson et al. |
| 2019/0237648 A1 | 8/2019 | Przybysz et al. |
| 2019/0393401 A1 | 12/2019 | Megrant |
| 2021/0013391 A1 | 1/2021 | Johnson et al. |
| 2021/0190885 A1 | 6/2021 | Swenson et al. |

FOREIGN PATENT DOCUMENTS

| | | |
|---|---|---|
| CN | 104462689 A | 3/2015 |
| JP | 2005142348 A | 6/2005 |
| JP | 2007250771 A | 9/2007 |
| JP | 2009065017 A | 3/2009 |
| JP | 2011524043 A | 8/2011 |
| JP | 2011197875 A | 10/2011 |
| JP | 2012064974 A | 3/2012 |
| JP | 6140679 B2 | 5/2017 |
| JP | 2018530931 A | 10/2018 |
| JP | 2019508876 A | 3/2019 |
| JP | 2020524064 A | 8/2020 |
| WO | 2004007964 A1 | 1/2004 |
| WO | 2004077600 A1 | 9/2004 |
| WO | 2005093649 A1 | 10/2005 |
| WO | 2004079649 A3 | 11/2005 |
| WO | 2006024939 A2 | 3/2006 |
| WO | 2007085074 A1 | 8/2007 |
| WO | 2015103372 A1 | 7/2015 |
| WO | 2022006114 A1 | 1/2022 |
| WO | 2022115278 A1 | 6/2022 |

(56) References Cited

FOREIGN PATENT DOCUMENTS

OTHER PUBLICATIONS

Abelson et al., "Superconductor Integrates Circuit Fabrication Technology", IEEE Invited Paper, Oct. 10, 2004. https://ieeexplore.ieee.org/document/1335546.
Albash et al., "Simulated Quantum Annealing with Two All-to-All Connectivity Schemes", arXiv:1603.03755v1 [quant-ph], Mar. 11, 2016. https://arxiv.org/abs/1603.03755.
Al-Saidi et al., "Several small Josephson junctions in a resonant cavity: Deviation from the Dicke model", Physical Review B, Jun. 5, 2002.
Amin et al., "Decoherence in adiabatic quantum computation", arXiv:0708.0384v1, Aug. 2, 2007. https://arxiv.org/abs/0708.0384.
Amin et al., "Probing Noise in Superconducinting Flux Qubits Using Macroscopic Resonant Tunneling" Sep. 1, 2007.
Angelakis et al., "Many body effects and cluster state quantum computation in strongly interacting systems of photons," arXiv:0803.1665v1. Mar. 11, 2008.
Astafiev et al., "Single-Shot Measurement of the Joseph Charge Qubit," Physical Review B 69(180507(R):1-4, 2004.
Averin et al., "Variable Electrostatic Transformer: Controllable Coupling of Two Charge Qubits," Physical Review Letters 91(5): 057003-1-057003-4, Aug. 1, 2003. arXiv:cond-mat/0304166v1, Apr. 7, 2003.
Averin, D.V., "Adiabatic Quantum Computation with Cooper Pairs," arXiv:quant-ph/9706026v1, Jun. 13, 1997, 18 pages.
Barenco et al., "Elementary gates for quantum computation," Physical Review A 52(5):3457-3467, Nov. 1995.
Barends R. et al., "Coherent Josephson qubit suitable for scalable quantum integrated circuits," arXiv:1304.2322v1 [quant-ph], Apr. 8, 2013, 10 pages.
Bartlett et al., "Simple Nearest-Neighbor Two-Body Hamiltonian System for Which the Ground State is a Universal Resource for Quantum Computation," arXiv:quant-ph/0609002v3 Oct. 24, 2006.
Berggren, "Quantum Computing With Superconductors", Proceedings of the IEEE, vol. 92(10), Oct. 1, 2004. https://www.researchgate.net/publication/2986358_Quantum_Computing_with_Superconductors.
Berkley et al., "Entangled Macroscopic Quantum States in Two Superconducting Qubits", Science, vol. 300, Jun. 6, 2003. https://science.sciencemag.org/content/300/5625/1548.
Biamonte et al., "Realizable Hamiltonians for universal adiabatic quantum computers," arXiv:0704.1287v2, Jun. 17, 2008, 7 pages.
Biamonte et al., "Physical Realizations of a Universal Adiabatic Quantum Computer," Notice of Allowance dated Jun. 18, 2015, for U.S. Appl. No. 13/539,039, 9 pages.
Biamonte et al., "Physical Realizations of a Universal Adiabatic Quantum Computer," Notice of Allowance dated Mar. 28, 2012, for U.S. Appl. No. 12/098,348, 8 pages.
Biamonte et al., "Physical Realizations of a Universal Adiabatic Quantum Computer," Office Action dated Mar. 16, 2012, for U.S. Appl. No. 12/098,348, 6 pages.
Blais et al., Cavity Quantum Electrodynamics for Superconducting Electrical Circuits: An Architecture for Quantum Computation, Physical Review A 69(062320):1-14, 2004.
Blais et al., "Operation of universal gates in a solid-state quantum computer based on clean Josephson junctions between d-wave superconductors", Physical Review A, 61, 042308, 2000.
Blais et al., "Tunable Coupling of Superconducting Qubits," arXiv:cond-mat/0207112v3 [cond-mat.mes-hall], Mar. 18, 2003, 4 pages.
Blais, et al., "Cavity quantum electrodynamics for superconducting electrical circuits" an architecture for quantum computation, arXiv:cond-mat/0402216v1, Feb. 7, 2004, pp. 1-14 (Year:2004).
Blatter et al., "Design aspects of superconducting-phase quantum bits," Physical Review B 63: 174511-1-174511-9, 2001.
Blatter, G., "The Qubit Duet," Nature 421:796-797, Feb. 20, 2003.

Bocko et al., "Prospects for Quantum Coherent Computation Using Superconducting Electronics," IEEE Transactions on Applied Superconductivity 7(2):3638-3641, Jun. 1997.
Bravyi et al., "The Complexity of Stoquastic Local Hamiltonian Problems," arXiv:quant-ph/0606140v1, pp. 1-21, Jun. 16, 2006.
Buisson et al., "Entangled states in a Josephson charge qubit coupled to a superconducting resonator", arXiv.org:cond/mat/0008275v1, Aug. 18, 2000.
Butcher, J.R., "Advances in Persistent-Current Qubit Research: Inductively Coupled Qubits and Novel Biasing Methods," Final Report, Delft University of Technology, Jan. 10, 2002, 52 pages.
Carelli et al., "SQUID Systems for Macroscopic Quantum Coherence and Quantum Computing", IEEE trans. Apple. Supercond., Mar. 1, 2001. https://ieeexplore.ieee.org/document/919321.
Castin et al., "Coherent Atomic Matter Waves: Proceedings of the Les Houches Summer School, Session LXXII in 1999," Springer-Verlag, New York, ISBN 286883499X, pp. 184-188, 294-295, 302-303.
Chancellor et al., "A Direct Mapping of Max k-SAT and High Order Parity Checks to a Chimera Graph", arXiv:1604.00651v1, Apr. 3, 2016.
Chancellor et al., "Circuit design for multi-body interactions in superconducting quantum annealing systems with applications to a scalable architecture", arXiv:1603.09521v5, Oct. 13, 2017.
Chancellor et al., "Experimental Freezing of mid-Evolution Fluctuations with a Programmable Annealer", arXiv:1605.07549 [quant-ph], May 25, 2016. https://arxiv.org/abs/1605.07549.
Chen et al., "Qubit architecture with high coherences and fast tunable coupling", Physical Review Letters, Feb. 28, 2014. https://arxiv.org/abs/1402.7367.
Cheon, et al., "AIN Based RF MEMS Tunable Capacitor with Air-Suspended Electrode with Two Stages", Journal of Semiconductor Technology and Science, vol. 14, No. 1, Feb. 2013, 7 pages.
Chinese Notice of Issuance dated Jun. 6, 2022 for Chinese Application No. 201680058686.7, 4 pages.
Choi, M-S., "Geometric Quantum Computation on Solid-State Qubits," arXiv:quant-ph/0111019v4, Sep. 29, 2003, 7 pages.
Clarke et al., "Superconducting quantum bits," Nature 453:1031-1042, Jun. 19, 2008.
Corato et al., "Adiabatic Quantum Computation with Flux Qbits," Quantum Computing in Solid State Systems, ch 13, pp. 103-110, 2006.
Cormen et al., Introduction to Algorithms, The MIT Press, Cambridge, Massachusetts, pp. 964-985, 2000.
Cosmelli, C., "Controllable Flux Coupling for the Integration of Flux Qubits," arXiv:cond-mat/0403690v1 [cond-mat.supr-con]. Mar. 29, 2004, 10 pages.
Devoret et al., "Superconducting Circuits for Quantum Information: An Outlook," Science 339:1169-1174, Mar. 8, 2013.
Devoret et al., "Superconducting Qubits: A Short Review," arXiv:cond-mat/0411174v1, Nov. 7, 2004, 41 pages.
DiVincenzo, "The Physical Implementation of Quantum Computation," arXiv:quanti-ph/0002077v3, Apr. 13, 2000.
Dolan, "Offset masks for lift-off photoprocessing", Applied Physics Letters, vol. 31(5), Sep. 1, 1977. https://aip.scitation.org/doi/10.1063/1.89690.
Duty et al., "Coherent Dynamics of a Josephson Charge Qubit," Physical Review B 69(140503(R)):1-4, 2004.
Born , et al., Born et al., "Fabrication of Ultrasmall Tunnel Junctions by Electron Beam Direct-Writing", IEEE, 11(1) Mar. 2001, 4 pages.
Schützhold et al., "Adiabatic quantum algorithms and quantum phase transitions", arXiv:quant-ph/0608017, Aug. 1, 2006. https://arxiv.org/abs/quant-ph/0608017.
Shnirman et al., "Low-and High-Frequency Noise from Coherent two-Level Systems", arXiv:cond-mat/0412668v2, Jan. 13, 2005.
Shor, "Introduction to Quantum Algorithms," AT&T Labs—Research, arXiv:quant-ph/0005003 v2, pp. 1-17, Jul. 6, 2001.
Steffen et al., "Quantum computing: An IBM perspective", IBM Journal of Research and Development, vol. 55, No. 5, Sep./Oct. 2011.
Steffen, A prototype Quantum Computer Using Nuclear Spins in Liquid Solution, Doctoral Thesis, Stanford University, Jun. 2003 pp. 1-370 (Year: 2003).

(56) References Cited

OTHER PUBLICATIONS

Strauch, Theory of Superconducting Phase Qubits, UMI Microform, Ann Arbor, Michigan, 2005, Chapter 8, "Conclusion," pp. 298-306.
Suzuki et al., "Quantum Annealing of the Random-Field Ising Model Transverse Ferromagnetic Interactions," arXiv:quant-ph/0702214v1, 6 pages, Feb. 23, 2007.
Tang et al., "2D implementation of quantum annealing algorisms for fourth order binary optimization problems", Institute for Quantum Computing and Department of Electrical and Computer Engineering, arXiv:1605.03887, May 12, 2016.
Tokuda, "Analog Computation Using Single-Electron Circuits", Analog Integrated Circuits and Signal Processing, Oct. 1, 2000. http://lalsie.ist.hokudai.ac.jp/publication/dlcenter.php?fn=paper/aicsp_2000_tokuda.pdf.
Vala et al., "Encoded Universality for Generalized Anisotropic Exchange Hamiltonians," arXiv:quant-ph/0204016v1, Apr. 4, 2002, 15 pages.
Van Dam, "Quantum Computing: In the 'Death Zone'?," Nature Physics 3:220-221, Apr. 2007.
Van der Ploeg et al., "Controllable Coupling of Superconducting Flux Qubits," arXiv: cond-mat/0605588v1, May 24, 2006.
Van der Ploeg, et al., "Adiabatic Quantum Computation with Flux Qubits, First Experimental Results," arXiv:cond-mat/0702580v1 [cond-mat.supr-con], Feb. 25, 2007, 6 pages.
Van der Wal et al., "Quantum Superposition of Macroscopic Persistent current states", Science 290, pp. 773-777, 2000.
Van der Wal, C.H., "Quantum Superpositions of Persistent Josephson Currents," Thesis, Published by DUP Science, Sep. 24, 2001, 121 pages.
Vinci et al., "Non-stoquastic interactions in quantum annealing via the aharonov-anandan phase", arXiv:1701.07494v1 [quant-ph], Jan. 25, 2017.
Vion et al., "Manipulating the quantum state of an electrical circuit", Science, 296, pp. 886-889 (2002).
Wallquist et al., "Superconducting Qubit Network with Controllable Nearest-Neighbor Coupling," New Journal of Physics 7(178), 24 pages, 2005. https://iopscience.iop.org/article/10.1088/1367-2630/7/1/178/pdf.
Wallraff et al., "Strong Coupling of a Single Photon to a Superconducting Qubit Using Circuit Quantum Electrodynamics," Nature 431:162-167, Sep. 9, 2004.
Wallraff, "Fluxon dynamics in annular Josephson junctions: from relativistic strings to quantum particles", Friedrich-Alexander University of Erlangen-Nürnberg, Ph.D. Thesis, Apr. 1, 2001.
Wang et al., "Fast Entanglement of Two Charge-Phase Qubits Through Nonadiabatic Couling to a Large Josephson Junction," Physical Review B 70:224515-1-224515-4, 2004. http://site.gscaep.ac.cn/ftp/cpsun/papers/PR/PRB04.pdf.
Watanabe et al., "Resonance-Free Low-Pass Filters for the AC Josephson Voltage Standard," IEEE Transactions on Applied Superconductivity 16(1):49-53, Mar. 2006.
Weber et al., "Coherent Coupled Qubits for Quantum Annealing," arXiv:1701.06544v2 [quant-ph], Jun. 6, 2017, 14 pages.
Wei et al., "Preparation of multi-qubit W states in multiple resonators coupled by a superconducting qubit via adiabatic passage", Quantum Inf Process, Apr. 14, 2015.
Wei et al., "Quantum Computation with Josephson-Qubits by Using a Current-Biased Information Bus," arXiv:cond-mat/0407667 v1, pp. 1-13, Jul. 26, 2004.
Wendin et al., "Superconducting Quantum Circuits, Qubits and Computing," arXiv:cond-mat/0508729v1 [cond-mat.supr-con], Aug. 30, 2005, 60 pages.
Wocjan et al., "Treating the Independent Set Problem by 2D Ising Interactions with Adiabatic Quantum Computing," arXiv:quant-ph/0302027v1, pp. 1-13, Feb. 4, 2003.
Wu et al., "Dressed Qubits," Physical Review Letters 91(9):1-4, Aug. 29, 2003.
Wu et al., "Qubits as Parafermions," arXiv:quant-ph/0109078v3, May 28, 2002, 17 pages.
Wu et al., "Universal Quantum Logic from Zeeman and Anisotropic Exchange Interactions," Physical Review A 66 (062314):1-5, 2002.
Yamamoto et al., "Demonstration of conditional gate operation using superconducting charge qubits", Nature, vol. 425, Oct. 30, 2003. https://www.nature.com/articles/nature02015.
Yan et al., "A tunable coupling scheme for implementing high-fidelity two-qubit gates", Arxiv:1803.09813v1, Mar. 26, 2018.
You et al., "Controllable Manipulation and Entanglement of Macroscopic Quantum States in Coupled Charge Qubits," arXiv:cond-mat/0306363v1, Jun. 13, 2003.
You et al., "Scalable Quantum Computing with Josephson Charge Qubits," arXiv:cond-mat/0306209v1, Jun. 2, 2003.
You, et al., "Fast Two-Bit Operations in Inductively Coupled Flux Qubits," arXiv:cond-mat/0309491v3, pp. 1-10, Feb. 5, 2005.
Zagoskin et al., "Quantum Two-Level Systems in Josephson Junctions as Naturally Formed Qubits," arXiv:cond-mat/0603753v3, Aug. 18, 2006.
Zagoskin et al., "Superconducting Qubits," arXiv:0805.0164v1, May 1, 2008.
Zurek, "Decoherence and the transition from quantum to classical", Physics Today, 44, 10, pp. 36-44, 1991.
Amin, Josephson Phase Qubit Without Tunneling, arXiv:cond-mat/0211638v3, Mar. 4, 2003.
Averin, Variable Electrostatic Transformer: Controllable Coupling of Two Charge Qubits, arXiv:cond-mat/0304166v2, Jul. 28, 2003.
Chancellor N., Circuit design for multi-body interactions in superconducting quantum annealing systems with applications to a scalable architecture, arXiv:1603.09521v1, Mar. 31, 2016.
Chiorescu, et al. "Coherent Quantum Dynamics of a Superconducting Flux Qubit", arXiv:cond-mat/0305461v1, May 20, 2003.
Grajcar et al., "Adiabatic Quantum Evolution of Superconducting Flux Qubits," arXiv:cond-mat/0407405 v1, pp. 1-7, Jul. 15, 2004.
Harris, Sign and Magnitude Tunable Coupler for Superconducting Flux Qubits, arXiv:cond-mat/0608253v1, Aug. 11, 2006 2006.
Horsman, et al., "Surface code quantum computing by lattice surgery", 2012 Journal of Physics, 14 123011, 28 pages.
Hutter et al., "Inductively Coupled Charge Qubits with Asymmetric SQUIDs," Jahrestagung der Deutschen Physikalischen Gesellschaft (DPG), 2005, 1 page—abstract only.
Ilichev, et al., "Continuous Monitoring of Rabi Oscillations in a Josephson Flux Qubit", Physical Review Letters 91(9): 097906-1-097906-4, week ending Aug. 19, 2003.
Johnson et al., "Scalable Control System for a Superconducting Adiabatic Quantum Optimization Processor," arXiv:0907.3757v2. Mar. 24, 2010. 14 pages.
Lanting et al., Geometrical dependence of the low-frequency noise in superconducting flux qubits, arXiv:0812.0378v1, Dec. 1, 2008.
Neihart, et al., "Twisted Transformers for Low Coupling RF and Mixed Signal Applications", 2009 IEEE International Symposium on Circuits and Systems, Taipei, Taiwan, 2009, pp. 429-432.
Oliver, "Quantum Enhanced Optimization: Experimental Study Overview", IARPA, Oct. 26, 2015.
You, et al., "Fast Two-Bit Operations in Inductively Coupled Flux Qubits," arXiv:cond-mat/0309491v1, pp. 1-5, Sep. 22, 2003.
Kim, "Controllable Coupling in Phase-Coupled Flux Qubits," arXiv:cond-mat/0602604v3, Sep. 29, 2006.
Koch et al., "Model for I/f Flux Noise in SQUIDs and Qubits," arXiv:cond-mat/0702025v2, pp. 1-14, May 5, 2007.
Koval et al., "Narrow Long Josephson Junctions", IEEE, Jun. 1999. https://ieeexplore.ieee.org/document/783894.
Lang, "Analog was not a Computer Trademark!," Sound & Vibration:16-24, Aug. 2000.
Lantz et al., "Josephson Junction Qubit Network with Current-Controlled Interaction," Proceedings of the Fourth International Workshop on Macroscopic Quantum Coherence and Computing (MQC2'04), Jun. 7-10, 2004, 13 pages.
Lechner et al., "A quantum annealing architecture with all-to-all connectivity from local interactions", Science Advances. Oct. 23, 2015. https://advances.sciencemag.org/content/1/9/e1500838.
Leggett et al., "Dynamics of the dissipative tWo-state system", Reviews of Modern Physics, 59, pp. 1-85, Jan. 1, 1987.

(56) References Cited

OTHER PUBLICATIONS

Leib et al., "A Transmon Quantum Annealer: Decomposing Many-Body Ising Constraints Into Pair Interactions", arXiv:1604.02359v1 [quant-ph], Apr. 8, 2016. https://arxiv.org/abs/1604.02359.
Levitov, et al., "Quantum Spin Chains and Majorana States in Arrays of Coupled Qubits," arXiv:cond-mat/0108266v2 [cond-mat.mes-hall]. Aug. 19, 2001, 7 pages.
Lidar, "On the quantum computational complexity of the Ising spin glass partition function and of knot invariants," New Journal of Physics 6(167): 1-15, 2004.
Liu, Qichun et al., "Simulation of Three-dimensional Resonator for Quantum Computation," Cryogenics & Superconductivity, vol. 42, No. 10, pp. 27-31, 2014.
Lykiardopoulou et al., "Improving nonstoquastic quantum annealing with spin-reversal transformations", Arxiv:2010.00065v1, Sep. 30, 2020.
Maasen van den Brink et al., "Mediated Tunable Coupling of Flux Qubits," arXiv:cond-mat/0501148v2, Oct. 13, 2005.
Maassen van den Brink, "Galvanic coupling of flux qubits simple theory and tunability", (cond-mat.supr-con), May 16, 2006. https://arxiv.org/abs/cond-mat/0605398.
Madou, Fundamentals of Microfabrication, Second Edition, CRC Press LLC, Boca Raton, Florida, 2002. (book details provided).
Majer, et al., "Spectroscopy on Two Coupled Superconducting Flux Qubits", arXiv:cond-mat/0308192v1, Aug. 10, 2003.
Majer, J.B., "Superconducting Quantum Circuits," Thesis, published by DUP Science, Dec. 13, 2002, 120 pages.
Makhlin et al., "Quantum-state engineering with Josephson-junction devices," arXIv:cond-mat/0011269v1, arXiv:cond-mat/0011269v1, Nov. 15, 2000.
Marina et al., "Improving nonstoquastic annealing with spin-reversal transformations", arXiv:2010.00065v1, Sep. 30, 2020.
Martinis et al., "Decoherence of a superconducting qubit due to bias noise", Physical Review B, Mar. 25, 2003. https://journals.aps.org/prb/abstract/10.1103/PhysRevB.67.094510.
Martinis et al., "Rabi Oscillations in a Large Josephson-Junction Qubit," Physical Review Letters 89(11):117901-1-117901-4, Sep. 9, 2002.
Martinis, "Superconducting phase qubits," Quantum Inf Process 8:81-103, 2009.
Mooij et al., "Josephson Persistent-Current Qubit," Science 285:1036-1039, Aug. 13, 1999.
Nakamura et al., "Coherent control of macroscopic quantum states in a single-Cooper-pair-box," Nature 398:786-788, Apr. 29, 1999.
Neill, "A path towards quantum supremacy with superconducting qubits", PHD Thesis—University of California, Dec. 1, 2017.
Nielsen et al., "7.8 Other implementation schemes", Quantum Computing and Quantum Information, 2000. http://mmrc.amss.cas.cn/tlb/201702/W020170224608149940643.pdf.
Nielsen et al., "4.5 Universal Quantum Gates", Quantum Computing and Quantum Information, 1st ed. 2000.
Nielsen et al., "7.8 Other implementation schemes," in Quantum Computation and Quantum Information, 1st ed., Cambridge University Press, Cambridge, 2000, pp. 343-345.
Nielsen et al., Quantum Computation and Quantum Information, Cambridge University Press, 10th ed., Cambridge, 2010.
Nishimori et al., "Exponential enhancement of the efficiency of quantum annealing by non-stoquastic hamiltonians", arXiv:1609.03785v3 [quant-ph], Feb. 18, 2017. https://arxiv.org/abs/1609.03785.
Niskanen et al., "Quantum Coherent Tunable Coupling of Superconducting Qubits," Science 316:723-726, May 4, 2007.
Niskanen et al., "Tunable Coupling Scheme for Flux Qubits at the Optimal Point," arXiv:cond-mat/0512238v1, Dec. 12, 2005.
Notice of Allowance for U.S. Appl. No. 17/113,847, mailed Jul. 20, 2023, 11 pages.
Nunn, et al., Quantum Memory in Atomic Ensembles, Doctoral Thesis, Clarendon Laboratory, University of Oxford, 2008, pp. 1-524 (Year:2008).
Oliveria et al., "The complexity of quantum spin systems on a two-dimensional square lattice", arXiv:quant-ph/0504050, v6, Jun. 3, 2008.
Orlando et al., "Superconducting persistent-current qubit," Physical Review B 60(22):15398-15413, Dec. 1, 1999.
Ortlepp et al., "Access Time and Power Dissipation of a Model 256-Bit Single Flux Quantum RAM", IEEE Transactions on Applied Superconductivity, vol. 24, No. 4, Aug. 2014.
Ortlepp et al., "Design Guidelines for Suzuki Stacks as Reliable High-speed Josephson Voltage Drivers", Superconductor Science Technology, 26 (2013) 035007 (12pp).
Paauw, "Spectroscopy Experiments On Two Coupled Josephson Persistent Current Qubits," Thesis Final Report, Delf University of Technology, Nov. 2002.
Pashkin et al., "Quantum Oscillations in Two Coupled Charge Qubits," Nature 421:823-826, Feb. 20, 2003.
Plourde et al., "Entangling Flux Qubits with a Bipolar Dynamic Inductance," Physical Review B 70, arXiv:quant-ph/0406049v1, Jun. 8, 2004, 4 pages.
Quintana, "Superconducting Flux Qubits for High-Connectivity Quantum Annealing Without Lossy Dielectrics," Doctoral Thesis, UC Santa Barbara, 2017, 413 pages. https://escholarship.org/uc/item/9844c3h3.
Ramos et al., "Design for Effective Thermalization of Junctions for Quantum Coherence," IEEE Transactions on Applied Superconductivity 11(1):998-1001, Mar. 2001.
Rocchetto et al., "Stabilisers as a design tool for new forms of Lechner-Hauke-Zoller Annealer", arXiv:1603.08554 [quant-ph], May 2, 2016. https://arxiv.org/abs/1603.08554.
Rudo, "Influence of strong noise on the Adiabatic Quantum Computer," University of Vienna, 2015, pp. 1-66.
Sandberg et al., "Tuning the field in a microwave resonator faster than the photon lifetime", Applied Physics Letters, American Institute of Physics, vol. 92, No. 20, 3 pages, May 19, 2008.
Schaller et al., "The role of symmetries in adiabatic quantum algorithms", arXiv:0708.1882v1, Aug. 14, 2007. https://arxiv.org/pdf/0708.1882v1.pdf.
Harris et al., 'A Compound Josephson Junction Coupler for Flux Qubits With Minimal Crosstalk', arXiv:0904.3784v3, Jul. 2009.
Japanese First Office Action for Japanese Patent Application No. 2022580739, dated Aug. 20, 2025, 4 pages.
Esteve et al., "Solid State Quantum Bit Circuits," arXiv:cond-mat/0505676 [cond-mat.supr-con], May 27, 2005, 37 pages.
European Search Report, mailed Nov. 18, 2010, for EP 08733736.6, 12 pages.
European Search Report, mailed Oct. 13, 2010, for EP 05849198.6, 10 pages.
Extended European Search Report, dated Apr. 4, 2022, for European Application No. 21198672.4, 10 pages.
Farhi et al., "Quantum Adiabatic Evolution Algorithms versus Simulated Annealing," MIT-CTP #3228, arXiv:quant-ph/0201031 v1, pp. 1-16, Jan. 8, 2002.
Feynman, "Simulating Physics with Computers," International Journal of Theoretical Physics 21(6/7): 467-488, 1982.
Foxen et al., "Demonstrating a Continuous Set of Two-Qubit Gates for Near-Term Quantum Algorithms" Physical Review Letters 125, 120504 (2020), 6 pages.
Friedman et al., "Aharonov-Casher-Effect Suppression of Macroscopic Tunneling of Magnetic Flux," arXiv:cond-mat/0109544v1 [cond-mat.mes-hall], Sep. 28, 2001, 9 pages.
Friedman et al., "Detection of a Schrodinger's Cat State in an rf-SQUID," arXiv:cond-mat/0004293v2 2:1-7, Apr. 19, 2000.
Friedman et al., "Quantum superposition of distinct macroscopic states," Nature 406:43-46, Jul. 6, 2000.
Grajcar et al., "Experimental Realization of Direct Josephson Coupling Between Superconducting Flux Qubits," arXiv:cond-mat/0501085v1, Jan. 5, 2005, 4 pages.
Grajcar et al., "Four-Qubit Device with Mixed Couplings", Physical Review Letters, Feb. 3, 2006. https://journals.aps.org/prl/abstract/10.1103/PhysRevLett.96.047006.
Grajcar et al., "Possible Implementation of Adiabatic Quantum Algorithm with Superconducting Flux Qubits," arXiv:cond-mat/0407405v3 [cond-mat.supr-con], Mar. 29, 2005, 8 pages.

(56) References Cited

OTHER PUBLICATIONS

Groszkowski et al., "Tunable coupling between three qubits as a building block for a superconducting quantum computer", arXiv:1102.0307v2 [quant-ph], Oct. 20, 2011. https://arxiv.org/abs/1102.0307.

Gu et al., "Encoding Universal Computation in the Ground States of Ising Lattices", arXiv:1204.1084v2 [cond-mast.stat-mech], Jul. 17, 2012. https://arxiv.org/abs/1204.1084.

Han et al., "Time-Resolved Measurement of Dissipation-Induced Decoherence in a Josephson Junction," Science 293:1457-1459, Aug. 24, 2001.

Harrabi, et al. "Engineered selection rules for tunable coupling in a superconducting quantum circuit", Physical Reviews B 79, 020507(r) (2009), 4 pages.

Harris et al., "A Compound Josephson Junction Coupler for Flux Qubits with Minimal Crosstalk," arXiv:0904.3784v1 [cond-mat.supr-con] Apr. 24, 2009, 4 pages.

Harris et al., "Probing Noise in Flux Qubits via Macroscopic Resonant Tunneling", arXiv:0712.0838v2 [cond-mat.mes-hall], Feb. 8, 2008, pp. 1-4.

Harris et al., "Sign and Magnitude Tunable Coupler for Superconducting Flux Qubits," arXiv:cond-mat/0608253v3 [cond-mat.supr-con], Jul. 5, 2007. 5 pages.

Harris et al., "Synchronization of Multiple Coupled rf-SQUID Flux Qubits", arXiv:0903.1884v1, Mar. 11, 2009. https://arxiv.org/abs/0903.1884.

Harris et al., "Experimental Demonstration of a Robust and Scalable Flux Qubit," arXiv:0909.4321v1, Sep. 24, 2009, 20 pages.

Harris et al., "Experimental Investigation of an Eight-Qubit Unit Cell in a Superconducting Optimization Processor," arXiv:1004.1628v2, Jun. 28, 2010, 16 pages.

He et al., "Generating multipartite entangled states of qubits distributed in different cavities", Quantum Informatoin Processing, vol. 13, No. 6, pp. 1381-1395 Feb. 11, 2014.

He et al., "Switchable Coupling Between Charge and Flux Qubits," arXiv:cond-mat/0703012v2 [cond-mat.supr-con], 5 pages, 2007.

Hime et al., "Solid-State Qubits with Current-Controlled Coupling," Science 314:1427-1429, 2006.

Hime et al., "Supporting Online Material for Solid-State Qubits with Current-Controlled Coupling," retrieved from http://www.sciencemag.org/cgi/content/full/314/5804/1427/DC1, 5 pages, Dec. 1, 2006.

Hita-Perez et al., "Ultrastrong capacitive coupling of flux qubits", arXiv:2108.02549v1, Aug. 5, 2021. https://arxiv.org/abs/2108.02549.

Hormozi et al., "Nonstoquastic Hamiltonians and Quantum Annealing of an Ising Spin Glass," arXiv:1609.06558v2 [quant-ph], May 15, 2017, 9 pages.

Hu et al., "Decoherence and dephasing in spin-based solid state quantum computers", arXiv.org:cond-mat/0108339v2, Sep. 6, 2001, (2001).

Hua et al., "Microstrip Bandpass Filters Using Dual-Mode Resonators with Internal Coupled Lines," Progress in Electromagnetics Research C, 21:99-111, 2011.

Hutter et al., "Parafermions in a Kagome lattice of qubits for topological quantum computation", arXiv:1505.01412v1, May 6, 2015.

Hutter et al., "Tunable Coupling of qubits: nonadiabatic corrections", arXiv:cond-mat/0602086v2, May 12, 2006. https://arxiv.org/abs/cond-mat/0602086.

Il'ichev et al., "Continuous Monitoring of Rabi Oscillations in a Josephson Flux Qubit," arXiv:cond-mat/0303433v1, Mar. 20, 2003.

Il'ichev et al., "Radio-Frequency Method for Investigation of Quantum Properties of Superconducting Structures," arXiv:cond-mat/0402559v3, Jun. 23, 2004, 10 pages.

Inokuchi et al., "Analog computation using quantum-flux parametron devices," Physica C 357-360 :1618-1621, 2001.

International Search Report and Written Opinion for PCT/US2018/066613, mailed Mar. 29, 2019, 24 pages.

International Search Report and Written Opinion for PCT/US2022/081507 dated Apr. 24, 2023, 12 pages.

Ithier, "manipulation, readout and analysis of the decoherence of a superconducting quantum bit, Doctoral Thesis, "Universite's Paris VI, Feb. 12, 2007, pp. 1-0202 (year:2007).

Jiang, "Superconduccting Microelectroincs Device—Merit Units for VLSI", Cryogenics & Superconducctivity, vol. 4, pp. 27-34, 1982.

Johansson et al., "Landau-Zener Transitions in an Adiabatic Quantum Computer", arXiv:0807.0797v1, Jul. 4, 2008. https://arxiv.org/abs/0807.0797.

Johnson et al., "Scalable Control System for a Superconducting Adiabatic Quantum Optimization Processor," arXiv:0907.3757v1. Jul. 22, 2009. [online] Available. chrome-extension://efaidnbmnnnibpcajpcglclefindmkaj/https://arxiv.org/pdf/0907.3757v1.pdf.

Joyez et al., "Observation of Parity-Induced Suppression of Josephson Tunneling in the Superconducting Single Electron Transistor", Physical Review Letters, 72(15)12458 2461, (1994).

Kaminsky et al., "Scalable Superconducting Architecture for Adiabatic Quantum Computation," arXiv:quant-ph/0403090v1, Mar. 11, 2004, 5 pages.

Kempe et al., "The Complexity of the Local Hamiltonian Problem", arXiv:quant-ph/0406180, Jun. 24, 2004. https://arxiv.org/abs/quant-ph/0406180.

Kerman et al., "Quantum Enhanced Optimization: Experimental Study Overview", IARPA, Oct. 26, 2015.

Kim et al., "Coupling of Josephson Current Qubits Using a Connecting Loop," arXiv:cond-mat/0305127v1, May 7, 2003.

\* cited by examiner

SYSTEMS AND METHODS FOR COUPLING BETWEEN QUBITS

BACKGROUND

Field

This disclosure generally relates to improving the performance of a quantum processor, and, in particular, to coupling between qubits in a superconducting quantum processor.

Quantum Devices

Quantum devices are structures in which quantum mechanical effects are observable. Quantum devices include circuits in which current transport is dominated by quantum mechanical effects. Such devices include spintronics, where electronic spin is used as a resource, and superconducting circuits. Both spin and superconductivity are examples of quantum mechanical phenomena. Quantum devices can be used, for example, in instrumentation, and in computing systems.

Quantum Computation

Quantum computation and quantum information processing include classes of vendible products. A quantum computer is a system that makes direct use of quantum mechanical phenomena (for example, superposition, tunneling, and quantum entanglement) to perform computations on data.

Data can be represented in a quantum computer by quantum binary digits (also referred to in the present application as qubits). Quantum computers may provide exponential speedup for certain classes of computational problems e.g., quantum physics simulation. Advantageous speedup may exist for other classes of problems.

In some implementations, a quantum computer includes a quantum circuit model. In other implementations, a quantum computer includes an adiabatic quantum computer. An adiabatic quantum computer can be useful for solving NP-hard optimization problems, for example.

Adiabatic Quantum Computation

Adiabatic quantum computation typically involves evolving a system from a known initial Hamiltonian (the Hamiltonian being an operator whose eigenvalues are allowed energies of the system) to a final Hamiltonian by gradually changing the Hamiltonian. A simple example of an adiabatic evolution is a linear interpolation between an initial Hamiltonian and a final Hamiltonian. An example is given by:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls a rate of evolution. As the system evolves, evolution coefficient s goes from 0 to 1 such that, at the beginning (s=0), evolution Hamiltonian $H_e$ is equal to initial Hamiltonian $H_i$, and, at the end (s=1), evolution Hamiltonian $H_e$ is equal to final Hamiltonian $H_f$.

Before an evolution begins, the system is typically initialized in a ground state of initial Hamiltonian Hi, and the goal is to evolve the system in such a way that the system ends up in a ground state of final Hamiltonian $H_f$. If the evolution is too fast, then the system can be excited to a higher energy state (e.g., a first excited state).

In the present application, an adiabatic evolution is defined as an evolution that satisfies an adiabatic condition expressed as follows:

$$\dot{s}|<1|dH_e/ds|0>|=\delta g^2(s)$$

where $\dot{s}$ is a time derivative of s, g(s) is a difference in energy between the ground state and the first excited state of the system (also referred to in the present application as the gap size) as a function of s, and δ is a coefficient much less than 1 (δ<<1). Generally, initial Hamiltonian $H_i$ and final Hamiltonian $H_f$ don't commute i.e., $[H_i, H_f] \neq 0$.

The process of changing a Hamiltonian in adiabatic quantum computing is referred to in the present application as evolution. It can be desirable for the rate of change of evolution coefficient s to be slow enough that the system remains in a ground state of evolution Hamiltonian $H_e$ during evolution, and transitions at anti-crossings (when the gap size is smallest) are avoided. An evolution schedule may be linear, non-linear, parametric, and the like. Further details on adiabatic quantum computing systems, methods, and apparatus are described, for example, in U.S. Pat. Nos. 7,135,701 and 7,418,283.

Quantum Annealing

Quantum annealing is a computation method that may be used to find a low-energy state of a system, typically preferably a ground state of a system. Similar in concept to classical annealing, quantum annealing relies on an underlying principle that natural systems tend towards lower energy states because lower energy states are more stable. While classical annealing uses classical thermal fluctuations to guide a system to a low-energy state (and, ideally, its global energy minimum), quantum annealing can use quantum effects (e.g., quantum tunneling) to reach a global energy minimum more accurately, and/or more quickly, than classical annealing. In quantum annealing, thermal effects and other noise may be present to aid the annealing. The final low-energy state may not be the global energy minimum.

Adiabatic quantum computation may be considered a special case of quantum annealing. In adiabatic quantum computation, the system ideally begins and remains in its ground state throughout an adiabatic evolution.

Those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing can use quantum mechanics as a source of disorder during the annealing process. To use quantum annealing to solve an optimization problem, the optimization problem is encoded in a problem Hamiltonian $H_P$, and the algorithm introduces quantum effects by adding a disordering Hamiltonian $H_D$ that does not commute with problem Hamiltonian $H_P$.

An example evolution is as follows:

$$H_E \propto A(t)H_D + B(t)H_P$$

where A(t) and B(t) are time-dependent envelope functions, and $H_E$ is an evolution Hamiltonian (similar to evolution Hamiltonian $H_e$ described above in the context of adiabatic quantum computation).

Disorder may be removed, or at least reduced, by removing, or at least reducing, the effect of disorder Hamiltonian $H_D$ (i.e., by reducing A(t)). Disorder may be first added, and then removed. In some implementations, a time-varying envelope function is placed on the problem Hamiltonian. A common disordering Hamiltonian $H_D$ can be expressed as follows:

$$H_D \propto -\frac{1}{2}\sum_{i=1}^{N}\Delta_i\sigma_i^x$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms.

A common problem Hamiltonian $H_P$ includes a first component proportional to diagonal single qubit terms, and a second component proportional to diagonal multi-qubit terms. The problem Hamiltonian, for example, can be expressed as follows:

$$H_P = -\frac{\varepsilon}{2}\left[\sum_{i=1}^{N}h_i\sigma_i^z + \sum_{j>i}^{N}J_{ij}\sigma_i^z\sigma_j^z\right]$$

where N represents the number of qubits, $\sigma_i^z$ is the Pauli z-matrix for the $i^{th}$ qubit, $h_i$ and $J_{ij}$ are dimensionless local fields for the qubits, and couplings between qubits, and $\varepsilon$ is a characteristic energy scale for $H_P$.

Here, the $\sigma_i^z$ and $\sigma_i^z\sigma_j^z$ terms are examples of diagonal terms. The former is a single-qubit term, and the latter a two-qubit term. In the present application, the terms "problem Hamiltonian" and "final Hamiltonian" are used interchangeably.

Hamiltonians such as $H_D$ and $H_P$ in the above equations may be physically realized in a variety of different ways. A particular example is realized by an implementation of superconducting qubits (e.g., superconducting flux qubits).

Quantum annealing of a system is similar to adiabatic quantum computation in that the system starts with an initial Hamiltonian and evolves through an evolution Hamiltonian to a final (problem) Hamiltonian $H_P$ whose ground state encodes a solution to the problem. If the evolution is slow enough, the system will typically settle either in the global minimum (i.e., the exact solution), or in a local minimum close in energy to the exact solution. Performance of the computation may be assessed by measuring a residual energy (a difference from an exact solution using an objective function) as a function of evolution time. The computation time is the time required to generate a residual energy below an acceptable threshold value. In quantum annealing, while problem Hamiltonian $H_P$ may encode an optimization problem, the system does not necessarily stay in the ground state at all times. The energy landscape of $H_P$ may be crafted so that its global minimum is an answer to the optimization problem to be solved, and low-lying local minima are good approximations to the answer.

A reduction of envelope function A(t) in quantum annealing may follow a defined schedule referred to in the present application as an annealing schedule, and is an example of an evolution schedule. In traditional forms of adiabatic quantum computation, the system typically begins and remains in its ground state throughout an evolution. In quantum annealing, the system may not remain in its ground state throughout the annealing schedule. Quantum annealing may be implemented as a heuristic technique, where low-energy states with energy near that of the ground state may provide approximate solutions to the problem.

Superconducting Qubits

There is a type of solid state qubit which is based on circuits of superconducting materials. Superconducting material conducts without electrical resistance under certain conditions, e.g. below a critical temperature, a critical current, or a magnetic field strength, or for some materials above a certain pressure. Superconducting effects that can underlie how superconducting qubits operate include a) flux quantization, and b) Josephson tunneling.

Flux can be quantized when a loop of superconducting material, threaded by a magnetic flux, is cooled below its superconducting critical temperature while the field is switched off. The supercurrent continues in an effort to maintain the flux. The flux is quantized. Superconductivity is a quantum mechanical effect. Current in the loop of superconducting material can be governed by a single wavefunction. For the wavefunction to be single-valued at points in the loop, the flux is quantized.

Josephson tunneling occurs when current in the loop of superconducting material tunnels through a minor interruption in the loop, e.g., when current tunnels through an insulating gap of a few nanometers. The amount of current can have a sinusoidal dependence on a phase difference across the minor interruption in the loop. The sinusoidal dependency is a non-linearity that can lead to anharmonicity in energy levels of the system.

Superconducting effects can be present in different configurations to give rise to different types of superconducting qubits, e.g., flux qubits, phase qubits, charge qubits, and hybrid qubits. Different types of qubits can have different topologies for the loops of superconducting material, and for their physical parameters e.g., inductance, capacitance, and persistent current.

Persistent Current

A superconducting qubit (for example, a superconducting flux qubit) may comprise a loop of superconducting material (also referred to in the present application as a qubit loop) that is interrupted by at least one Josephson junction. A qubit loop is also referred to in the present application as a body of the superconducting qubit.

Since the qubit loop is superconducting, the qubit loop effectively has no electrical resistance. Electrical current traveling in the qubit loop may experience no energy dissipation. If an electrical current is generated in the qubit loop e.g., by a magnetic flux signal, the electrical current may continue to circulate around the qubit loop even when the source of the magnetic flux signal is removed. The current may persist indefinitely until the current is interfered with or until the qubit loop is no longer superconducting.

For the purposes of the present application, the term "persistent current" is used to describe an electrical current circulating in a loop of superconducting material, the loop interrupted by at least one Josephson junction. The sign and magnitude of a persistent current may depend on several factors, including, but not limited to, a) a flux signal $\Phi_X$ coupled directly into the superconducting loop, and b) a flux signal $\Phi_{CJJ}$ (or $\Phi_{CO}$) coupled into a compound Josephson junction that interrupts the superconducting loop.

Quantum Processor

A quantum processor may take the form of a superconducting quantum processor. A superconducting quantum processor may include two or more superconducting qubits and their associated local bias devices. A superconducting quantum processor may also include coupling devices (also referred to in the present application as couplers) that can provide communicative coupling between superconducting qubits. Further details and examples quantum processors that may be used in conjunction with the present systems and devices are described in, for example, U.S. Pat. Nos. 7,533,068; 8,008,942; 8,195,596; 8,190,548; and 8,421,053.

The types of problems that may be solved by any particular implementation of a quantum processor, as well as the relative size and complexity of such problems, can depend on a number of factors including the number of qubits in the quantum processor and the connectivity (i.e., the availability of communicative couplings) between the qubits in the quantum processor.

Throughout this specification, the term "connectivity" is used to describe an upper bound on the number of paths that are physically available to communicatively couple individual qubits in a quantum processor without the use of intervening qubits. For example, a qubit with a connectivity of three is capable of being directly communicatively coupled to three other qubits i.e., a qubit with a connectivity of three is capable of being communicatively coupled to three other qubits without the use of intervening qubits. In other words, there are communicative coupling paths available to three other qubits, although in any particular application some or all (e.g., zero, one, two, or three) of those communicative coupling paths may be employed.

In a quantum processor employing coupling devices between qubits, a qubit having a connectivity of three, for example, can be selectively communicatively coupleable to each of three other qubits via a respective one of three coupling devices. Typically, the number of qubits in a quantum processor can limit the size of problems that may be solved, and the connectivity between the qubits in a quantum processor can limit the complexity of the problems that may be solved.

Many prior art techniques for using adiabatic quantum computation and/or quantum annealing to solve computational problems can involve finding ways to map (or embed) a representation of a problem on the quantum processor. For example, US Patent Publication 2008-0052055 describes solving a protein-folding problem by first casting the protein-folding problem as an Ising spin glass problem, and then embedding the Ising spin glass problem on a quantum processor. U.S. Pat. No. 8,073,808 describes solving a computational problem (e.g., an image-matching problem) by first casting the problem as a quadratic unconstrained binary optimization ("QUBO") problem, and then embedding the QUBO problem directly on a quantum processor. In both cases, a problem is solved by first casting the problem in a contrived formulation (e.g., Ising spin glass, QUBO, etc.) because that particular formulation maps directly to the particular implementation of the quantum processor being employed. In other words, an intermediate formulation can be used to re-cast the original problem into a form that accommodates the number of qubits and/or connectivity constraints in the particular implementation of the quantum processor, and then the intermediate formulation can be embedded on the quantum processor. An embedding approach can be motivated by limitations inherent in an architecture of the quantum processor being employed. For example, a quantum processor that employs only pair-wise interactions between qubits (i.e., a quantum processor employing coupling devices that provide communicative coupling between respective pairs of qubits but not, for example, between larger sets of qubits, such as three or more qubits) can be intrinsically well-suited to solve problems having quadratic terms (e.g., QUBO problems) because quadratic terms in a problem can be mapped directly to pair-wise interactions between qubits in the quantum processor.

BRIEF SUMMARY

A superconducting integrated circuit may be summarized as comprising a first superconducting device comprising a first superconducting loop, the first superconducting loop comprising a first superconducting trace in a first layer of the superconducting integrated circuit, a second superconducting device comprising a second superconducting loop, the second superconducting loop comprising a second superconducting trace in a second layer of the superconducting integrated circuit, the second layer overlying and/or neighboring the first layer, the second layer separated from the first layer by an intervening layer, and a crossing region in which the first superconducting loop crosses, in projection, the second superconducting loop, wherein at least a portion of the first superconducting trace inside the crossing region is narrower than at least a portion of the first superconducting trace outside the crossing region, at least a portion of the second superconducting trace inside the crossing region is narrower than at least a portion of the second superconducting trace outside the crossing region, the at least a portion of the first superconducting trace inside the crossing region follows a first circuitous path, the at least a portion of the second superconducting trace inside the crossing region follows a second circuitous path, and the first circuitous path and the second circuitous path are inductively proximate to each other for at least a portion of a length of the first circuitous path.

In some implementations, the first circuitous path and the second circuitous path at least partially overlie each other for at least a portion of a length of the first circuitous path.

In various of the above implementations, the first superconducting loop crosses the second superconducting loop substantially perpendicularly.

In various of the above implementations, each of the first superconducting trace and the second superconducting trace comprises a respective superconducting metal. The respective superconducting may metal include a superconducting metal selected from the group consisting of niobium and aluminum.

In various of the above implementations, the first superconducting device further comprises a first Josephson junction, the first Josephson junction interrupting the first superconducting loop, and the second superconducting device further comprises a second Josephson junction, the second Josephson junction interrupting the second superconducting loop.

In various of the above implementations, the first superconducting device is a first superconducting flux qubit, and the second superconducting device is a second superconducting flux qubit.

In various of the above implementations, the at least a portion of the first superconducting trace inside the crossing region includes four changes of direction.

In various of the above implementations, a first shape of the first circuitous path is congruent with a second shape of the second circuitous path.

In various of the above implementations, the intervening layer includes an insulating layer. The insulating layer may include a dielectric material and/or an air bridge. The dielectric material may include at least one of silicon dioxide or silicon nitride.

In various of the above implementations, the superconducting integrated circuit further comprises a coupling device coupled to the first superconducting device and the second superconducting device and communicatively coupled to provide mediated coupling between the first superconducting device and the second superconducting device.

In various of the above implementations, the at least a portion of the first superconducting trace inside the crossing region and the at least a portion of the second superconducting trace inside the crossing region each include one or more U-shaped profiles.

A quantum computer may be summarized as comprising the superconducting integrated circuit of various of the above implementations.

A method of tuning a magnitude of a communicative coupling between a first superconducting device and a second superconducting device, the magnitude of the communicative coupling being a sum of a magnitude of a mediated communicative coupling and a direct communicative coupling, may be summarized as comprising determining a target magnitude of the communicative coupling between the first and second superconducting device, determining a difference between the magnitude of the mediated communicative coupling and the target magnitude, determining a trimming margin based at least in part on the difference between the magnitude of the mediated coupling and the target magnitude, depositing a first superconducting loop of the first superconducting device in a first layer, depositing a second superconducting loop of the second superconducting device in a second layer, the second superconducting loop which crosses the first superconducting loop to form a crossing region, trimming by the trimming margin at least a portion of the first superconducting loop within the crossing region to follow a first circuitous path and be narrower than at least a portion of the first superconducting loop outside the crossing region, and trimming by the trimming margin at least a portion of the second superconducting loop within the crossing region to follow a second circuitous path and be narrower than at least a portion of the second superconducting loop outside the crossing region, such that the first circuitous path and the second circuitous path are inductively proximate to each other for at least a portion of a length of the first circuitous path.

In some implementations, the method further comprises depositing an intervening layer between the first layer and the second layer. The depositing an intervening layer between the first layer and the second layer may include depositing an insulating layer. The depositing an insulating layer may include depositing a layer of a dielectric material and/or forming an air bridge.

In various of the above implementations, the depositing a second superconducting loop of the second superconducting device in a second layer includes depositing a second superconducting loop of the second superconducting device in a second layer such that at least a portion of the second layer overlies at least a portion of the first layer.

In some implementations, the trimming by the trimming margin at least a portion of the first superconducting loop includes trimming the at least a portion of the first superconducting loop to a width between 0.5 µm and 2.0 µm.

In some implementations, the trimming by a trimming margin at least a portion of the first superconducting loop includes performing a trim etch of the at least a portion of the first superconducting loop. The performing a trim etch of the at least a portion of the first superconducting loop may include depositing a first hard mask to overlie at least a part of the at least a portion of the first superconducting loop, depositing a second hard mask to overlie at least a part of the first hard mask, depositing a photoresist layer to overlie at least a part of the second hard mask, patterning the photoresist layer to define a predetermined trim, and etching the at least a portion of the first superconducting loop to remove the predetermined trim.

A method of forming an integrated circuit may be summarized as comprising forming a first device, the first device comprising a first trace in a first layer of the integrated circuit, and forming a second device, the second device comprising a second trace in a second layer of the integrated circuit, at least a portion of the second trace inductively proximate to at least a portion of the first trace, whereby there is an inductive communicative coupling between the first device and the second device, and wherein the at least a portion of the first trace is narrower than at least another portion of the first trace.

In some implementations, the forming a second device includes forming a second device, at least a portion of the second trace being narrower than at least another portion of the second trace.

In some implementations, the forming a first device includes forming a first superconducting device, and the forming a second device includes forming a second superconducting device. The forming a first superconducting device may include depositing a superconducting material. The forming a first superconducting device may further include trimming at least a portion of the first trace to follow a first circuitous path and be narrower than at least another portion of the first trace.

In various of the above implementations, the forming a second superconducting device includes forming the second superconducting device inductively proximate a mediated coupling device, the mediated coupling device providing a communicative coupling between the first superconducting device and the second superconducting device. The forming the second superconducting device inductively proximate a mediated coupling device may include forming the second superconducting device inductively proximate a mediated coupling device that provides an anti-ferromagnetic (AFM) coupling between the first superconducting device and the second superconducting device, and whereby the inductive communicative coupling between the first superconducting device and the second superconducting device augments the anti-ferromagnetic coupling.

A superconducting integrated circuit may be summarized as comprising a first superconducting device comprising a first superconducting loop, the first superconducting loop comprising a first superconducting trace in a first layer of the superconducting integrated circuit, a second superconducting device comprising a second superconducting loop, the second superconducting loop comprising a second superconducting trace in a second layer of the superconducting integrated circuit, and a region in which a portion of the first superconducting loop overlaps a portion of the second superconducting loop, wherein at least a portion of the first superconducting trace within the region is narrower than at least a portion of the first superconducting trace outside the region, at least a portion of the second superconducting trace within the region is narrower than at least a portion of the second superconducting trace outside the region, the at least a portion of the first superconducting trace within the region follows a first path, the at least a portion of the second superconducting trace within the region follows a second path, and the first path and the second path are inductively proximate to each other for at least a portion of a length of the first path.

In some implementations, the first layer is a different layer from the second layer.

In some implementations, the first layer is separated from the second layer by an intervening layer.

In some implementations, the first path is a circuitous path. The first path and the second path may be congruent.

In some implementations, the first path and the second path at least partially overlie each other.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
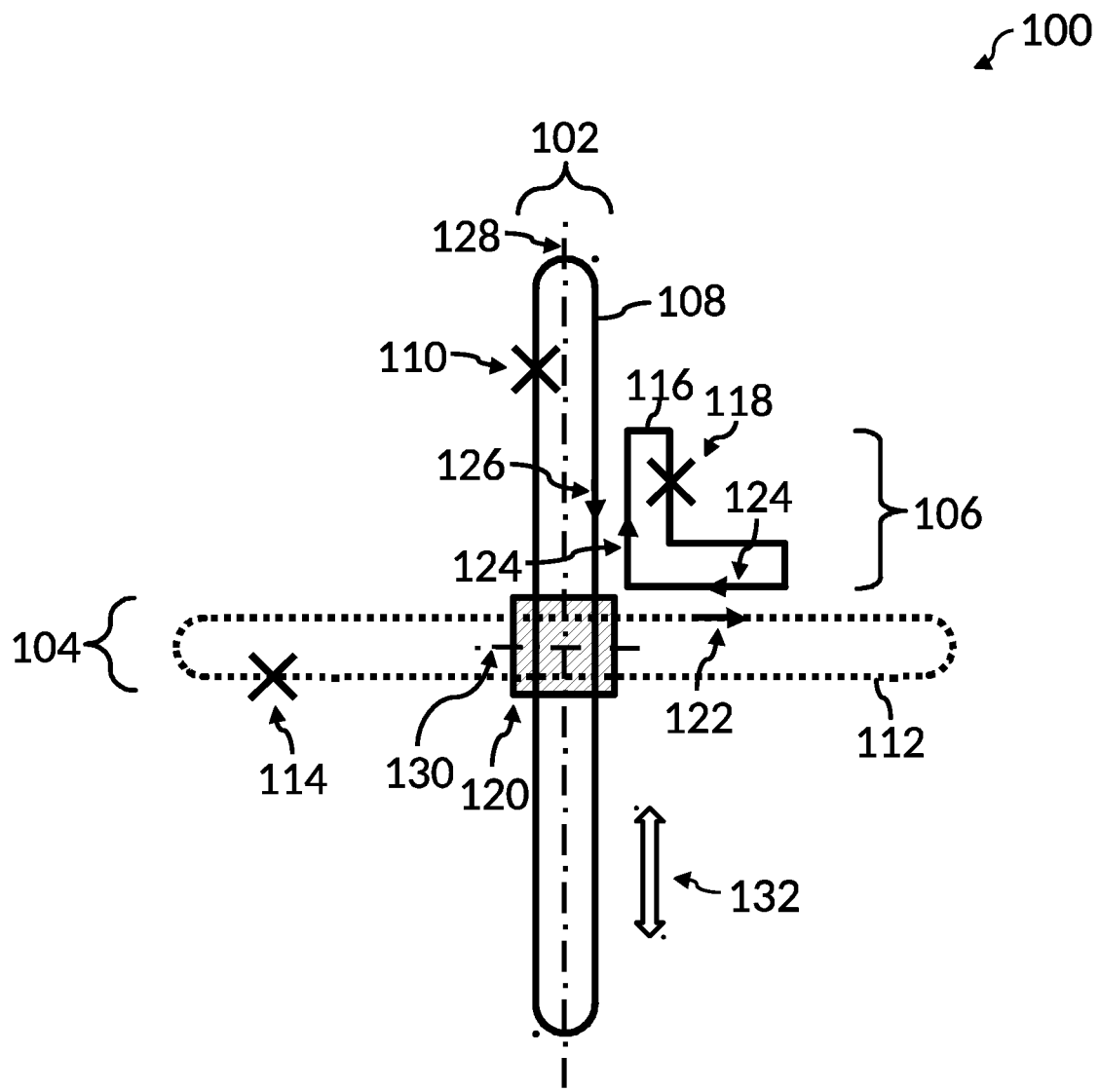
FIG. 1 is a schematic diagram of an exemplary mediated coupling layout, in accordance with the present systems and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with quantum processors, qubits, couplers, controller, readout devices and/or interfaces have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one example", "an example", "one embodiment" or "an embodiment" means that a particular feature, structure, or characteristic described in connection with the embodiment is included in at least one embodiment. Thus, the appearances of the phrases "in one example", "in an example", "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used herein and in the claims, "inductively proximate" refers to a structure (e.g., a device, a wire, or a trace) that is suitably oriented and sufficiently close to another structure that a current flow in the structure directly induces a current flow in the other structure. "Suitably oriented" typically means parallel, or at least non-orthogonal.

As used herein and in the claims, "overlapping" refers to a projection of a structure in plan view or elevational view that at least partially intersects or encompasses another structure without regard to a presence or absence of intervening structures.

As used herein and in the claims, "overlying" refers to a projection of a structure in plan view that at least partially intersects or encompasses another structure, typically with one or more intervening layers.

As used herein and in the claims, "neighboring" refers to a projection of a structure in elevational view that at least partially intersects or encompasses another structure, typically with one or more intervening materials.

Overlapping structures may be overlying (e.g., above/below) in a projection normal to a plan view or major face or surface (e.g., top or bottom) of a fabrication or chip and/or may be neighboring (e.g., side-by-side or end-to-end) in a projection normal to an elevational view or minor face or surface (e.g., edge) a fabrication or chip. An overlapping structure may or may not be inductively proximate another structure.

A structure may overlap another structure on the next wiring layer below, or two wiring layers below, and the like. Overlapped structures include partially overlapped structures and fully overlapped structures. A structure may be a superconducting loop or a portion of a superconducting loop, for example. The terms "overlap," "overlapping" and the like apply without respect to orientation, that is without respect to whether one structure resides above or below another structure, or to the side of another structure.

Overlapping structures may be proximate each other, i.e., have at least a portion of one structure running in parallel (or at least non-orthogonal) to at least a portion of the other structure, where the portions are sufficiently closely spaced for a current flowing in one structure to induce a current in the other structure. In the present application, inductively proximate structures can be directly inductively communicatively coupled to each other.

A structure may be inductively proximate another structure if the structures are in different layers of a multi-layer integrated circuit, and the structure is at least partially overlying the other structure. A structure may be inductively proximate another structure if the structures are in the same layer of a multi-layer integrated circuit, and the structure is at least partially neighboring the other structure. A structure may be inductively proximate another structure if the structures are in different layers and not overlying, provided the structure is suitably oriented and sufficiently close to the other structure that a current flow in the structure directly induces a current flow in the other structure.

Overlapping and neighboring structures are described, for example, with reference to FIGS. 13A and 13B below, respectively. Neighboring structures in the present application are separated by at least one intervening layer or material. Typically, the intervening layer or material is an insulating layer. In the case of a multi-layer integrated circuit, neighboring structures are typically in the same layer as each other and separated by an intervening material.

The headings and Abstract of the Disclosure provided herein are for convenience only and do not interpret the scope or meaning of the embodiments.

It can be desirable to improve a performance of a quantum processor. One approach to improving the performance is to increase an energy scale of the quantum processor. While the energy scale of the quantum processor can be increased by increasing the critical current of coupling devices in the quantum processor, there are constraints on how much the energy scale can be increased this way.

The systems and methods described below are directed to increasing the energy scale of the quantum processor by using direct qubit-to-qubit coupling (i.e., without an intervening coupling device), alone or in combination with mediated coupling via a coupling device. The systems and methods described below can provide direct coupling that can be tuned during fabrication. Advantages of the systems and methods described below can advantageously include a) a continuously variable tuning (rather than tuning in discrete steps), and b) the incurring of little or no space penalty on the integrated circuit.

Coupling between devices (e.g., a pair of superconducting qubits in a quantum processor) can be characterized by a coupling strength. The coupling strength quantifies a strength of interaction between the devices. The interaction between the devices can be ferromagnetic or antiferromagnetic depending on the sign of the coupling strength. By convention, a positive coupling strength can characterize an antiferromagnetic interaction, and a negative coupling strength can characterize a ferromagnetic interaction. It can be beneficial for a quantum processor to include both ferromagnetic (FM) and antiferromagnetic (AFM) interactions.

A definition of FM and AFM interactions can be based on a direction of a persistent current in each qubit of a pair of communicatively coupled qubits, and how the persistent current affects a Hamiltonian of a two-qubit system. When the mutual inductance (i.e., the coupling) between the two qubits is positive, it can follow that currents in the two qubits flow in opposite directions. This is referred in the present application as an AFM interaction.

In some implementations, FM coupling is achieved by biasing a compound Josephson junction of a coupling device. In some implementations, it is preferentially beneficial to improve AFM coupling (rather than FM coupling) using direct coupling of the communicatively coupled qubits.

A mutual inductance can be a measure of a coupling between two inductors, for example between two superconducting qubits. An energy scale E for specifying a problem Hamiltonian in a quantum processor can be expressed as follows:

$$E = M_{AFM} I_P^2$$

where $M_{AFM}$ is an anti-ferromagnetic mutual inductance between two communicatively-coupled superconducting devices (e.g., two superconducting qubits communicatively coupled by a coupling device), and $I_p$ is an average persistent current of the two superconducting devices.

A performance of a quantum processor can be improved by increasing the energy scale E, for example by increasing one or both of mutual inductance $M_{AFM}$ and average persistent current $I_P$.

The mutual inductance between two superconducting devices communicatively-coupled by a coupling device can be limited by: a) an inductance of the coupling device, and b) a respective mutual inductance between each superconducting device and the coupling device.

An anti-ferromagnetic mutual inductance between two communicatively-coupled superconducting devices can be expressed as follows:

$$M_{AFM} = M_1 M_2 \chi_{AFM}$$

where $M_1$ is a mutual inductance between the first superconducting device and the coupling device, $M_2$ is a mutual inductance between the second superconducting device and the coupling device, and $\chi_{AFM}$ is a magnetic susceptibility of the coupling device.

The magnetic susceptibility of the coupling device $\chi_{AFM}$ can be a measure of how strongly the coupling device may communicatively couple the two superconducting devices. The magnetic susceptibility of the coupling device can be set at least in part by a flux bias of the coupling device $\phi_{CO}$.

Increasing a critical current $I_C$ of the coupling device can cause the magnetic susceptibility of the coupling device $\chi_{AFM}$ to increase up to an upper limit of $1/L_{CO}$, where $L_{CO}$ is an inductance of the coupling device. Increasing the persistent current of the coupling device can cause the magnetic susceptibility of the coupling device $\chi_{AFM}$ to increase. For example, in some implementations, the magnetic susceptibility of the coupling device $\chi_{AFM}$ can be at least approximately doubled when the persistent current is increased ten-fold.

Increasing the persistent current of the coupling device can also increase the coupling device's screening parameter (also referred to in the present application as beta $\beta$). The beta of the coupling device is a parameter that describes a behavior of a superconducting loop in the coupling device. The beta of the coupling device can be expressed as follows:

$$\beta = 2\pi L_{CO} I_C / \phi_0$$

where $\phi_0$ is a flux quantum of the superconducting loop.

Increasing the beta of the coupling device, for example by increasing the critical current $I_C$, can increase a slope of the magnetic susceptibility of the coupling device $\chi_{AFM}$ in the ferromagnetic region. Increasing the critical current $I_C$ of a coupling device can reduce a precision with which ferromagnetic and/or anti-ferromagnetic couplings can be specified.

One approach to increasing the energy scale of a quantum processor is to increase the critical current of the coupling device. As described above, increasing the critical current $I_C$ of the coupling device can increase the beta $\beta$ of the coupling device. Increasing beta $\beta$ by increasing the critical current of the coupling device can increase the magnetic susceptibility of the coupling device $\chi_{AFM}$ i.e., increasing beta $\beta$ can increase the derivative $dI_P/d\phi_x$ of the current flowing in the body of the coupling device with respect to an applied flux. There is a limit to how much the magnetic susceptibility can be increased by increasing the critical current. The magnetic susceptibility is a non-linear function, and so increasing the critical current of the coupling device may cause the magnetic susceptibility $\chi_{AFM}$ to increase with diminishing returns.

Another approach to increasing the energy scale of a quantum processor is to implement a direct coupling between the bodies of two or more superconducting devices. In some implementations, there is a direct coupling (i.e., without an intervening device) between the bodies of a pair of superconducting devices that are also communicatively coupled by a coupling device. In some implementations, the direct coupling is an inductive coupling. The pair of superconducting devices communicatively coupled by the coupling device may be a) a pair of superconducting qubits, b) a superconducting qubit and another superconducting device, or c) any pair of superconducting loops that may be coupled to each other, e.g., superconducting qubits, quantum flux parametrons (QFPs), multipliers, and L-tuners. A pair of superconducting devices, each of which comprises a loop of superconducting material interrupted by at least one Josephson junction, may be configured to induce a direct coupling between the superconducting devices of the pair of superconducting devices.

A detailed description of such other superconducting devices is given in, for example, U.S. Pat. Nos. 8,169,231 and 7,843,209, and US Patent Publications 2011-0057169 A1 and 2011-0060780 A1. Example systems and methods for increasing the energy scale of a quantum processor are given in U.S. Pat. No. 9,129,224.

Direct coupling between superconducting devices may be undesirable because, for example, direct coupling may cause unwanted crosstalk between the superconducting devices. The present application recognizes that adding a known anti-ferromagnetic or ferromagnetic direct coupling between two communicatively-coupled superconducting devices may beneficially take advantage of an asymmetric susceptibility of the coupling device.

For example, while, in the absence of direct coupling, mutual inductance $M_{AFM}$ can be limited to $M_1 M_1 \chi_{AFM}$ (as discussed above), a stronger anti-ferromagnetic coupling may be realized by adding a direct coupling as follows:

$$M_{AFM} = M_1 M_1 \chi_{AFM} + M_{QQ}$$

where $M_{QQ}$ is a mutual inductance of the direct coupling.

A direct coupling may be added between communicatively-coupled superconducting devices (e.g., a pair of communicatively-coupled superconducting devices) by configuring the devices to induce a direct ferromagnetic or anti-ferromagnetic coupling between them. Configuring qubits (e.g., a pair of qubits) to induce a direct coupling between them can include, for example, configuring a crossing geometry of the qubits.

As described above, each qubit can comprise a loop of superconducting material (also referred to in the present application as a superconducting loop) interrupted by at least one Josephson junction. In some implementations, the Josephson junction is a compound Josephson junction. In some implementations, the Josephson junction is a compound-compound Josephson junction i.e., a compound Josephson junction in which at least one of the constituent Josephson junctions is itself a compound Josephson junction.

Direct coupling between qubits may be an anti-ferromagnetic coupling, a ferromagnetic coupling, or a zero coupling.

In some implementations, a zero direct coupling can be achieved by arranging a respective major axis of each of a pair of communicatively coupled qubits to be orthogonal to each other, with or without trimming of qubit traces in a region in which the qubits overlap.

In some implementations, a ferromagnetic coupling can be achieved by trimming qubit traces, for example so that the traces have an outward jog (see, e.g., FIG. 7).

The various implementations described in the present application provide systems and methods for increasing an energy scale of a quantum processor by adding a direct coupling between communicatively-coupled superconducting devices, for example between a pair of superconducting qubits. The communicatively-coupled superconducting devices may additionally have a communicative coupling that is mediated by a coupling device.

The various implementations described in the present application also provide systems and methods for increasing an energy scale of a quantum processor by increasing a linearity of a response or a susceptibility of coupling devices in a quantum processor.

As an illustrative example, a superconducting quantum processor designed to perform adiabatic quantum computation and/or quantum annealing is used in the description that follows. However, a person of skill in the art will appreciate that the present systems and methods may be applied to other forms of quantum processor hardware, and to quantum processors implementing other forms of quantum algorithm(s) (e.g., adiabatic quantum computation, quantum annealing, and gate and/or circuit-based quantum computing).

FIG. 1 is a schematic diagram of an exemplary mediated coupling layout 100. Exemplary mediated coupling layout 100 includes a pair of superconducting devices 102 and 104 communicatively coupled to each other by a coupling device 106. In exemplary mediated coupling layout 100, there is little or no direct coupling induced between two superconducting devices 102 and 104. In exemplary layout 100, there is a mediated communicative coupling between superconducting devices 102 and 104. The mediated communicative coupling can be mediated by coupling device 106.

Superconducting device 102 includes a superconducting loop 108 interrupted by a Josephson junction 110. Superconducting device 104 includes a superconducting loop 112 (shown as a dotted line in FIG. 1) interrupted by a Josephson junction 114. Josephson junctions (e.g., Josephson junctions 110 and 114) are represented in FIGS. 1-5, 6A, 7A, and 8A of the present application by an X.

A superconducting loop is defined in the present application as a closed loop of material that is superconducting below a critical temperature. In some implementations, a superconducting loop is a closed loop of superconducting wire. In some implementations, a superconducting loop is a superconducting circuit trace (also referred to in the present application as a trace) that runs in a closed loop in a superconducting integrated circuit. A superconducting trace is a path in a superconducting integrated circuit. A superconducting trace comprises a line of superconducting material that allows current to flow, for example in a closed loop or between component circuits of the superconducting integrated circuit. In some implementations, a superconducting loop includes superconducting wire and at least one superconducting trace.

In some implementations, a superconducting loop is an elongated loop having a major axis and a minor axis. An orientation of a superconducting loop may be defined as a direction of the major axis. For example, superconducting loop 108 has a major axis 128 and a minor axis 130. An orientation 132 of superconducting loop 108 may be defined as a direction of major axis 128. A superconducting integrated circuit is an integrated circuit that includes one or more superconducting component circuits.

In some implementations, a superconducting loop is a trace formed in a layer of a multi-layer superconducting integrated circuit. In some implementations, one or both of superconducting loops 108 and 112 comprise a superconducting metal, e.g., niobium and/or aluminum. In some implementations, each of superconducting loops 108 and 112 is a trace formed in a respective layer of a multi-layer superconducting integrated circuit, each respective layer separated from the other by a respective insulating layer. In some implementations, the respective insulating layer includes silicon dioxide and/or silicon nitride.

Superconducting devices 102 and 104 may include more than one Josephson junction. In some implementations, one or both of Josephson junctions 110 and 114 is a compound Josephson junction. In some implementations, one or both of Josephson junctions 110 and 114 is a compound-compound Josephson junction. A compound Josephson junction is a Josephson junction comprising a pair of Josephson junctions electrically in parallel with each other. A compound-compound Josephson junction is a compound Josephson junction in which at least one constituent Josephson junction is a compound Josephson junction.

Coupling device 106 is operable to communicatively couple superconducting devices 102 and 104 to each other by a mutual inductance between superconducting loops 108 and 112 of superconducting devices 102 and 104, respectively. Coupling device 106 comprises a superconducting loop 116. In some implementations, such as layout 100 of FIG. 1, superconducting loop 116 is interrupted by a Josephson junction 118. Josephson junction 118 may be a compound Josephson junction or a compound-compound Josephson junction. In some implementations, coupling device 106 comprises more than one Josephson junction.

In FIG. 1, superconducting device 102 is drawn with a solid line while superconducting device 104 is drawn with a dotted line to illustrate more clearly the crossing geometry of superconducting devices 102 and 104. In exemplary layout 100, superconducting device 102 crosses superconducting device 104 substantially perpendicularly. A region where superconducting devices 102 and 104 cross is referred to in the present application as a crossing region 120. The present application describes layouts of crossing region 120 where a portion of superconducting device 102 overlies a portion of superconducting device 104 to provide coupling. See, for example, the layouts of crossing regions shown in FIGS. 6B, 7B, 8B, and 8C which may be adapted for use in the arrangement of FIG. 1. Other layouts of crossing region 120 having a circuitous path may be similarly used. A magnitude of a direct communicative coupling of superconducting devices 102 and 104 can be controlled, for example, by selective trimming of superconducting loops 108 and 112 in crossing region 120 during fabrication and, in some implementations, without incurring a space penalty on a superconducting circuit.

In the present application, one superconducting device is referred to as crossing another superconducting device substantially perpendicularly when a portion (e.g., a trace or a loop) of the one superconducting device crosses at an angle of 90°±10° to a portion of the other superconducting device.

In some implementations, a superconducting device comprises a superconducting loop. An orientation of the superconducting device may be defined by an orientation of the superconducting loop. In some implementations, the superconducting loop has an elongated shape having a major axis in a direction of the elongation and a minor axis perpendicular to the major axis. In this case, the orientation of the superconducting loop can be defined by an orientation of the major axis. One superconducting loop can be referred to as crossing another superconducting loop substantially perpendicularly when the major axis of the one superconducting loop crosses at an angle of 90°±10° to the major axis of the other superconducting loop. Referring to the implementation shown in FIG. 1, superconducting device 102 is substantially perpendicular to superconducting device 104 as the major axes (also referred to in the present application as the longitudinal axes) of superconducting loops 108 and 112 cross at an angle of 90°±10°.

An excitation current 122 in superconducting loop 112 can induce a current 124 in coupling device 106, which in turn can induce a current 126 in superconducting loop 108, thereby providing a mediated inductive communicative coupling between superconducting devices 102 and 104.

In some implementations, a direct coupling can be nullified by applying a bias to coupling device 106. In some implementations, a digital-to-analog converter (DAC) is used to apply a bias to nullify a direct coupling and/or to adjust a strength of a combined direct and mediated coupling.

In some implementations, superconducting devices 102 and 104 are a pair of superconducting qubits. In other implementations, superconducting device 102 is a superconducting qubit, and superconducting device 104 is another type of superconducting device to which superconducting device 102 is communicatively coupled by coupling device 106. For example, superconducting device 104 may be one of a Quantum Flux Parametron (QFP), a multiplier, a DAC, and a tunable Josephson inductance (also referred to in the present application as an inductance tuner or L-tuner for short). In yet other implementations, superconducting devices 102 and 104 form a suitable combination of a pair of communicatively-coupled superconducting devices, for example, superconducting qubits, QFPs, multipliers, and/or L-tuners.

A mutual inductance between superconducting devices 102 and 104 can be expressed as follows:

$$M_{AFM} = M_{102} M_{104} \chi_{106}$$

where $M_{102}$ is a mutual inductance between superconducting device 102 and coupling device 106, $M_{104}$ is a mutual inductance between superconducting device 104 and coupling device 106, and $\chi_{106}$ is a magnetic susceptibility of coupling device 106. Since, in exemplary layout 100, superconducting loop 108 of superconducting device 102 runs substantially perpendicular to superconducting loop 112 of superconducting device 104, there is little or no direct coupling induced between superconducting devices 102 and 104 by a mutual inductance between superconducting loops 108 and 112.

A direct coupling may be induced between a pair of communicatively-coupled superconducting devices by arranging a geometry of the superconducting devices with respect to each other. For example, a direct coupling may be induced by arranging at least a portion of a superconducting loop of one of the superconducting devices to be at a non-orthogonal angle to at least a portion of a superconducting loop of the other superconducting device.

The crossing of at least a portion of the superconducting loops at a non-orthogonal angle to each other can cause crosstalk between the two superconducting loops. Crosstalk may add to the mutual inductance of the two communicatively-coupled superconducting loops. If the two superconducting devices are elements of a quantum processor, crosstalk can result in an increase in an energy scale of the quantum processor. While, in some situations, crosstalk can be undesirable, crosstalk induced between a pair of superconducting devices may be advantageously used for controllably increasing the energy scale of the quantum processor which may beneficially improve a performance of the quantum processor. Improving a performance of the quantum processor may include improving a quality of solutions produced by the quantum processor and/or reducing a time to reach the solutions.

Figure 2:
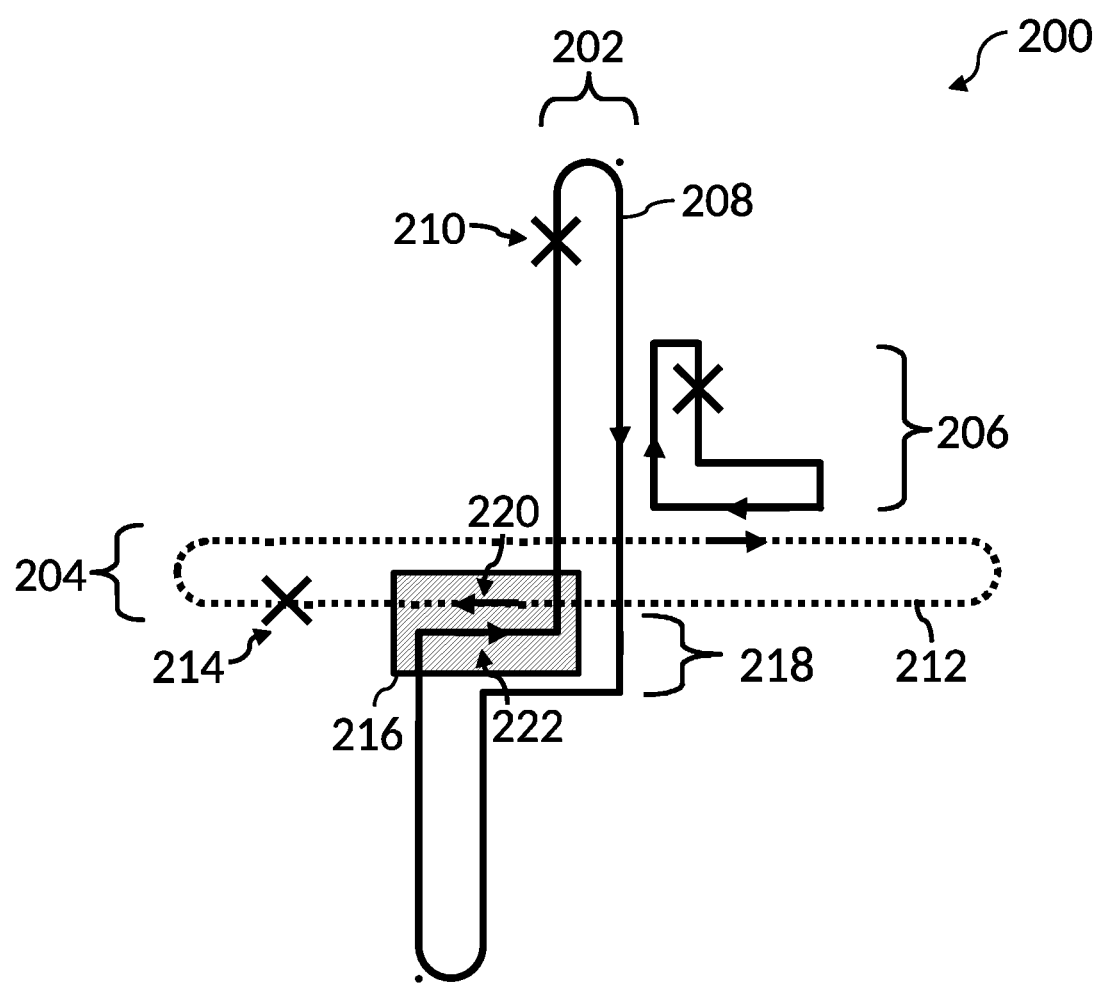
FIG. 2 is a schematic diagram of an exemplary hybrid mediated and direct coupling layout, in accordance with the present systems and methods.

FIG. 2 is a schematic diagram of an exemplary hybrid mediated and direct coupling layout 200. Exemplary layout 200 includes a pair of superconducting devices 202 and 204 communicatively coupled to each other by a coupling device 206. Superconducting device 202 is drawn with a solid line while superconducting device 204 is drawn with a dotted line to more clearly illustrate the crossing geometry of superconducting devices 202 and 204. In exemplary layout 200, superconducting device 202 crosses superconducting device 204 substantially perpendicularly.

Superconducting device 202 includes a superconducting loop 208 interrupted by a Josephson junction 210. Superconducting device 204 includes a superconducting loop 212 interrupted by a Josephson junction 214. In some implementations, one or both of superconducting loops 208 and 212 comprise a superconducting metal, e.g., niobium and/or aluminum.

Superconducting devices 202 and 204 may include more than one Josephson junction. In some implementations, one or both of Josephson junctions 210 and 214 is a compound Josephson junction. In some implementations, one or both of Josephson junctions 210 and 214 is a compound-compound Josephson junction. In some implementations, superconducting devices 202 and 204 are superconducting qubits, e.g., superconducting flux qubits.

Coupling device 206 is operable to communicatively couple superconducting devices 202 and 204 to each other by a mutual inductance between superconducting loops 208 and 212, respectively.

Unlike exemplary layout 100 of FIG. 1, a portion of superconducting loop 208 of superconducting device 202 is arranged at a non-orthogonal angle to a portion of superconducting loop 212 of superconducting device 204 in a shaded region 216. Such an arrangement may induce a mutual inductance $M_{QQ}$ (also referred to in the present application as a direct coupling) between superconducting devices 202 and 204. The direct coupling may be a direct inductive coupling. In exemplary layout 200 of FIG. 2, a portion of superconducting loop 208 of superconducting device 202 is arranged to be substantially parallel to a portion of superconducting loop 212 of superconducting device 204 in shaded region 216.

In some implementations, a portion of superconducting loop 208 of superconducting device 202 has a jog, i.e., a brief abrupt change in orientation interrupting an orientation of the rest of the loop. For example, layout 200 includes a jog 218. Jog 218 causes a portion of superconducting loop 208 to be substantially parallel to a portion of superconducting loop 212 of superconducting device 204. In some implementations, superconducting loop 208 of superconducting device 202 is Z-shaped. In other implementations, superconducting loop 208 of superconducting device 202 is L-shaped.

An excitation current 220 in superconducting loop 212 can induce a current 222 in superconducting loop 208.

In addition to mutual inductance $M_{QQ}$ induced by proximity and relative orientation of superconducting loops 208 and 212, coupling device 206 (which provides communicatively coupling between superconducting devices 202 and 204) can provide a mutual inductance $M_{AFM}$ as described above. The induced mutual inductance can provide an anti-ferromagnetic coupling, for example. The total mutual inductance between superconducting devices 202 and 204 can include contributions from mutual inductances $M_{AFM}$ and $M_{QQ}$.

An orientation of a direct coupling induced between superconducting devices 202 and 204 at or in the vicinity of shaded region 216 may depend at least in part on a direction of current flow in each of superconducting loops 208 and 212 of superconducting devices 202 and 204. The orientation of the direct coupling may depend on a geometry of traces of superconducting devices 202 and 204 in a region where traces of superconducting devices 202 and 204 overlap. A crossing geometry of superconducting device 202 and 204 (e.g., at or in the vicinity of shaded region 216) can at least in part determine whether mutual inductance $M_{QQ}$ is ferromagnetic, anti-ferromagnetic, or close to zero. In the example illustrated in FIG. 2, mutual inductance $M_{QQ}$ is anti-ferromagnetic, and mutual inductance $M_{QQ}$ adds to mutual inductance $M_{AFM}$, thereby increasing an anti-ferromagnetic (AFM) coupling of superconducting devices 202 and 204. That is, if mutual inductance $M_{QQ}$ is AFM, then mutual inductance $M_{QQ}$ can augment mutual inductance $M_{AFM}$, by adding to a mediated coupling provided by coupling device 206, and thereby increasing the total mutual inductance.

The present application includes a description of layouts that could be adapted to shaded region 216 where a portion of superconducting device 202 overlies a portion of superconducting device 204 to provide coupling. See, for example, the layouts of crossing regions shown in FIGS. 6B, 7B, 8B, and 8C which may be adapted for use in the arrangement of FIG. 2. Other layouts of shaded region 216 having a circuitous path may be similarly used. A magnitude of a direct communicative coupling of superconducting devices 202 and 204 can be controlled, for example, by selective trimming of superconducting loops 208 and 212 during fabrication and, in some implementations, advantageously, without incurring a space penalty on a superconducting circuit.

The present systems and methods apply more generally to communicatively-coupled superconducting devices, each superconducting device comprising a loop of superconducting material. The present systems and methods may provide a tunable inductive coupling between superconducting devices, with a direct inductive coupling between the superconducting devices adjustable during fabrication.

Figure 3:
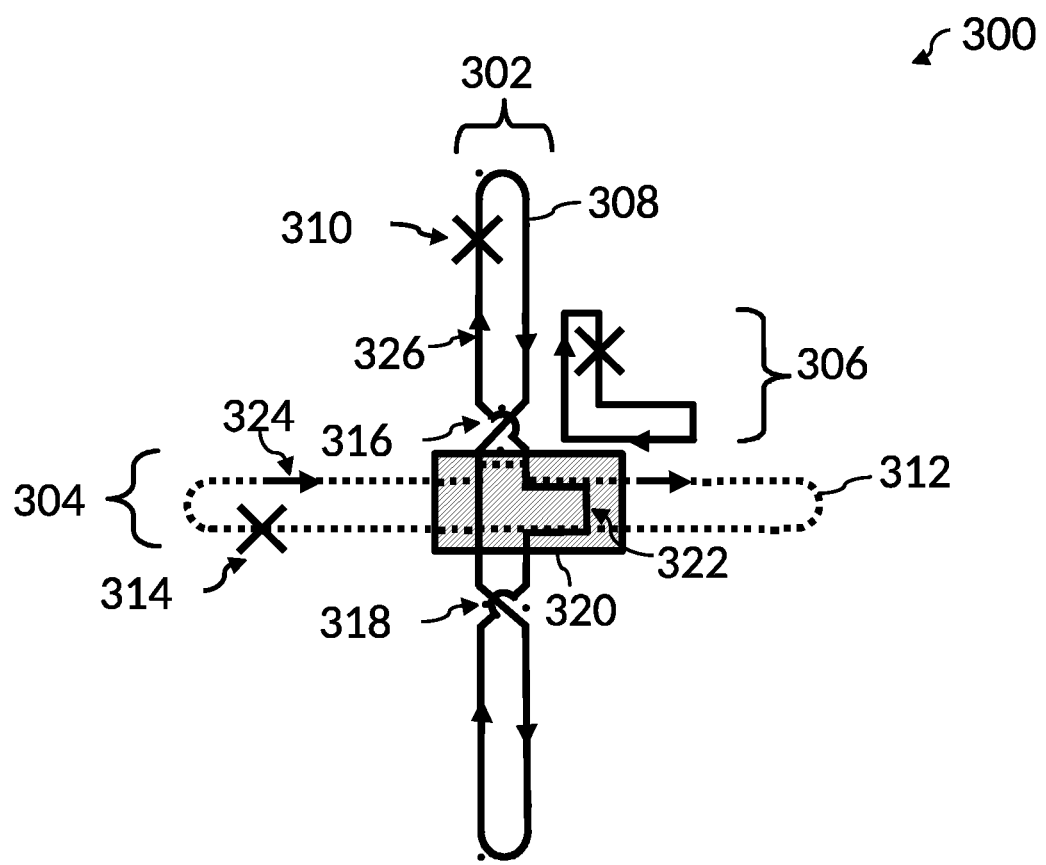
FIG. 3 is a schematic diagram of another exemplary hybrid mediated and direct coupling layout, in accordance with the present systems and methods.

FIG. 3 is a schematic diagram of another exemplary mediated and direct coupling layout 300. Exemplary layout 300 includes a pair of superconducting devices 302 and 304 that are communicatively coupled to each other by a coupling device 306. Superconducting device 302 is drawn with a solid line while superconducting device 304 is drawn with a dotted line to more clearly illustrate the crossing geometry of superconducting devices 302 and 304.

Superconducting device 302 includes a superconducting loop 308 interrupted by a Josephson junction 310. Superconducting device 304 includes a superconducting loop 312 interrupted by a Josephson junction 314.

A superconducting loop topologically formed by a 180° out-of-plane rotation of a portion of the superconducting loop is referred to in the present application as a superconducting loop with a crossover. Current through the superconducting loop on one side of the crossover flows in a clockwise direction around the loop, and current through the superconducting loop on the other side of the crossover flows in an anti-clockwise direction around the loop. The two segments of the superconducting loop that cross over each other are galvanically isolated from each other at the crossover. A superconducting loop may include more than one crossover, for example superconducting loop 308 includes two crossovers 316 and 318.

The crossing geometry of superconducting devices 302 and 304 of FIG. 3 at or in the vicinity of a crossing region 320 can produce a direct coupling $M_{QQ}$ between superconducting loops 308 and 312 of superconducting devices 302 and 304, respectively. Crossing region 320 is shown as a shaded region in FIG. 3 for clarity.

A vector normal to a plane that includes an area of superconducting loop 308 in crossing region 320 has a substantially opposite orientation to both of the following: i) a vector normal to a plane that includes an area of superconducting loop 308 outside crossing region 320, and ii) a vector normal to a plane that includes an area of superconducting loop 312 of superconducting device 304. Substantially opposite orientation of one vector relative to another refers to an orientation of 180°±10° between the two vectors.

A portion of superconducting loop 308 of superconducting device 302 has a jog 322 which causes a portion of superconducting loop 308 to be substantially parallel to a portion of superconducting loop 312 of superconducting device 304. Where the portions of superconducting loops 308 and 312 run parallel to each other, the portions of superconducting loops 308 and 312 can overlie each other and/or neighbor each other. In some implementations, superconducting loops 308 and 312 define traces in separate layers of a multi-layer superconducting integrated circuit. The traces of superconducting loops 308 and 312 may overlie each other and/or neighbor each other, and may be separated by an electrically insulating layer (e.g., a layer of a dielectric material), for example. The overlying and/or adjacency of portions of superconducting loop 308 and 312 can generate a mutual inductance, and the mutual inductance can provide a direct inductive communicative coupling between superconducting devices 302 and 304.

An excitation current 324 in superconducting loop 312 can induce a current 326 in superconducting loop 308.

The presence of crossovers 316 and 318 in superconducting loop 308 can cause (by induction) a current flowing in an anti-clockwise direction in crossing region 320 to flow in a clockwise direction in a portion of superconducting loop 308 outside crossing region 320. The portion of superconducting loop 308 outside crossing region 320 is also referred to in the present application as a main body of superconducting device 302. Mutual inductance $M_{QQ}$ can add to mutual inductance $M_{AFM}$, thereby increasing an AFM coupling of superconducting devices 302 and 304.

The present application includes descriptions of layouts that could be adapted to crossing region 320 where a portion of superconducting device 302 overlies a portion of superconducting device 304 to provide coupling. See, for example, the layouts of crossing regions shown in FIGS. 6B, 7B, 8B, and 8C which may be adapted for use in mediated and direct coupling layout 300 of FIG. 3. Other layouts of crossing region 320 having a circuitous path may be similarly used. A magnitude of a direct communicative coupling of superconducting devices 302 and 304 can be controlled, for example, by selective trimming of superconducting loops 308 and 312 during fabrication and, in some implementations, advantageously, without incurring a space penalty on a superconducting circuit.

Figure 4:
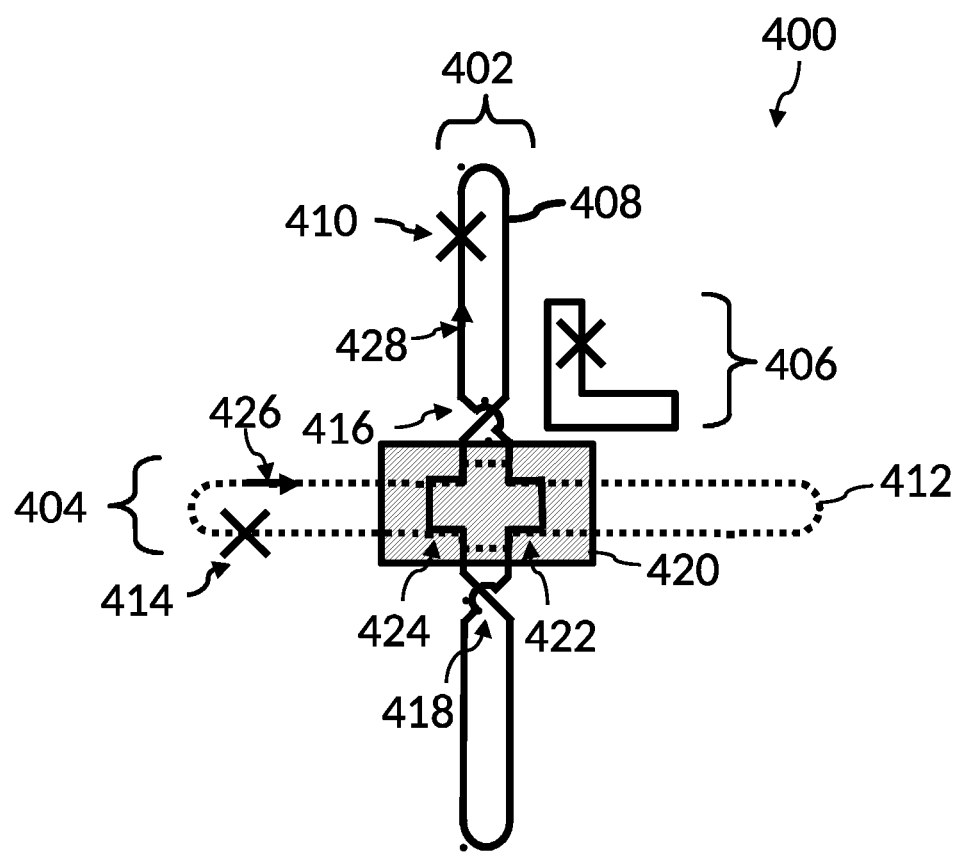
FIG. 4 is a schematic diagram of another exemplary hybrid mediated and direct coupling layout, in accordance with the present systems and methods.

FIG. 4 is a schematic diagram of another exemplary layout 400. Layout 400 includes a pair of superconducting devices 402 and 404 that are communicatively coupled to each other by a coupling device 406. Superconducting device 402 is drawn with a solid line while superconducting device 404 is drawn with a dotted line to more clearly illustrate the crossing geometry of superconducting devices 402 and 404.

Superconducting device 402 includes a superconducting loop 408 interrupted by a Josephson junction 410. Superconducting device 404 includes a superconducting loop 412 interrupted by a Josephson junction 414. Superconducting loop 408 includes crossovers 416 and 418.

The crossing geometry of superconducting devices 402 and 404 of FIG. 4 at, or in the vicinity of, a crossing region 420 can produce a direct coupling $M_{QQ}$ between superconducting loops 408 and 412 of superconducting devices 402 and 404, respectively. Crossing region 420 is shown as a shaded region in FIG. 4 for clarity.

A vector normal to a plane that includes an area of superconducting loop 408 in crossing region 420 has a substantially opposite orientation to both of the following: i) a vector normal to a plane that includes an area of superconducting loop 408 outside crossing region 420, and ii) a vector normal to a plane that includes an area of superconducting loop 412 of superconducting device 404.

Each of two portions of superconducting loop 408 of superconducting device 402 has a respective jog which causes jogged portions 422 and 424, respectively, of superconducting loop 408 to be substantially parallel to a portion of superconducting loop 412 of superconducting device 404. Where the portions of superconducting loops 408 and 412 run parallel to each other, the portions of superconducting loops 408 and 412 can overlie each other and/or neighbor each other. In some implementations, superconducting loops 408 and 412 define traces in separate layers of a multi-layer superconducting integrated circuit. The traces of superconducting loops 408 and 412 may overlie each other and/or neighbor each other, and may be separated by an electrically insulating layer (e.g., a layer of a dielectric material), for example. The overlying and/or adjacency of portions of superconducting loop 408 and 412 can generate a mutual inductance, and the mutual inductance can provide a direct inductive communicative coupling between superconducting devices 402 and 404.

An excitation current 426 in superconducting loop 412 can induce a current 428 in superconducting loop 408.

The presence of crossovers 416 and 418 in superconducting loop 408 causes a current flowing in an anti-clockwise direction in crossing region 420 to flow in a clockwise direction in the portion of superconducting loop 408 outside crossing region 420 (also referred to in the present application as a main body of superconducting device 402). Mutual inductance $M_{QQ}$ can add to mutual inductance $M_{AFM}$, thereby increasing an AFM coupling of superconducting devices 402 and 404.

For layouts 300 and 400 of FIGS. 3 and 4, respectively, a mutual inductance may be increased by increasing a length over which superconducting loops or traces overlie and/or neighbor each other. Direct coupling produced between the bodies of two communicatively-coupled superconducting devices (e.g., superconducting device 302 and 304 of FIG. 3) in combination with a mediated coupling (e.g., by coupling device 306 of FIG. 3) may result in a communicative coupling between superconducting devices that is ferromagnetic, anti-ferromagnetic, or substantially equal to zero. Zero coupling may result, for example, when a mediated coupling and a direct coupling cancel each other out.

The present application includes descriptions of layouts that could be adapted to crossing region 420 where a portion of superconducting device 402 overlies a portion of superconducting device 404 to provide coupling. See, for example, the layouts of crossing regions shown in FIGS. 6B, 7B, 8B, and 8C which may be adapted for use in layout 400 of FIG. 4. Other layouts of crossing region 420 having a circuitous path may be similarly used. A magnitude of a direct communicative coupling of superconducting devices 402 and 404 can be controlled, for example, by selective trimming of superconducting loops 408 and 412 during fabrication and, in some implementations, advantageously, without incurring a space penalty on a superconducting circuit.

Figure 5:
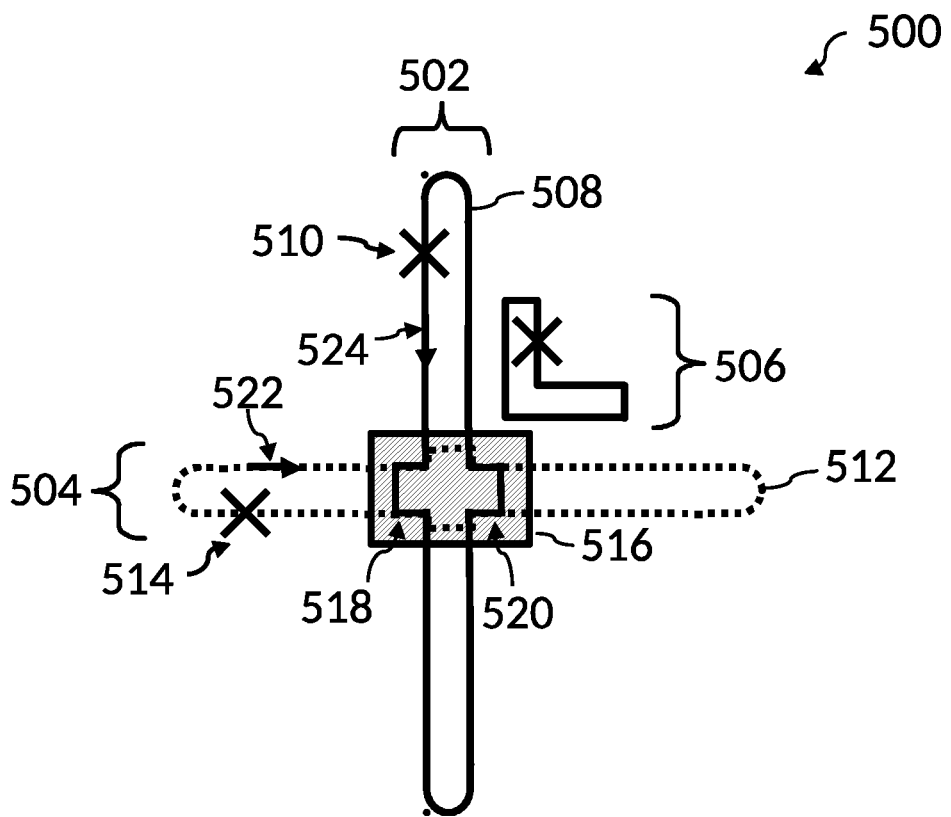
FIG. 5 is a schematic diagram of another exemplary hybrid mediated and direct coupling layout, in accordance with the present systems and methods.

FIG. 5 is a schematic diagram of another exemplary layout 500. Layout 500 includes a pair of superconducting devices 502 and 504 that are communicatively coupled to each other by a coupling device 506. Superconducting device 502 is drawn with a solid line while superconducting device 504 is drawn with a dotted line to more clearly illustrate the crossing geometry of superconducting devices 502 and 504.

Superconducting device 502 includes a superconducting loop 508 interrupted by a Josephson junction 510. Superconducting device 504 includes a superconducting loop 512 interrupted by a Josephson junction 514.

The crossing geometry of superconducting devices 502 and 504 of FIG. 5 at or in the vicinity of a crossing region 516 can produce a direct coupling $M_{QQ}$ between superconducting loops 508 and 512 of superconducting devices 502 and 504, respectively. Crossing region 516 is shown as a shaded region in FIG. 5 for clarity.

Each of two portions of superconducting loop 508 of superconducting device 502 has a respective outward jog (where outward is defined as a jog away from the center of the loop) which causes jogged portions 518 and 520, respectively, of superconducting loop 508 to be substantially parallel to a portion of superconducting loop 512 of superconducting device 504. Where the portions of superconducting loops 508 and 512 run parallel to each other (or at least are non-orthogonal), the portions of superconducting loops 508 and 512 can overlie each other and/or neighbor each other. In some implementations, superconducting loops 508 and 512 define traces in separate layers of a multi-layer superconducting integrated circuit. The traces of superconducting loops 508 and 512 may overlie each other and/or neighbor each other, and may be separated by an electrically insulating layer (e.g., a layer of a dielectric material), for example. The overlying and/or adjacency of portions of superconducting loop 508 and 512 can generate a mutual inductance, and the mutual inductance can provide a direct inductive communicative coupling between superconducting devices 502 and 504.

An excitation current 522 in superconducting loop 512 can induce a current 524 in superconducting loop 508.

The absence of crossovers in superconducting loop 508 (e.g., like crossovers 416 and 418 in superconducting loop 408 of FIG. 4) in superconducting loop 508 can result in a scenario where a current flows in an anti-clockwise direction in crossing region 516 and flows in an anti-clockwise direction in the portion of superconducting loop 508 outside crossing region 516 (also referred to as a main body of superconducting device 502). Mutual inductance $M_{QQ}$ can cause ferromagnetic (FM) coupling and can subtract from mutual inductance $M_{AFM}$, thereby reducing an AFM coupling of superconducting devices 502 and 504 (e.g., an AFM coupling mediated by coupling device 506).

A vector normal to the area of superconducting loop 508 in shaded crossing region 516 has substantially the same orientation to both of the following: i) a vector normal to the area of the rest of superconducting loop 508 of superconducting device 502, and ii) a vector normal to the area of superconducting loop 512 of superconducting device 504.

In some implementations, superconducting devices 502 and 504 are superconducting qubits, e.g., superconducting flux qubits.

The present application includes descriptions of layouts that could be adapted to crossing region 516 where a portion of superconducting device 502 overlies a portion of superconducting device 504 to provide coupling. See, for example, the layouts of crossing regions shown in FIGS. 6B, 7B, 8B, and 8C which may be adapted for use in layout 500 of FIG. 5. Other layouts of crossing region 516 having a circuitous path may be similarly used. A magnitude of a direct communicative coupling of superconducting devices 502 and 504 can be controlled, for example, by selective trimming of superconducting loops 508 and 512 during fabrication and, in some implementations, advantageously, without incurring a space penalty on a superconducting circuit.

Figure 6A:
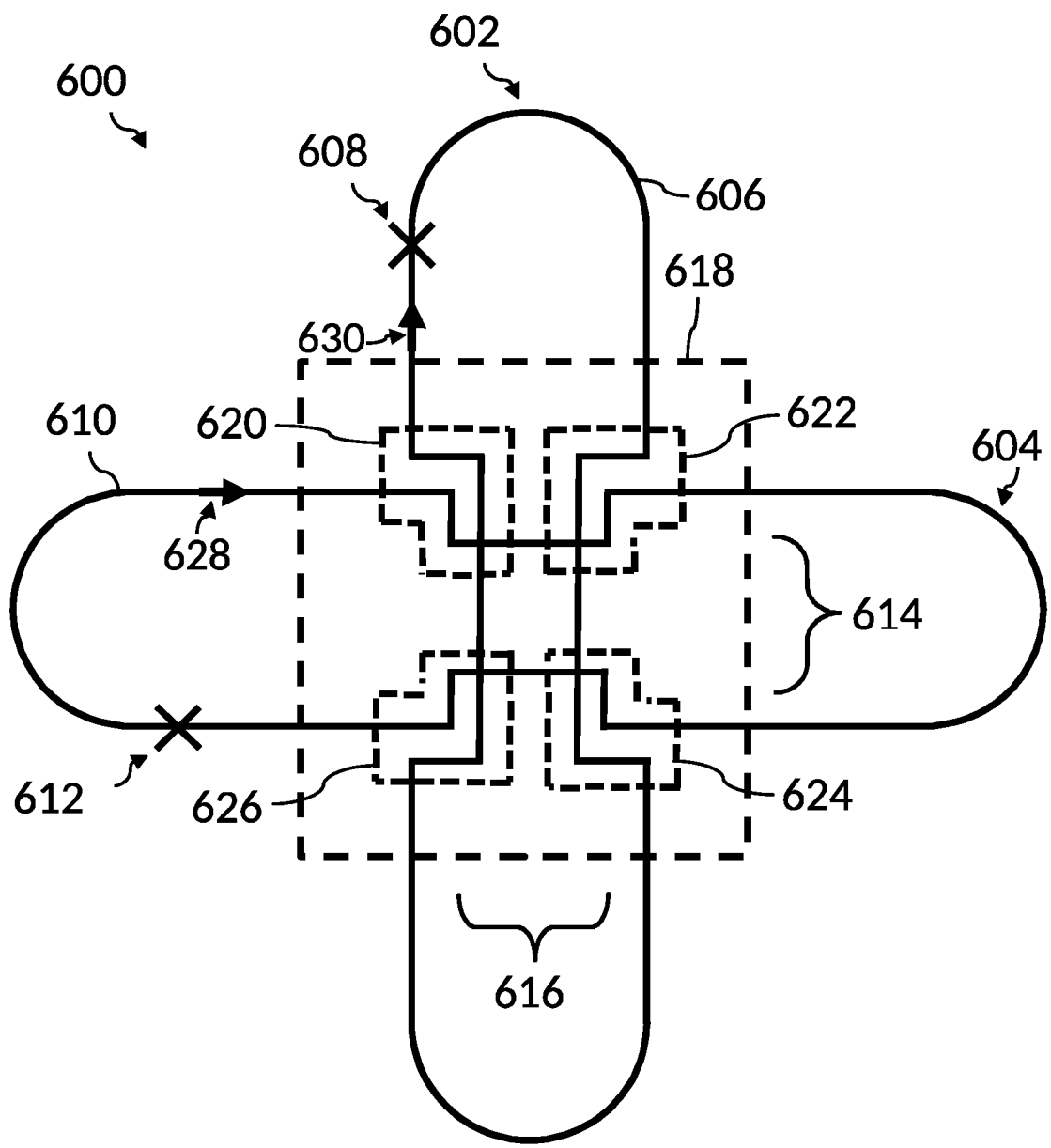
FIG. 6A is a schematic diagram of an exemplary layout of a pair of superconducting devices communicatively coupled to each other, where a respective loop of each superconducting device has an inward jog in a crossing region, in accordance with the present systems and methods.

FIG. 6A is a schematic diagram of an exemplary layout 600 of a pair of superconducting devices 602 and 604 communicatively coupled to each other, where a respective loop of each superconducting device has an inward jog in a crossing region, in accordance with the present systems and methods.

Layout 600 includes a pair of superconducting devices 602 and 604. Superconducting device 602 includes a superconducting loop 606 interrupted by a Josephson junction 608. Superconducting device 604 includes a superconducting loop 610 interrupted by a Josephson junction 612. Superconducting loop 606 and/or superconducting loop 610 may or may not be interrupted by a respective Josephson junction. Superconducting devices 602 and/or 604 may include other elements not shown in FIG. 6A. Superconducting devices 602 and/or 604 may be superconducting qubits, for example, superconducting flux qubits.

While coupling described with reference to FIG. 6A is a direct, inductive coupling (i.e., without an intervening coupling device), superconducting devices 602 and 604 may alternatively, additionally, or optionally be coupled by a galvanic coupling and/or a mediated coupling via at least one intervening coupling device. The same is true for devices 702 and 704, 802 and 804, 902 and 904, and 1002 and 1004 of FIGS. 7A and 7B, 8A, 8B, and 8C, 10, and 11, respectively.

Each of superconducting devices 602 and 604 has an inward jog 614 and 616, respectively (where, in the present application, each inward jog is defined as a jog towards a center of the respective loop). Inward jogs 614 and 616 are located in a crossing region 618 at or near a vicinity where superconducting devices 602 and 604 cross each other. Inward jogs 614 and 616 cause a portion of superconducting loop 606 of superconducting device 602 to be substantially parallel (or at least non-orthogonal) to a portion of superconducting loop 610 of superconducting device 604 in regions 620, 622, 624, and 626 of layout 600.

Where the portions of superconducting loops 606 and 610 run parallel to each other (or at least are non-orthogonal), the portions of superconducting loops 606 and 610 can overlie each other and/or neighbor each other. In some implementations, superconducting loops 606 and 610 define traces in separate layers of a multi-layer superconducting integrated circuit. The traces of superconducting loops 606 and 610 may overlie each other, and may be separated by an electrically insulating layer (e.g., a dielectric), for example. The overlying and/or adjacency of portions of superconducting loop 606 and 610 can generate a mutual inductance, and the mutual inductance can provide a direct inductive communicative coupling between superconducting devices 602 and 604. A person of skill in the art will appreciate that where reference is made in the present application to overlying portions of superconducting loops to generate a mutual inductance and a direct inductive communicative coupling, implementations may include overlying portions of superconducting loops and/or arranging portions of superconducting loops to neighbor each other to generate the mutual inductance and the direct inductive communicative coupling.

An excitation current flowing in a direction 628 in superconducting loop 610 can induce a current flowing in a direction 630 in superconducting loop 606.

Figure 6B:
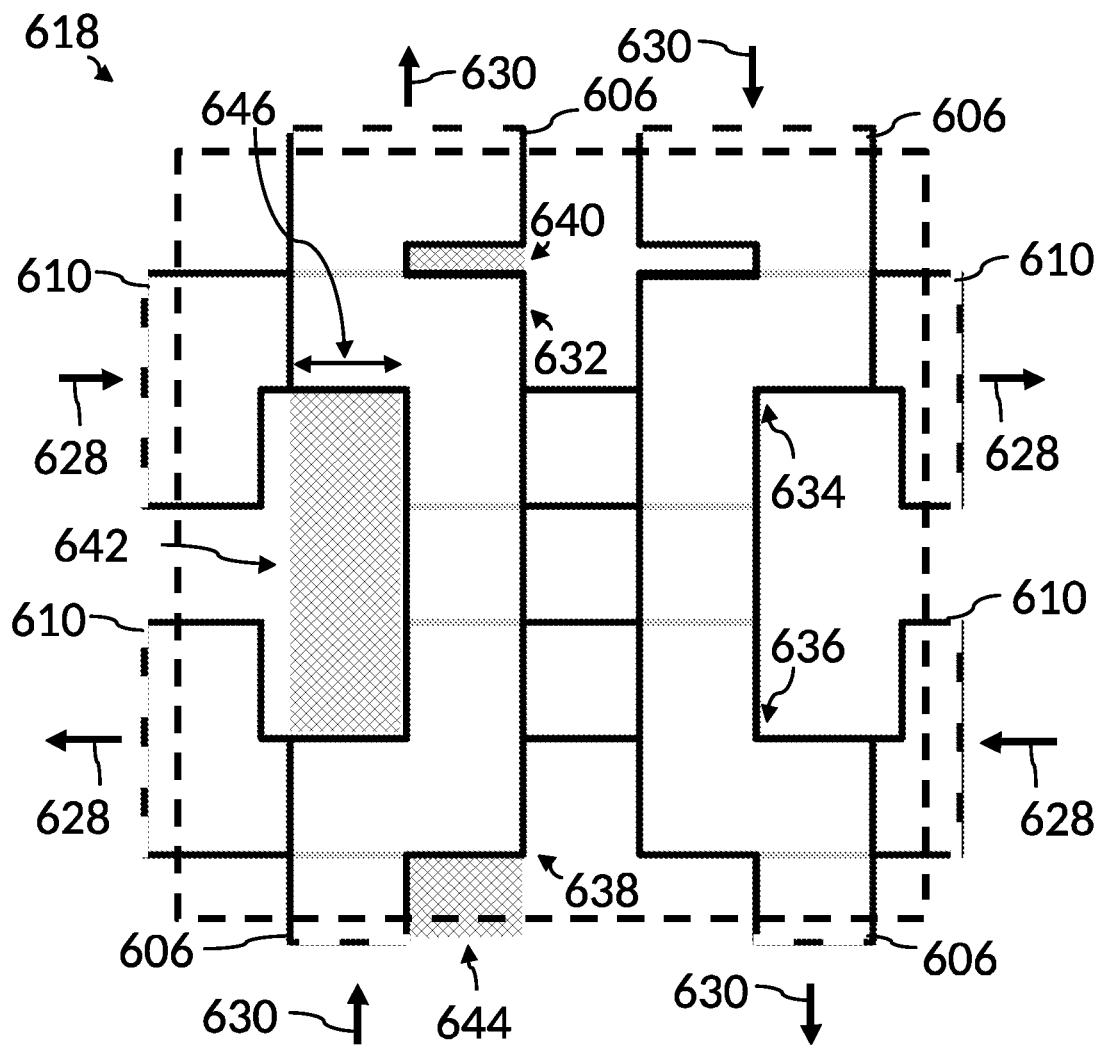
FIG. 6B is a schematic diagram of an example implementation of the crossing region of the layout of FIG. 6A, in accordance with the present systems and methods.

FIG. 6B is a schematic diagram of an example implementation of crossing region 618 of layout 600 of FIG. 6A, in accordance with the present systems and methods. Crossing region 618 includes a region where superconducting loops 606 and 610 of superconducting devices 602 and 604 of FIG. 6A cross each other.

Superconducting loops 606 and 610 overlap (e.g., overlie each other in a multi-layer superconducting integrated circuit), and run parallel (or at least non-orthogonal) to each other in each of regions 632, 634, 636, and 638.

FIG. 6B illustrates an example layout of layout 600 in plan view. In some implementations, layout 600 is fabricated on a multi-layer superconducting integrated circuit using different layers for superconducting loops 606 and 610. In some implementations, the layers are fabricated using a superconducting metal and are separated by an insulating layer, for example, by a layer of a dielectric material. In some implementations, superconducting loops 606 and 610 comprise niobium. In some implementations, superconducting loops 606 and 610 comprise aluminum and/or another suitable superconducting material. In some implementations, the insulating layer comprises silicon dioxide.

Superconducting loops 606 and 610 may be loops of superconducting wires. The superconducting wires may overlie each other in regions 632, 634, 636, and 638, and may provide a direct communicative coupling of superconducting devices 602 and 604. Fabrication of layout 600 can include a method in which superconducting wires are trimmed to achieve a desired jogging and overlap (i.e., the extent to which the wires overlie each other). For example, in FIG. 6B, regions 640, 642, and 644 of the left-hand leg of superconducting loop 606 have been trimmed to create inward jog 616 of FIG. 6A.

A superconducting loop in a superconducting integrated circuit (e.g., superconducting loop 606 of the multi-layer superconducting integrated circuit of layout 600) can include one or more traces of superconducting material. Each trace (also referred to in the present application as a superconducting trace) has a respective thickness and a respective width. A length of the superconducting trace is a length of the path along which current can flow. The width is defined as a perpendicular distance between opposed outside edges of the superconducting trace at any given point along the length. The width is a distance measured in a plane of a layer of a multi-layer integrated circuit. The thickness is defined as perpendicular to the length and the width of the superconducting trace. The thickness is a distance measured in the stacking direction, i.e., orthogonal to the plane of the layer.

References in the present application to a portion of a superconducting loop being narrower within a region than outside the region refers to a trace of the portion of the superconducting loop having a smaller width within the region than outside the region. A narrower trace occupies less surface area on the integrated circuit than a wider trace of the same length.

In some implementations (such as the one illustrated in FIG. 6B), at least a portion of each of superconducting loops 606 and 610 is narrower within crossing region 618 than outside crossing region 618. That is, a respective width of each of superconducting loops 606 and 610 within crossing region 618 is less than a respective width of each of superconducting loops 606 and 610 outside crossing region 618.

Fabrication of layout 600 can include generating a circuitous path for the superconducting traces of superconducting loops 606 and 610 inside crossing region 618. A circuitous path is a path between two points that takes a route longer than the most direct way (e.g., shortest line). A circuitous path may include one or more turns or changes in direction. For example, a circuitous path between two points may include a straight-line path between the two points interrupted by a right-angled left turn, a right-angled right turn, another right-angled right turn, and another right-angled left turn, in sequence, each turn followed by a suitable length of straight-line path. In FIG. 6B, for example, the path of superconducting trace of superconducting loop 606 through crossing region 618 makes four changes of direction-following the direction of current 630, the path makes a right-angled right turn, a right-angled left turn, another right-angled left turn, and another right-angled right turn.

A circuitous path of superconducting trace of superconducting loop 606 in crossing region 618 may be congruent with a circuitous path of superconducting trace of superconducting loop 610 in crossing region 618.

A magnitude of a direct communicative coupling of superconducting devices 602 and 604 can be controlled, for example, by selective trimming of superconducting loops 606 and 610 during fabrication. Adjusting a width of the superconducting wires of superconducting loops 606 and 610 in crossing region 618 by the selective trimming can be achieved without incurring a space penalty on a superconducting circuit, for example. Selective trimming of the superconducting wires during fabrication can provide an adjustable tuning of the magnitude of the direct communicative coupling of superconducting devices 602 and 604 over a continuous range, rather than only at discrete values. In one implementation, the magnitude of direct communicative coupling between two superconducting devices is adjustable over a range of zero to twice the magnitude of a mediated coupling by selectively trimming the superconducting traces and configuring the superconducting traces to follow a suitable circuitous path. Trimming a superconducting trace reduces a width of the trace. In one implementation, a superconducting trace is selectively trimmed from a width of 2 μm to a width of 0.5 μm.

A mediated coupling is not shown in FIGS. 6A and 6B. Mediated coupling can be implemented in combination with layout 600 of FIGS. 6A and 6B by a coupling device e.g., coupling device 506 of FIG. 5.

In some implementations, controlling a magnitude of a direct communicative coupling of superconducting devices 602 and 604 includes determining a target magnitude of the communicative coupling between superconducting devices 602 and 604, determining a difference between the magnitude of the mediated communicative coupling and the target magnitude, determining a trimming margin based at least in part on the difference between the magnitude of the mediated coupling and the target magnitude, and trimming a width of the superconducting traces of superconducting loops 606 and 610 in crossing region 618.

As described above, fabrication of layout 600 can include a method in which superconducting traces are trimmed to achieve a desired jogging and overlap (i.e., the extent to which the wires overlie each other). For example, in FIG. 6B, region 642 of superconducting loop 606 has been trimmed by a trimming margin 646.

Figure 7A:
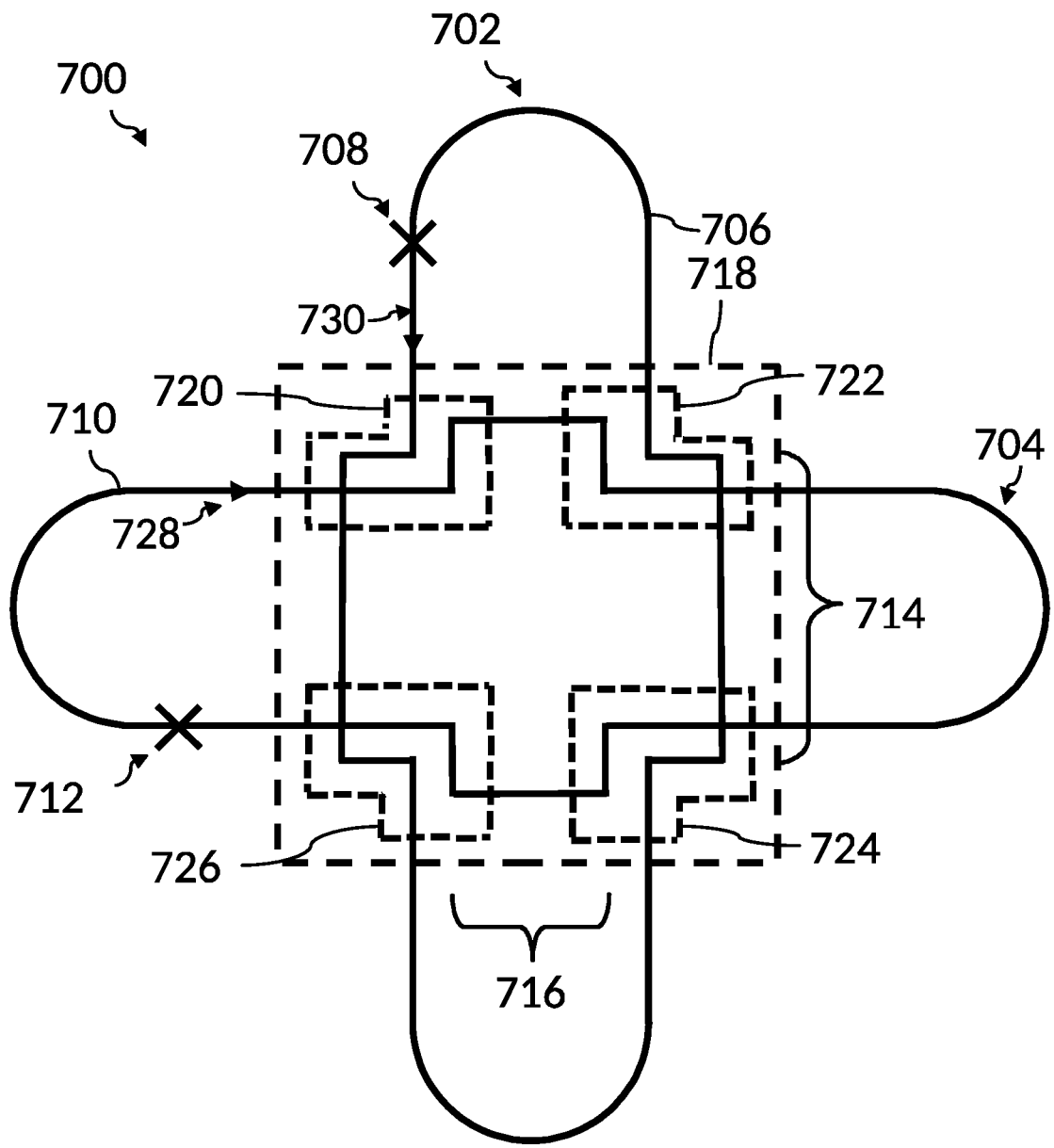
FIG. 7A is a schematic diagram of another exemplary layout of a pair of superconducting devices communicatively coupled to each other, where a respective loop of each superconducting device has an outward jog in a crossing region, in accordance with the present systems and methods.

FIG. 7A is a schematic diagram of another exemplary layout 700 of a pair of superconducting devices 702 and 704 communicatively coupled to each other, where a respective loop of each superconducting device has an outward jog in a crossing region, in accordance with the present systems and methods.

Layout 700 includes a pair of superconducting devices 702 and 704. Superconducting device 702 includes a superconducting loop 706 interrupted by a Josephson junction 708. Superconducting device 704 includes a superconducting loop 710 interrupted by a Josephson junction 712.

Each of superconducting devices 702 and 704 has an outward jog 714 and 716, respectively (where, in the present application, each outward jog is defined as a jog away from a center of the respective superconducting loop). Outward jogs 714 and 716 are located in a crossing region 718 at or near a vicinity where superconducting devices 702 and 704 cross each other. Outward jogs 714 and 716 cause a portion of superconducting loop 706 of superconducting device 702 to be substantially parallel (or at least non-orthogonal) to a portion of superconducting loop 710 of superconducting device 704 in regions 720, 722, 724, and 726 of layout 700.

Where the portions of superconducting loops 706 and 710 run parallel to each other (or at least are non-orthogonal), the portions of superconducting loops 706 and 710 can overlie each other and/or neighbor each other. In some implementations, superconducting loops 706 and 710 define traces in separate layers of a multi-layer superconducting integrated circuit. The traces of superconducting loops 706 and 710 may overlie each other, and may be separated by an electrically insulating layer (e.g., a dielectric), for example. The overlying and/or adjacency of portions of superconducting loop 706 and 710 can generate a mutual inductance, and the mutual inductance can provide a direct inductive communicative coupling between superconducting devices 702 and 704.

An excitation current flowing in a direction 728 in superconducting loop 710 can induce a current flowing in a direction 730 in superconducting loop 706.

Figure 7B:
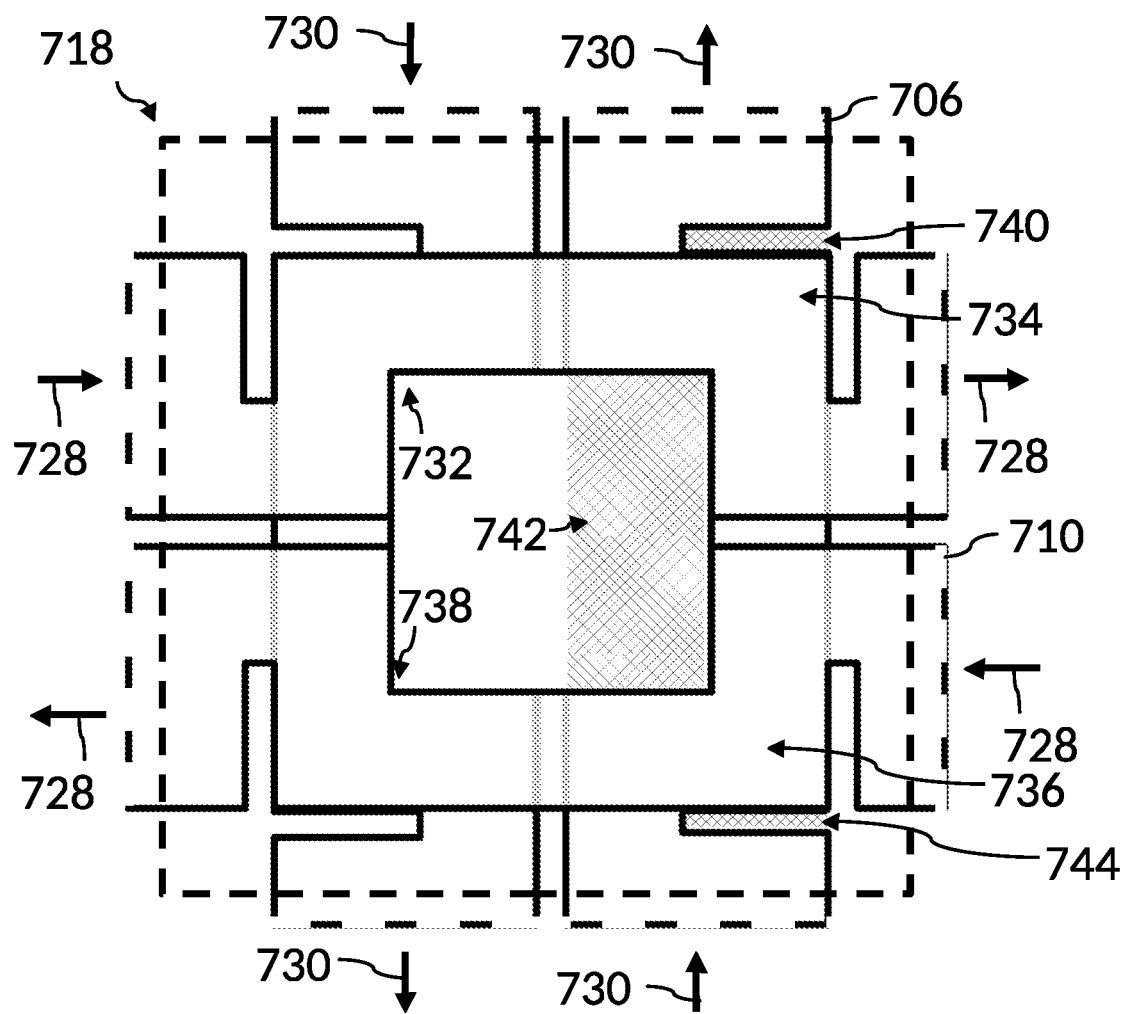
FIG. 7B is a schematic diagram of an example implementation of the crossing region of the layout of FIG. 7A, in accordance with the present systems and methods.

FIG. 7B is a schematic diagram of an example implementation of crossing region 718 of layout 700 of FIG. 7A, in accordance with the present systems and methods. Crossing region 718 includes a region where superconducting loops 706 and 710 of superconducting devices 702 and 704 of FIG. 7A cross each other.

Superconducting loops 706 and 710 overlap (e.g., overlie each other in a multi-layer superconducting integrated circuit), and run parallel (or at least non-orthogonal) to each other in each of regions 732, 734, 736, and 738.

FIG. 7B illustrates an example layout of layout 700 in plan view. In some implementations, layout 700 is fabricated on a multi-layer superconducting integrated circuit using different layers for superconducting loops 706 and 710. In some implementations, the layers are fabricated using a superconducting metal and are separated by an insulating layer, for example, by a layer of a dielectric material. In some implementations, superconducting loops 706 and 710 comprise niobium. In some implementations, superconducting loops 706 and 710 comprise aluminum and/or another suitable superconducting material. In some implementations, the insulating layer comprises silicon dioxide.

Superconducting loops 706 and 710 may be loops of superconducting wires. The superconducting wires may overlie each other in regions 732, 734, 736, and 738, and may provide a direct communicative coupling of superconducting devices 702 and 704. Fabrication of layout 700 can include a method in which superconducting wires are trimmed to achieve a desired jogging and overlap (i.e., the extent to which the wires overlie each other). For example, in FIG. 7B, regions 740, 742, and 744 of the right-hand leg of superconducting loop 706 have been trimmed to create outward jog 716 of FIG. 7A.

Fabrication of layout 700 can include generating a circuitous path for the superconducting traces of superconducting loops 706 and 710 inside crossing region 718.

A magnitude of a direct communicative coupling of superconducting devices 702 and 704 can be controlled, for example, by selective trimming of superconducting loops 706 and 710 during fabrication. Adjusting a width of the superconducting wires of superconducting loops 706 and 710 in crossing region 718 by the selective trimming can be achieved without incurring a space penalty on a superconducting circuit, for example. Selective trimming of the superconducting wires can provide an adjustable tuning of the magnitude of the direct communicative coupling of superconducting devices 702 and 704 over a continuous range, rather than only at discrete values. In one implementation, the magnitude of direct communicative coupling between two superconducting devices is adjustable over a range of zero to twice the magnitude of a mediated coupling by selectively trimming the superconducting traces and configuring the superconducting traces to follow a suitable circuitous path. In one implementation, a superconducting traces is selectively trimmed from a width of 2 µm to a width of 0.5 µm.

Selective trimming of the superconducting traces may be accomplished by a suitable trim etch process. The trim etch process may include, for example, depositing a first hard mask layer over a layer of superconducting material, depositing a second hard mask layer over the first hard mask layer, depositing a photoresist layer over the second hard mask layer, forming a pattern in the photoresist layer, transferring the pattern into the second hard mask layer, and trimming the second hard mask layer with the photoresist layer on top of the second hard mask layer. The top surface of the second hard mask layer is protected by the photoresist and the substrate is protected by the overlying first hard mask layer during the trim etch.

Fabrication of superconducting traces with desired widths may also be accomplished by deposition of superconducting material.

A mediated coupling is not shown in FIGS. 7A and 7B. Mediated coupling can be implemented in combination with layout 700 of FIGS. 7A and 7B by a coupling device e.g., coupling device 506 of FIG. 5.

Figure 8A:
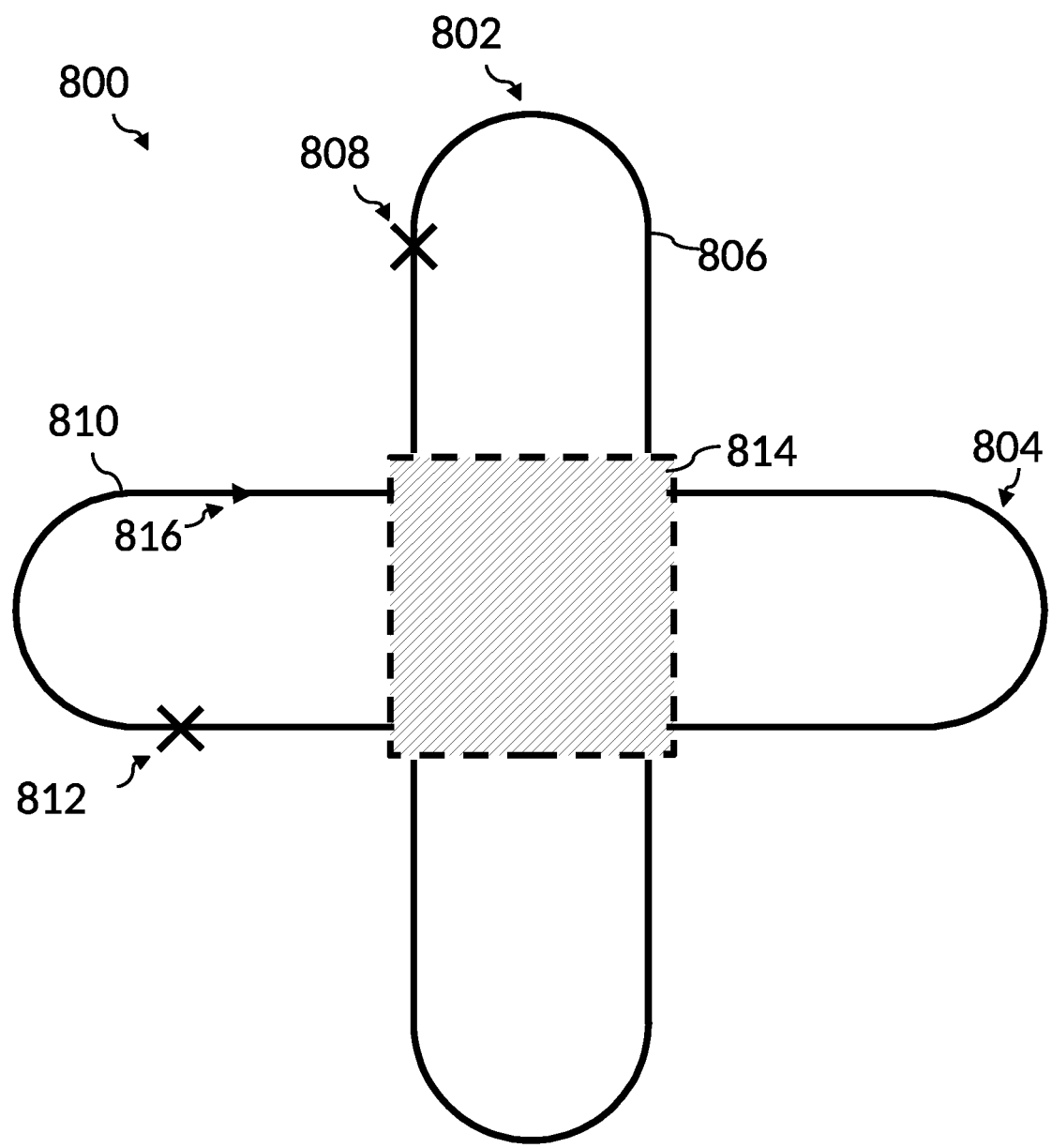
FIG. 8A is a schematic diagram of another exemplary layout of a pair of superconducting devices communicatively coupled to each other, where a respective loop of each superconducting device has multiple jogs in a crossing region, in accordance with the present systems and methods.

FIG. 8A is a schematic diagram of another exemplary layout 800 of a pair of superconducting devices 802 and 804 communicatively coupled to each other, where a respective loop of each superconducting device has multiple jogs in a crossing region, in accordance with the present systems and methods.

Layout 800 includes a pair of superconducting devices 802 and 804. Superconducting device 802 includes a superconducting loop 806 interrupted by a Josephson junction 808. Superconducting device 804 includes a superconducting loop 810 interrupted by a Josephson junction 812. Superconducting devices 802 and 804 cross each other in a crossing region 814 (shown shaded in FIG. 8A).

An excitation current flowing in a direction 816 in superconducting loop 810 can induce a current (not shown in FIG. 8A) in superconducting loop 806.

Figure 8B:
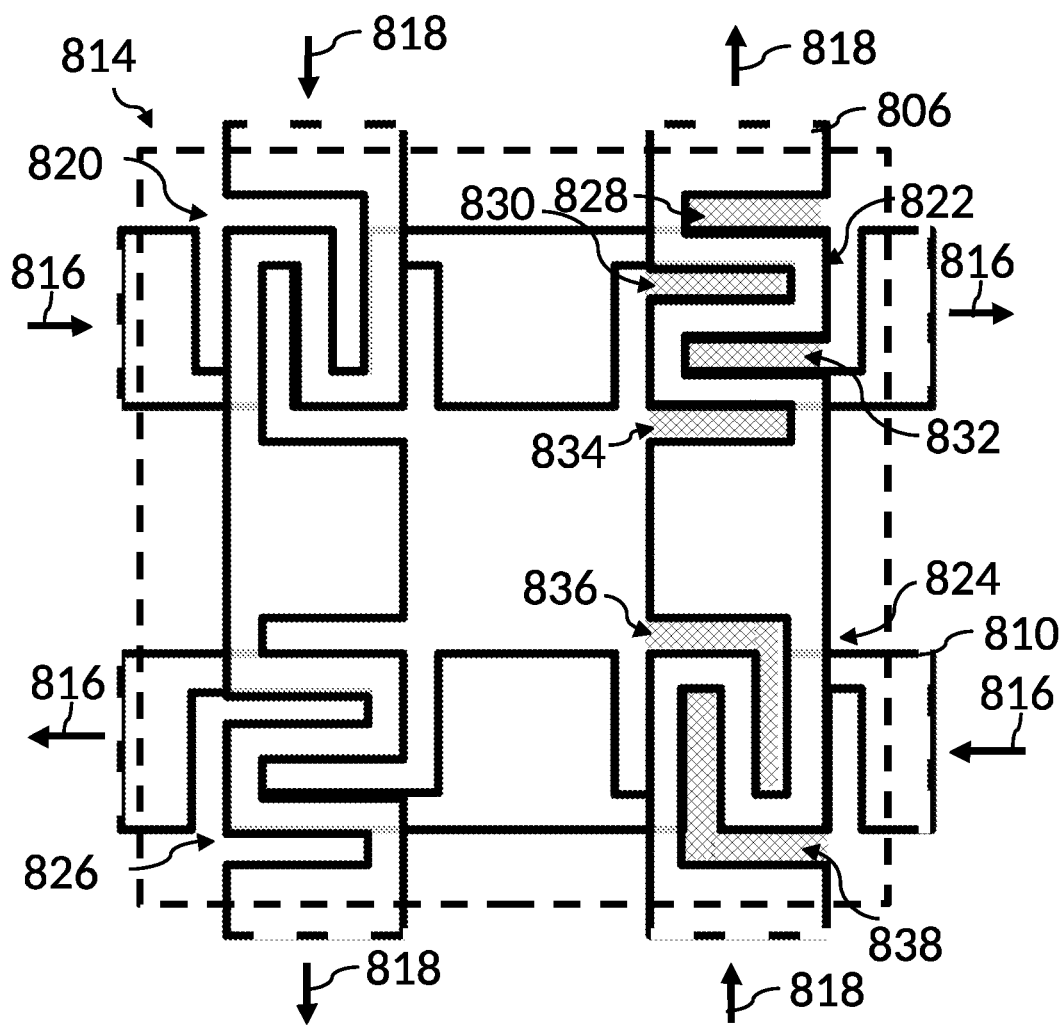
FIG. 8B is a schematic diagram of an example implementation of the crossing region of the layout of FIG. 8A, in accordance with the present systems and methods.

FIG. 8B is a schematic diagram of an example implementation of crossing region 814 of layout 800 of FIG. 8A, in accordance with the present systems and methods. Crossing region 814 includes a region where superconducting loops 806 and 810 of superconducting devices 802 and 804 of FIG. 8A cross each other.

Superconducting loops 806 and 810 overlap (e.g., overlie each other in a multi-layer superconducting integrated circuit), and run parallel (or at least non-orthogonal) to each other in each of regions 820, 822, 824, and 826.

FIG. 8B illustrates an example layout of layout 800 in plan view. In some implementations, layout 800 is fabricated on a multi-layer superconducting integrated circuit using different layers for superconducting loops 806 and 810. In some implementations, the layers are fabricated using a superconducting metal and are separated by an insulating layer of a dielectric material. In some implementations, superconducting loops 806 and 810 comprise niobium. In some implementations, superconducting loops 806 and 810 comprise aluminum and/or another suitable superconducting material. In some implementations, the insulating layer comprises silicon dioxide.

Superconducting loops 806 and 810 may be loops of superconducting wires. The superconducting wires may overlie each other in regions 820, 822, 824, and 826, and may provide a direct communicative coupling of superconducting devices 802 and 804. Fabrication of layout 800 can include a method in which superconducting wires are trimmed to achieve a desired jogging and overlap (i.e., the extent to which the wires overlie each other). For example, in FIG. 8B, regions 828, 830, 832, 834, 836, and 838 of the right-hand leg of superconducting loop 806 have been trimmed to create a circuitous path through crossing region 814.

Fabrication of layout 800 can include generating a circuitous path for the superconducting traces of superconducting loops 806 and 810 inside crossing region 814.

A magnitude of a direct communicative coupling of superconducting devices 802 and 804 can be controlled, for example, by selective trimming of superconducting loops 806 and 810 during fabrication. Adjusting a width of the superconducting wires of superconducting loops 806 and 810 in crossing region 814 by the selective trimming can be achieved without incurring a space penalty on a superconducting circuit, for example. Selective trimming of the superconducting wires can provide an adjustable tuning (during fabrication) of the magnitude of the direct communicative coupling of superconducting devices 802 and 804 over a continuous range, rather than only at discrete values. To change a magnitude of direct coupling in previous approaches, changes would generally be needed to the layout of the integrated circuit and/or the area occupied by the integrated circuit. These changes would typically lead to direct coupling magnitudes being constrained to discrete values.

In one implementation, the magnitude of direct communicative coupling between two superconducting devices is adjustable over a range of zero to twice the magnitude of a mediated coupling by selectively trimming the superconducting traces and configuring the superconducting traces to follow a suitable circuitous path. In one implementation, a superconducting traces is selectively trimmed from a width of 2 µm to a width of 0.5 µm.

Figure 8C:
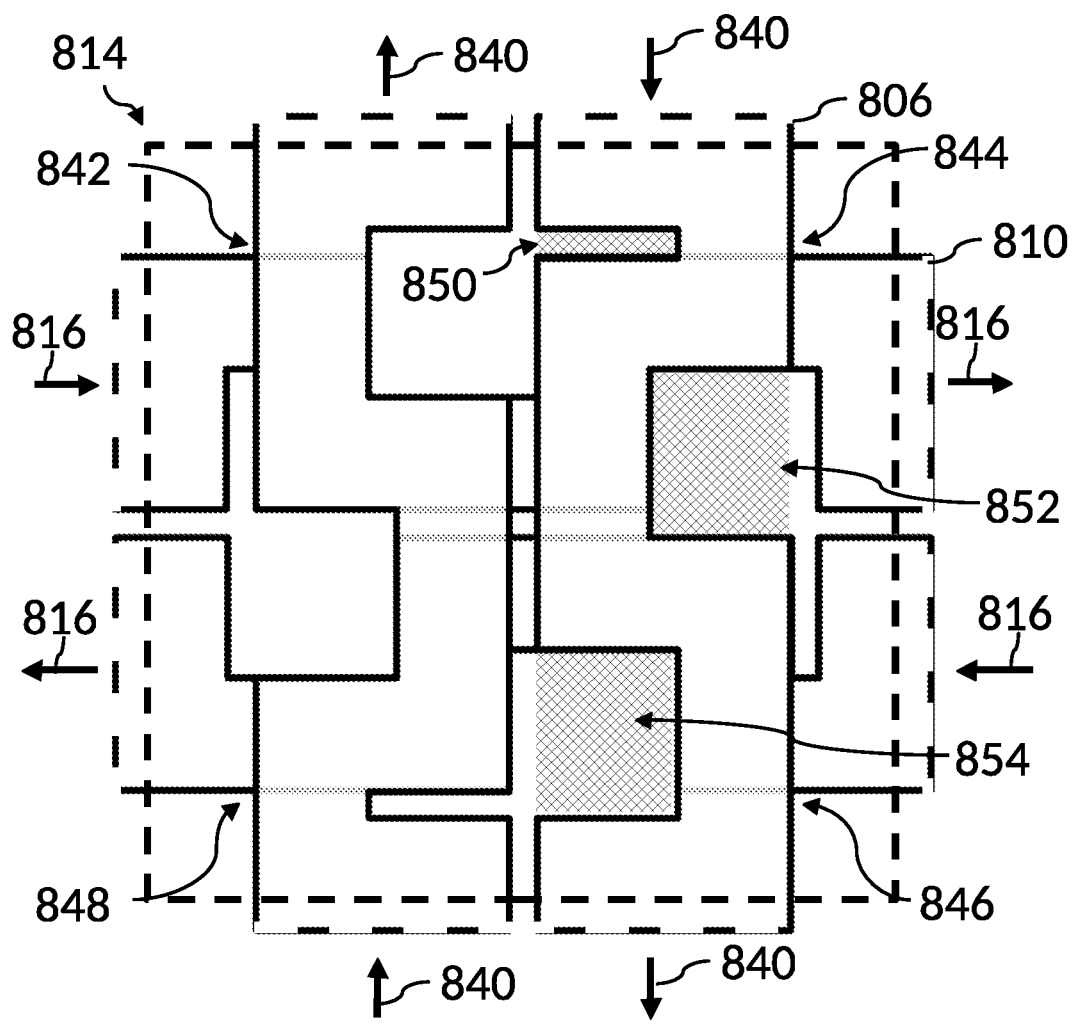
FIG. 8C is a schematic diagram of another example implementation of the crossing region of the layout of FIG. 8A, in accordance with the present systems and methods.

FIG. 8C is a schematic diagram of another example implementation of crossing region 814 of layout 800 of FIG. 8A, in accordance with the present systems and methods. Crossing region 814 includes a region where superconducting loops 806 and 810 of superconducting devices 802 and 804 of FIG. 8A cross each other. An induced current 840 flows in directions indicated by the arrows in superconducting loop 806, and excitation current 816 flows in directions indicated by arrows in superconducting loop 810.

Superconducting loops 806 and 810 overlap (e.g., overlie each other in a multi-layer superconducting integrated circuit), and run parallel (or at least non-orthogonal) to each other in each of regions 842, 844, 846, and 848.

FIG. 8C illustrates an example layout of layout 800 in plan view. In some implementations, layout 800 is fabricated on a multi-layer superconducting integrated circuit using different layers for superconducting loops 806 and 810. In some implementations, the layers are fabricated using a superconducting metal and are separated by an intervening layer. In some implementations, the intervening layer includes an insulating layer of a dielectric material. In some implementations, superconducting loops 806 and 810 comprise niobium. In some implementations, superconducting loops 806 and 810 comprise aluminum and/or another suitable superconducting material. In some implementations, the insulating layer comprises silicon dioxide and/or silicon nitride. In some implementations, an integrated circuit air bridge isolates superconducting loops 806 and 810. A typical air bridge can be formed using a layer of metal deposited and patterned over a sacrificial material. Subsequently, the sacrificial material can be removed to leave a metal trace at least partially insulated from other metal traces or features by a fluid (e.g., air) rather than a dielectric, such as silicon dioxide.

Superconducting loops 806 and 810 may be loops of superconducting wires. The superconducting wires may overlie each other in regions 842, 844, 846, and 848, and may provide a direct communicative coupling of superconducting devices 802 and 804. Fabrication of layout 800 can include a method in which superconducting wires are trimmed to achieve a desired jogging and overlap (i.e., the extent to which the wires overlie each other). For example, in FIG. 8B, regions 850, 852, and 854 of the right-hand leg of superconducting loop 806 have been trimmed to create a circuitous path through crossing region 814.

Fabrication of layout 800 can include generating a circuitous path for the superconducting traces of superconducting loops 806 and 810 inside crossing region 814.

A magnitude of a direct communicative coupling of superconducting devices 802 and 804 can be controlled, for example, by selective trimming of superconducting loops 806 and 810 during fabrication. Adjusting a width of the superconducting wires of superconducting loops 806 and 810 in crossing region 814 by the selective trimming can be achieved without incurring a space penalty on a superconducting circuit, for example. Selective trimming of the superconducting wires can provide an adjustable tuning of the magnitude of the direct communicative coupling of superconducting devices 802 and 804 over a continuous range, rather than only at discrete values. In one implementation, the magnitude of direct communicative coupling between two superconducting devices is adjustable over a range of zero to twice the magnitude of a mediated coupling by selectively trimming the superconducting traces and configuring the superconducting traces to follow a suitable circuitous path. In one implementation, a superconducting trace is selectively trimmed from a width of 2 μm to a width of 0.5 μm.

A mediated coupling is not shown in FIGS. 8A, 8B, and 8C. Mediated coupling can be implemented in combination with layout 800 of FIGS. 8A, 8B, and 8C by a coupling device e.g., coupling device 506 of FIG. 5.

One benefit of the systems and methods of the present application is an improved robustness to fabrication errors and/or misalignment. Another benefit of the systems and methods of the present application is improved tunability of a direct communicative coupling between superconducting devices during layout and/or fabrication of a superconducting integrated circuit without affecting the amount of real estate used by the superconducting devices and/or by other devices on the superconducting integrated circuit.

Yet another benefit of the present systems and methods is reduced crosstalk with neighboring devices. The implementations described in the present application are more compact, self-contained, and symmetric than previous approaches, and consequently have little or no crosstalk with neighboring devices.

It will be understood that the layouts of the crossing regions shown in FIGS. 6B, 7B, 8B, and 8C may be adapted for use in any of the arrangements discussed above where a portion of a first superconducting device overlies a portion of a second superconducting device to provide coupling, and other layouts of crossing regions having a circuitous path may be similarly used.

Figure 9:
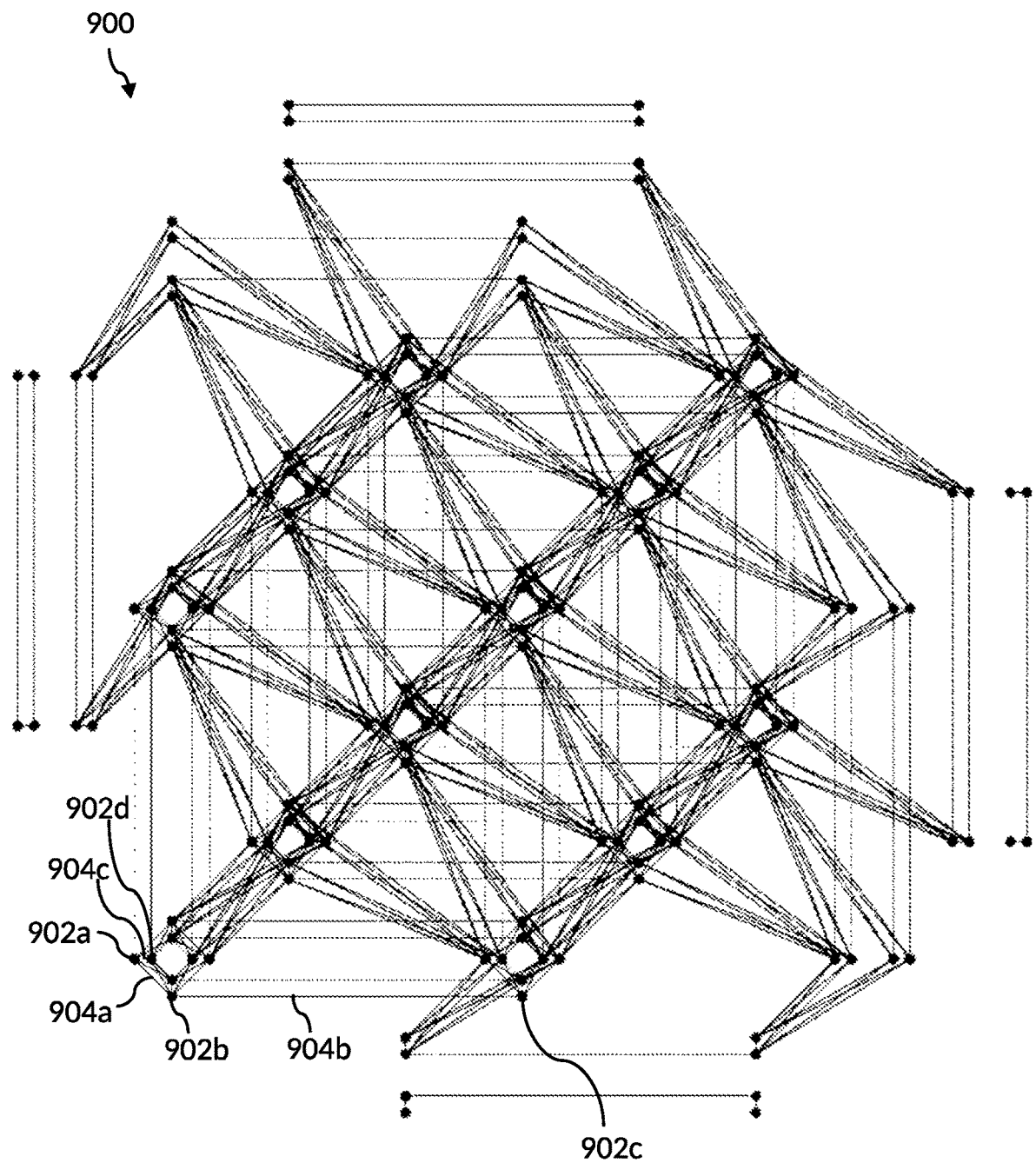
FIG. 9 is a schematic diagram of a topology of an exemplary superconducting quantum processor, in accordance with the present systems and methods.

FIG. 9 is a schematic diagram of a topology 900 of an exemplary superconducting quantum processor, according to the present disclosure. The superconducting quantum processor having topology 900 may be used for quantum annealing and/or adiabatic quantum computing, for example.

Coupling layouts described with reference to FIGS. 1, 2, 3, 4, 5, 6A, 6B, 7A, 7B, 8A, 8B, and 8C above, and FIGS. 10 and 11 below may be used in a superconducting quantum processor having topology 900. The coupling layouts may also be used in a superconducting quantum processor having another suitable topology and/or in other superconducting integrated circuits.

Topology 900 includes a plurality of qubits, for example, qubits 902a, 902b, 902c, and 902d (collectively referred to as qubits 902). Qubits 902 are shown as dots in topology 900 of FIG. 9. In one implementation, each qubit of a first subset of qubits 902 includes a respective elongated superconducting loop oriented in a first direction, and each qubit of a second subset includes a respective elongated superconducting loop oriented in a second direction at least approximately orthogonal to the first direction.

Topology 900 also includes a plurality of coupling devices, for example, coupling devices 904a, 904b, and 904c (collectively referred to as coupling devices 904). Coupling devices 904 are shown as lines in topology 900 of FIG. 9. Coupling devices 904 can provide communicative coupling between pairs of qubits 902.

Each of qubits 902 includes a respective elongated superconducting loop having a major axis and a minor axis. An orientation of the qubit may be defined as a direction of the major axis.

Qubits 902a and 902b are oriented at least approximately orthogonally to each other, that is the major axes of the respective elongated superconducting loops are oriented at least approximately orthogonally to each other. Coupling device 904a (also referred to in the present application as an internal coupling device) can provide a communicative coupling between qubits 902a and 902b. FIGS. 1, 2, 3, 4, 5, 6A, 6B, 7A, 7B, 8A, 8B, and 8C include examples of superconducting devices (e.g., qubits) that are oriented at least approximately orthogonally to each other, and coupleable by a mediated coupling device referred to, in the architecture of FIG. 9, as an internal coupling device.

Qubits 902b and 902c are oriented at least approximately parallel to each other, that is the major axes of the respective elongated superconducting loops of each of qubits 902c and 902d are oriented at least approximately parallel to each other. Qubits 902c and 902d are in the same row or column of qubits in topology 900. Coupling device 904b can provide a communicative coupling between qubits 902b and 902c.

Qubits 902a and 902d are oriented at least approximately parallel to each other, that is the major axes of the respective elongated superconducting loops of each of qubits 902a and 902d are oriented at least approximately parallel to each other. Qubits 902a and 902d are in an adjacent row or column of qubits to each other in topology 900. Coupling device 904c can provide a communicative coupling between qubits 902a and 902d.

In topology 900, each qubit can be communicatively coupled to twelve (12) orthogonally-oriented qubits, and can be communicatively coupled to a total of fifteen (15) qubits including the twelve orthogonally-oriented qubits. The communicative coupling between pairs of qubits in topology 900 can include direct coupling and/or mediated coupling by intermediate coupling devices.

FIGS. 6A, 6B, 7A, 7B, 8A, 8B, and 8C describe pairs of superconducting devices (e.g., qubits) with at least a portion of the superconducting loops of the superconducting devices running orthogonally (or at least not in parallel) with each other. The superconducting loops cross each other, in projection, in a respective crossing region. In the crossing regions, portions of the superconducting traces of the superconducting loops can be arranged to run parallel (or at least not orthogonal) to each other and sufficiently closely spaced for a current flowing in one of the pair of superconducting loops to induce a current in the other superconducting loop (i.e., portions of the superconducting traces of the superconducting loops can be arranged to be inductively proximate to one another).

In other implementations, the major axes of superconducting loops of superconducting devices run parallel (or at least not orthogonal) to each other. In some of these implementations, the loops are arranged at least partially side by side, and in others of these implementations, the loops are arranged end to end. Portions of the superconducting loops can be inductively proximate to each other, i.e., sufficiently closely spaced for a current flowing in one of the pair of superconducting loops to induce a current in the other superconducting loop.

Figure 10A:
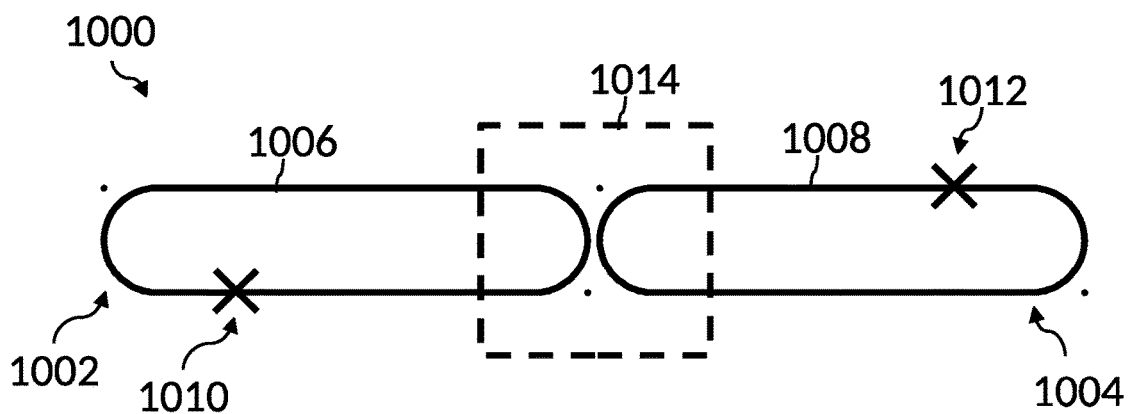
FIG. 10 is a schematic diagram of an exemplary layout of a pair of superconducting devices, directly communicatively coupled to each other, in accordance with the present systems and methods.

FIG. 10A is a schematic diagram of another exemplary layout 1000 of a pair of superconducting devices 1002 and 1004, directly communicatively coupled to each other, in accordance with the present systems and methods.

Superconducting devices 1002 and 1004 each include a respective superconducting loop 1006 and 1008. Superconducting loops 1002 and 1004 are arranged end to end. Superconducting loops 1006 and 1008 may each be interrupted by a respective Josephson junction 1010 and 1012. Superconducting devices 1002 and 1004 may be superconducting qubits (e.g., superconducting flux qubits). The superconducting loop 1006 and 1008 can reside in a same layer or plane as one another, or in different layers or planes from one another. In addition to being directly inductively coupled to each other, superconducting devices 1002 and 1004 may be communicatively coupled by a mediated coupling device, e.g., coupling device 904b of FIG. 9. For clarity, the mediated coupling device is not shown in FIG. 10A.

Layout 1000 includes a meeting region 1014. Meeting region 1014 is a region of the integrated circuit where portions of superconducting loops 1006 and 1008 of superconducting devices 1002 and 1004 of FIG. 10A are inductively proximate to each other. In the present application, portions of two superconducting devices are inductively proximate to each other when the two superconducting devices are suitably oriented with respect to each other, and sufficiently closely spaced to cause a first one of the two superconducting devices to be directly inductively communicatively coupled to the second one of the two superconducting devices when a current flows in the superconducting loop of the first one.

Superconducting devices 1002 and 1004 can be directly inductively communicatively coupled to each other in meeting region 1014. For example, an excitation current flowing in superconducting loop 1006 can induce a current to flow in superconducting loop 1008.

Portions of superconducting loops 1006 and 1008 run parallel (or at least non-orthogonal) to each other and are inductively proximate to each other in meeting region 1014.

Layout 1000 of FIG. 10 can be implemented with superconducting loops 1006 and 1008 fabricated in the same layer of a superconducting integrated circuit. The superconducting integrated circuit may be a multi-layer superconducting integrated circuit. In some implementations, the layers are fabricated using a superconducting metal and are separated by an insulating layer of a dielectric material. Superconducting loops 1006 and 1008 may comprise niobium, aluminum and/or another suitable superconducting material. The insulating layer may comprise silicon dioxide.

Superconducting loops 1006 and 1008 may be loops of superconducting wires. A superconducting wire can be implemented as one or more superconducting traces, e.g., in a wiring layer in a fabrication stack. A superconducting trace can also be referred to an interconnect line. A width of the superconducting trace can also be referred to as a linewidth of the interconnect line.

Fabrication of layout 1000 may include a method in which superconducting traces are trimmed to cause at least portions of the traces to be inductively proximate to each other, i.e., to run parallel, or at least non-orthogonal, to each other, and to be sufficiently close that a current flow in one trace directly induces a current flow in the other trace. Meeting region 1014 may include traces that have been deposited and/or trimmed to create a circuitous path for portions of superconducting loops 1006 and 1008 through meeting region 1014.

A magnitude of a direct communicative coupling of superconducting devices 1002 and 1004 can be controlled, for example, by selective deposition and/or trimming of superconducting loops 1006 and 1008 during fabrication. Adjusting a width of the superconducting traces of superconducting loops 1006 and 1008 in meeting region 1014 by the selective trimming can be achieved without incurring a space penalty on a superconducting circuit, for example. Selective trimming of the superconducting traces can provide an adjustable tuning of the magnitude of the direct communicative coupling of superconducting devices 1002 and 1004 over a continuous range, rather than only at discrete values. In one implementation, the magnitude of direct communicative coupling between two superconducting devices is adjustable over a range of zero to twice the magnitude of a mediated coupling by selectively trimming the superconducting traces and configuring the superconducting traces to follow a suitable circuitous path. In one implementation, a superconducting trace is selectively trimmed from a width of 2 μm to a width of 0.5 μm.

Figure 10B:
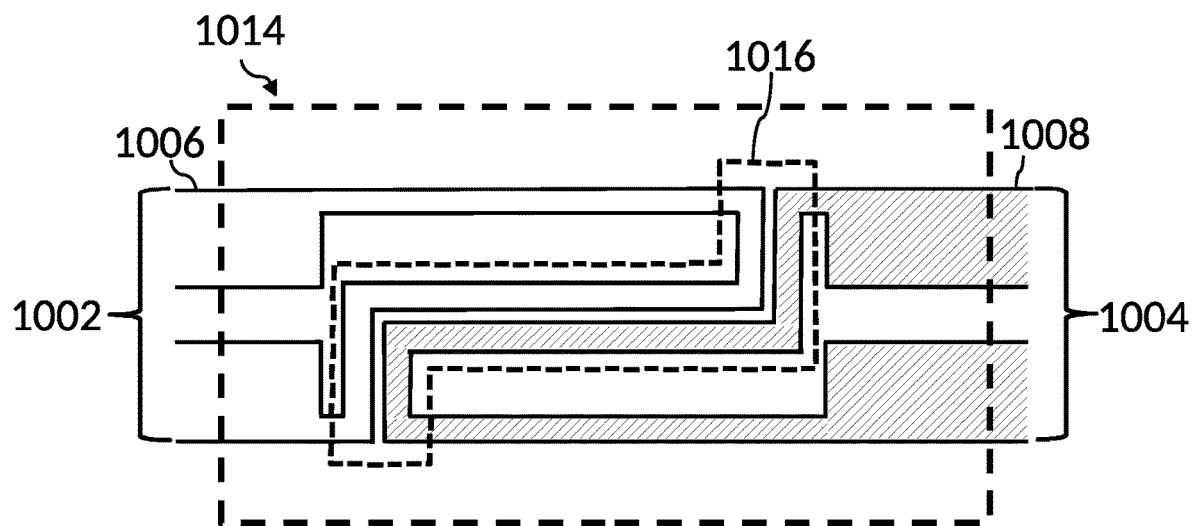

FIG. 10B is a schematic diagram of an example implementation of meeting region 1014 of layout 1000 of FIG. 10A, in accordance with the present systems and methods. Meeting region 1014 includes a region 1016 in which the superconducting traces of superconducting loops 1006 and 1008 each follow a respective circuitous path.

FIG. 11 is a schematic diagram of another exemplary layout 1100 of a pair of superconducting devices 1102 and 1104, directly communicatively coupled to each other, in accordance with the present systems and methods.

Superconducting devices 1102 and 1104 each include a respective superconducting loop 1106 and 1108. Superconducting loops 1102 and 1104 are arranged at least partially side-by-side. Superconducting loops 1106 and 1108 may each be interrupted by a respective Josephson junction 1110 and 1112. Superconducting devices 1102 and 1104 may be superconducting qubits (e.g., superconducting flux qubits).

Superconducting devices 1102 and 1104 may be communicatively coupled by a mediated coupling device, e.g., one of coupling devices 904 of FIG. 9.

At least portions of superconducting loops 1106 and 1108 of superconducting devices 1102 and 1104 of FIG. 11 are inductively proximate to each other in meeting region 1114. Superconducting devices 1102 and 1104 can be directly inductively communicatively coupled to each other in region 1110. For example, an excitation current flowing in superconducting loop 1106 can cause an induced current to flow in superconducting loop 1108.

At least some portions of superconducting loops 1106 and 1108 run parallel (or at least non-orthogonal) to each other in region 1110, and are sufficiently close that a current flow in a portion of superconducting loop 1106 directly induces a current flow in a portion of superconducting loop 1108.

Layout 1100 of FIG. 11 can be implemented with superconducting loops 1106 and 1108 fabricated in the same layer of a superconducting integrated circuit. The superconducting integrated circuit may be a multi-layer superconducting integrated circuit. In some implementations, the layers are fabricated using a superconducting metal and are separated by an insulating layer of a dielectric material. Superconducting loops 1106 and 1108 may comprise niobium, aluminum and/or another suitable superconducting material. The insulating layer may comprise silicon dioxide. Layout 1100 can alternatively be implemented with superconducting loops 1106 and 1008 fabricated in different layers of a multi-layer superconducting integrated circuit.

Superconducting loops 1106 and 1108 may be loops of superconducting wires. The loops of superconducting wires can include one or more superconducting traces. Fabrication of layout 1100 may include a method in which superconducting traces are trimmed to cause at least portions of the superconducting traces to be inductively proximate to each other. Region 1110 may include traces that have been deposited and/or trimmed to create a circuitous path for portions of superconducting loops 1106 and 1108 through region 1110.

Similarly to methods described above with reference to FIG. 10, a magnitude of a direct communicative coupling of superconducting devices 1102 and 1104 can be controlled, for example, by selective trimming and/or deposition of superconducting loops 1106 and 1108 during fabrication. Adjusting a width of the superconducting wires of superconducting loops 1106 and 1108 in region 1110 by the selective trimming can be achieved without incurring a space penalty on a superconducting circuit, for example. Selective trimming of the superconducting wires can provide an adjustable tuning of the magnitude of the direct communicative coupling of superconducting devices 1102 and 1104 over a continuous range, rather than only at discrete values. In one implementation, the magnitude of direct communicative coupling between two superconducting devices is adjustable over a range of zero to twice the magnitude of a mediated coupling by selectively trimming the superconducting wires and configuring the superconducting wires to follow a suitable circuitous path. In one implementation, a superconducting wire is selectively trimmed from a width of 2 µm to a width of 0.5 µm.

Figure 11A:
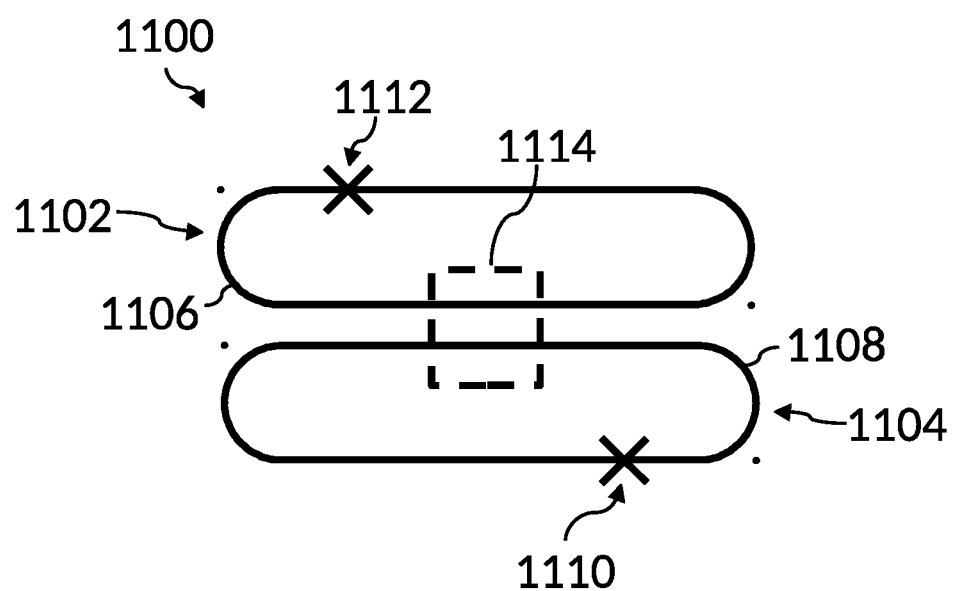
FIG. 11 is a schematic diagram of another exemplary layout of a pair of superconducting devices, directly communicatively coupled to each other, in accordance with the present systems and methods.
Figure 11B:
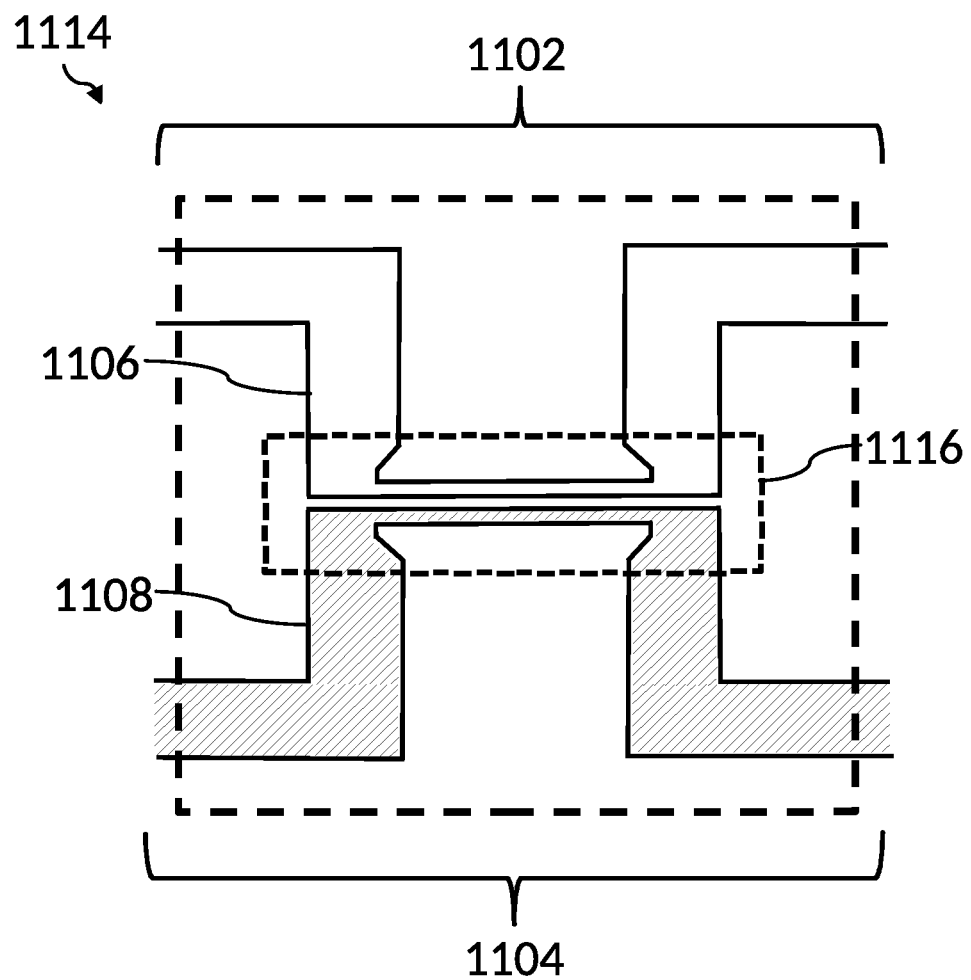

FIG. 11B is a schematic diagram of an example implementation of meeting region 1114 of layout 1100 of FIG. 11A, in accordance with the present systems and methods. Meeting region 1114 includes a region 1116 in which the superconducting traces of superconducting loops 1106 and 1108 each follow a respective circuitous path.

Figure 12:
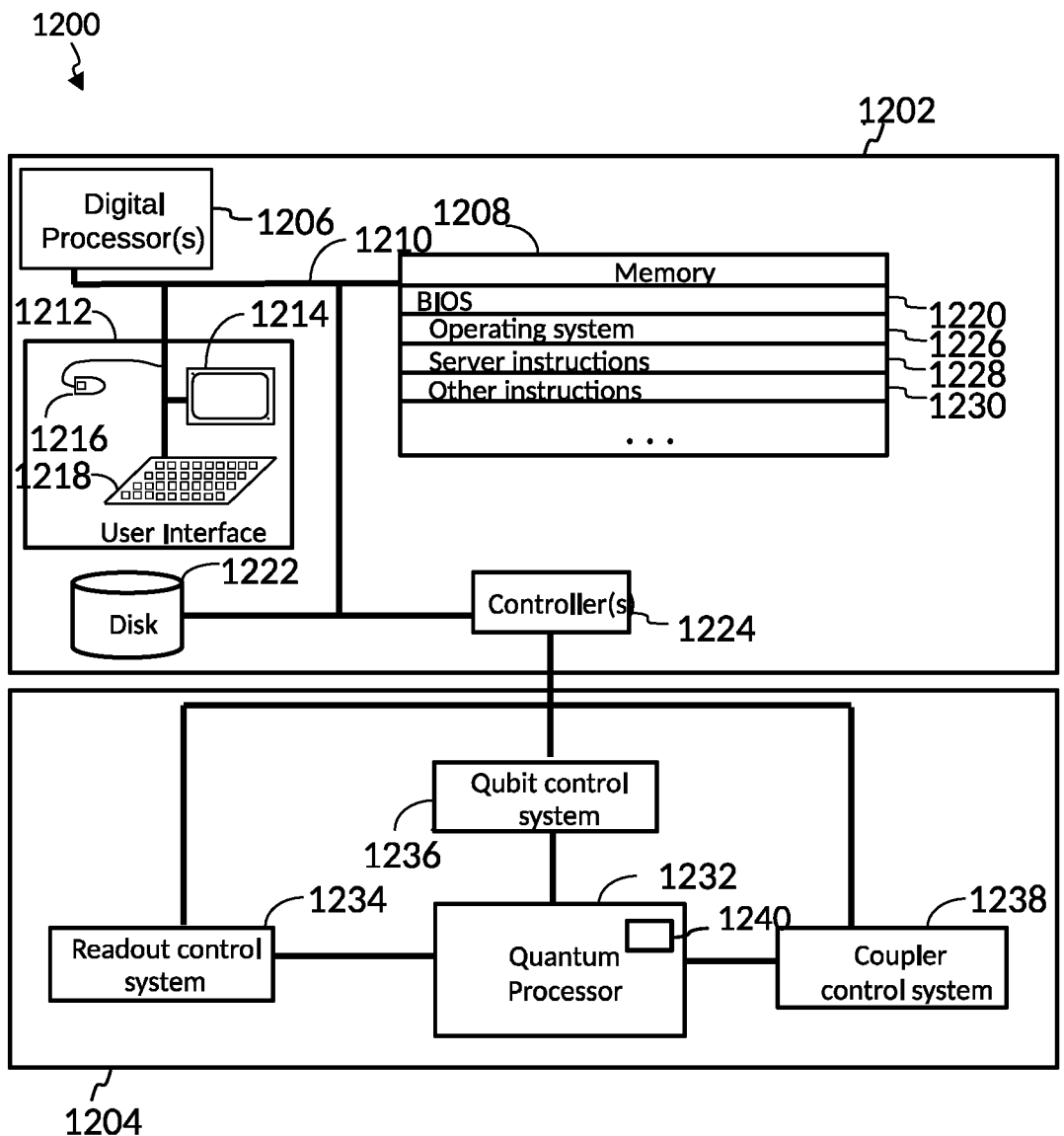
FIG. 12 is a schematic diagram of an example hybrid computing system including a digital computer coupled to an analog computer, in accordance with the present systems, devices, articles, and methods.

FIG. 12 illustrates an example hybrid computing system 1200 including a digital computer 1202 coupled to an analog computer 1204. In some implementations, the analog computer 1204 is a quantum computer and the digital computer 1202 is a classical computer.

The exemplary digital computer 1202 includes at least one digital processor 1206, and each digital processor 1206 may include one or more central processor units (not shown in FIG. 12). Only one digital processor 1206 is shown in FIG. 12. Digital processor(s) 1206 may be used to perform classical digital processing tasks described in the present systems and methods. In other implementations, digital computer 1202 can include more than one digital processor. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like, when properly configured or programmed to form special purpose machines, and/or when communicatively coupled to control an analog computer, for instance a quantum computer.

Digital computer 1202 will at times be referred to in the singular herein, but this is not intended to limit the application to a single digital computer. The present systems and methods can also be practiced in distributed computing environments, where tasks or sets of instructions are performed or executed by remote processing devices, which are linked through a communications network. In a distributed computing environment computer- or processor-readable instructions (also referred to in the present application as program modules), application programs and/or data, may be stored in both local and remote memory storage devices (e.g., non-transitory computer- or processor-readable media).

Digital computer 1202 may include at least one digital processor 1206, at least one system memory 1208, and at least one system bus 1210 that provides communicative coupling between various system components, for example between system memory 1208 and digital processor(s) 1206. System memory 1208 may include non-volatile memory, such as read-only memory ("ROM"), static random-access memory ("SRAM"), Flash NAND; and volatile memory such as random-access memory ("RAM") (not shown), all of which are examples of non-transitory computer- or processor-readable media. System bus 1210 can employ any known bus structures or architectures, including a memory bus with a memory controller, a peripheral bus, and a local bus.

Digital processor(s) 1206 may be any logic processing unit, for example with one or more cores, for instance one or more central processing units ("CPUs"), graphics processing units ("GPUs"), digital signal processors ("DSPs"), application-specific integrated circuits ("ASICs"), field-programmable gate arrays ("FPGAs"), etc.

Unless described otherwise, the construction and operation of the various blocks shown in FIG. 12 are of conventional design. As a result, such blocks need not be described in further detail herein, as they will be understood by those skilled in the relevant art.

Digital computer 1202 may include a user input/output subsystem 1212. In some implementations, the user input/output subsystem includes one or more user input/output components such as a display 1214, mouse 1216, and/or keyboard 1218.

A basic input/output system ("BIOS") 1220, which can form part of the ROM, contains basic routines that help transfer information between elements within digital computer 1202, such as during startup.

Digital computer 1202 may also include other non-volatile memory 1222. Non-volatile memory 1222 may take a variety of forms, including: a hard disk drive for reading from and writing to a hard disk, an optical disk drive for reading from and writing to removable optical disks, and/or a magnetic disk drive for reading from and writing to magnetic disks, all of which are examples of non-transitory computer- or processor-readable media. The optical disk can be a CD-ROM or DVD, while the magnetic disk can be a magnetic floppy disk or diskette. Non-volatile memory 1222 may communicate with digital processor via system bus 1210 and may include appropriate interfaces or controller(s) 1224 coupled to system bus 1210. Non-volatile memory 1222 may serve as long-term storage for computer- or processor-readable instructions, data structures, or other data (also called program modules) for digital computer 1202.

Although digital computer 1202 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc., all of which are further examples of non-transitory computer- or processor-readable media. Those skilled in the relevant art will appreciate that some computer architectures conflate volatile memory and non-volatile memory. For example, data in volatile memory can be cached to non-volatile memory. Or a solid-state disk that employs integrated circuits to provide non-volatile memory. Some computers place data traditionally stored on disk in memory. As well, some media that are traditionally regarded as volatile can have a non-volatile form, e.g., Non-Volatile Dual In-line Memory Module variation of Dual In-Line Memory Modules.

Various sets of computer-readable or processor-readable instructions (also referred to in the present application as program modules), application programs and/or data can be stored in system memory 1208. For example, system memory 1208 may store an operating system 1226, and a set of computer- or processor-readable server instructions (i.e., server modules) 1228. In some implementations, server module 1228 includes instructions for communicating with remote clients and scheduling use of resources including resources on the digital computer 1202 and analog computer 1204. For example, a Web server application and/or Web client or browser application for permitting digital computer 1202 to exchange data with sources via the Internet, corporate Intranets, or other networks, as well as with other server applications executing on server computers.

In some implementations, system memory 1208 may store other sets of computer-readable or processor-readable instructions 1230 such as calculation instructions, analog computer interface instructions and the like.

While shown in FIG. 12 as being stored in system memory 1208, server instructions 1228, other instructions 1230, and other data (not shown in FIG. 12) can also be stored elsewhere including in non-volatile memory 1222 or one or more other non-transitory computer-readable or processor-readable media.

Analog computer 1204 can be provided in an isolated environment (not shown in FIG. 12). For example, where analog computer 1204 is a quantum computer, the environment shields the internal elements of the quantum computer from heat, magnetic field, and the like, and other external noise (not shown in FIG. 12) and/or which cools the analog processor to temperatures (i.e., critical temperature) at or below which the circuitry of analog processor 1204 becomes superconductive. In contrast, the digital computer 1202 will typically operate at much higher temperatures (e.g., room temperature) at which superconductivity does not occur and/or may employ materials that are not superconductive even at or below the critical temperature. Analog computer 1204 includes an analog processor 1232. Examples of analog processor 1232 include quantum processors such as superconducting quantum processors.

A quantum processor includes programmable elements such as qubits, couplers, and other devices. The qubits can be read out via readout system 1234. The readouts can be fed to various sets of computer-readable or processor-readable instructions for digital computer 1202, including server module 1228, or other modules 1230 stored in non-volatile memory 1222, returned over a network or the like. The qubits can be controlled via qubit control system 1236. The couplers can be controlled via coupler control system 1238. In some implementations, qubit control system 1236 and coupler control system 1238 are used to implement quantum annealing on analog processor 1232, as described in the present application. In some implementations, quantum processor 1232 includes a superconducting integrated circuit 1240 that includes superconducting qubits with mediated and/or direct qubit-qubit coupling according to various of the implementations described above.

In some implementations, digital computer 1202 can operate in a networking environment using logical connections to at least one client computer system. In some implementations, digital computer 1202 is coupled via logical connections to at least one database system. These logical connections may be formed using any means of digital communication, for example, through a network, such as a local area network ("LAN") or a wide area network ("WAN") including, for example, the Internet. The networking environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computer 1202 may be connected to the LAN through an adapter or network interface card ("NIC") (communicatively linked to system bus 1210). When used in a WAN networking environment, digital computer 1202 may include an interface and modem (not shown), or a device such as NIC, for establishing communications over the WAN. Non-networked communications may additionally, or alternatively, be employed.

Figure 13A:
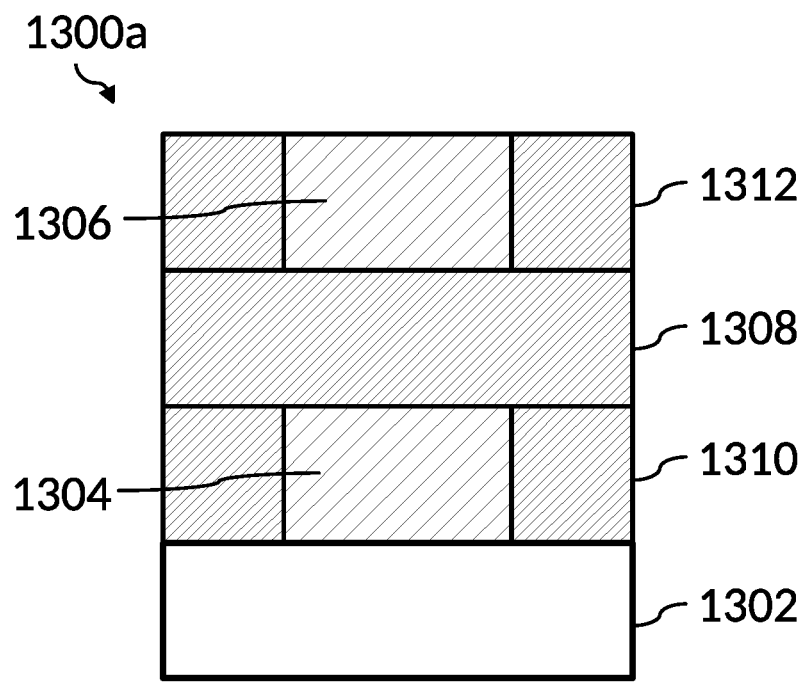
FIG. 13A is a cross section of a portion of a superconducting integrated circuit, in accordance with the present systems and methods.

FIG. 13A is a cross section of a portion of a superconducting integrated circuit 1300a, in accordance with the present systems and methods. Superconducting integrated circuit 1300a comprises a substrate 1302. Substrate 1302 may be a silicon substrate or a layer of dielectric material, for example. Superconducting integrated circuit 1300a further comprises a pair of superconducting traces 1304 and 1306, separated from each other by an intervening layer 1308, and where superconducting trace 1306 overlies superconducting trace 1304. Superconducting traces 1304 and 1306 may include or consist of a superconducting metal (e.g., niobium or aluminum). Superconducting traces 1304 and 1306 may be adjacent to layers of dielectric material 1310 and 1312, respectively. Intervening layer 1308 may be an insulating layer. The insulating layer include a layer of dielectric material or an air bridge. A thickness of intervening layer 1308 may be selected to cause superconducting traces 1304 and 1306 to be directly inductively communicatively coupled to each other.

Figure 13B:
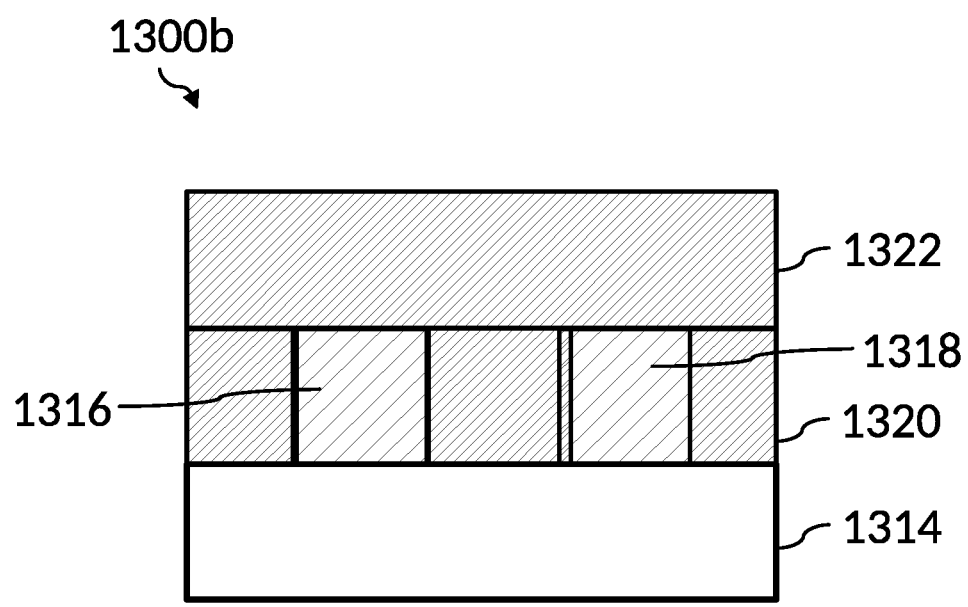
FIG. 13B is another cross section of a portion of a superconducting integrated circuit, in accordance with the present systems and methods.

FIG. 13B is another cross section of a portion of a superconducting integrated circuit 1300b, in accordance with the present systems and methods. Superconducting integrated circuit 1300b comprises a substrate 1314. Substrate 1314 may be a silicon substrate or a layer of dielectric material, for example. Superconducting integrated circuit 1300b further comprises a pair of neighboring superconducting traces 1316 and 1318, separated from each other by an intervening layer 1320. Superconducting traces 1316 and 1318 may include or consist of a superconducting metal (e.g., niobium or aluminum). Superconducting traces 1316 and 1318 may be adjacent to an overlying layer of dielectric material 1322. Intervening layer 1320 may be an insulating layer. The insulating layer include a layer of dielectric material or an air bridge. A separation of neighboring superconducting traces 1316 and 1318 by intervening layer 1320 may be selected to cause superconducting traces 1316 and 1318 to be directly inductively communicatively coupled to each other.

Superconducting traces 1304 and 1306 of FIG. 13A are overlying each other. Superconducting traces 1304 and 1306 are separated by intervening layer 1308. Superconducting traces 1304 and 1306 can be inductively proximate to each other, i.e., suitably oriented and sufficiently closely spaced that a current in superconducting trace 1304 can induce a current in superconducting trace 1306, and vice versa, regardless of the orientation of the superconducting integrated circuit. Superconducting traces 1316 and 1318 of FIG. 13B are neighboring each other. Superconducting traces 1316 and 1318 are separated by an intervening layer 1320. Superconducting traces can be inductively proximate to each other, i.e., suitably oriented and sufficiently closely spaced that a current in superconducting trace 1316 can induce a current in superconducting trace 1318, and vice versa, regardless of the orientation of the superconducting integrated circuit.

Figure 14A:
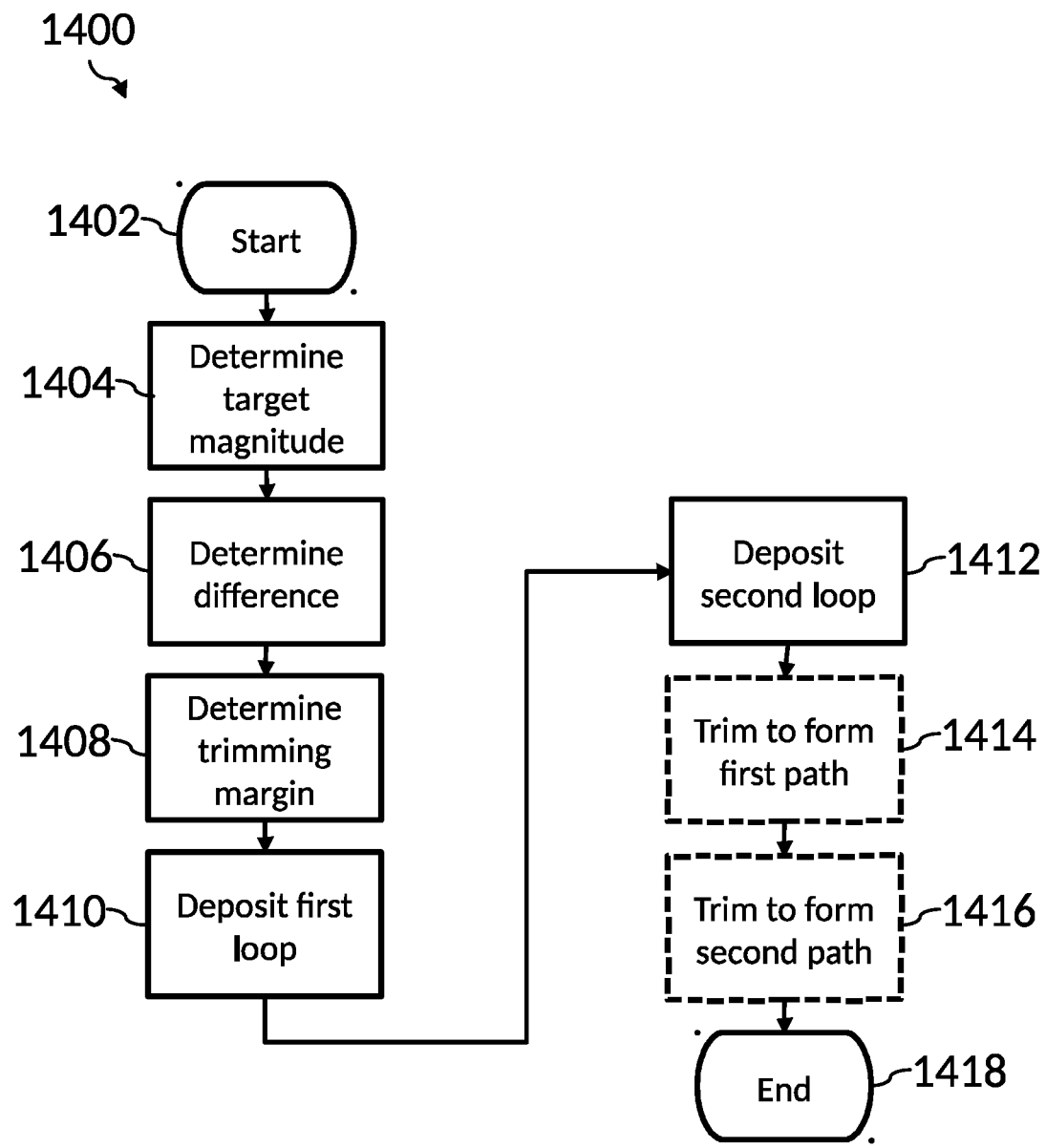
FIG. 14A is a flow chart of an example method for forming an integrated circuit, in accordance with the present systems and methods.

FIG. 14A is a flow chart of an example method 1400 for forming an integrated circuit, in accordance with the present systems and methods. Method 1400 includes acts 1402 to 1418, though those of skill in the art will appreciate that, in alternative implementations, certain acts may be omitted and/or additional acts may be added. Those of skill in the art will appreciate that the illustrated order of the acts is shown for exemplary purposes only and may change in alterative implementations.

At 1402, method 1400 is invoked. In some implementations, method 1400 is invoked when a fabrication system is ready to begin fabrication of an integrated circuit, or to continue fabrication of a partially-complete integrated circuit. At 1404, the system determines a target magnitude of the communicative coupling between a pair of devices (e.g., superconducting devices) on the integrated circuit. At 1406, the system determines a difference between a magnitude of mediated communicative coupling and the target magnitude. The mediated communicative coupling may be provided by a mediated coupling device, e.g., one of coupling devices 904 of FIG. 9.

At 1408, the system determines a trimming margin (also referred to in the present application as a trim) based at least in part on the difference between the magnitude of the mediated coupling and the target magnitude. The trim determined at 1408 is referred to as a determined trim with reference to FIG. 14B.

At 1410, the system deposits a first loop of material, e.g., superconducting metal, and, at 1412, the system deposits a second loop of material. In some implementations, the system deposits the first and the second loop of material to achieve the predetermined communicative coupling, including a narrowing of traces, and/or a circuitous path, in a crossing region or a meeting region, as described above. In other implementations, the system performs a trim etch to form a first path at 1414 and a second path at 1416.

At 1418, the method terminates.

Figure 14B:
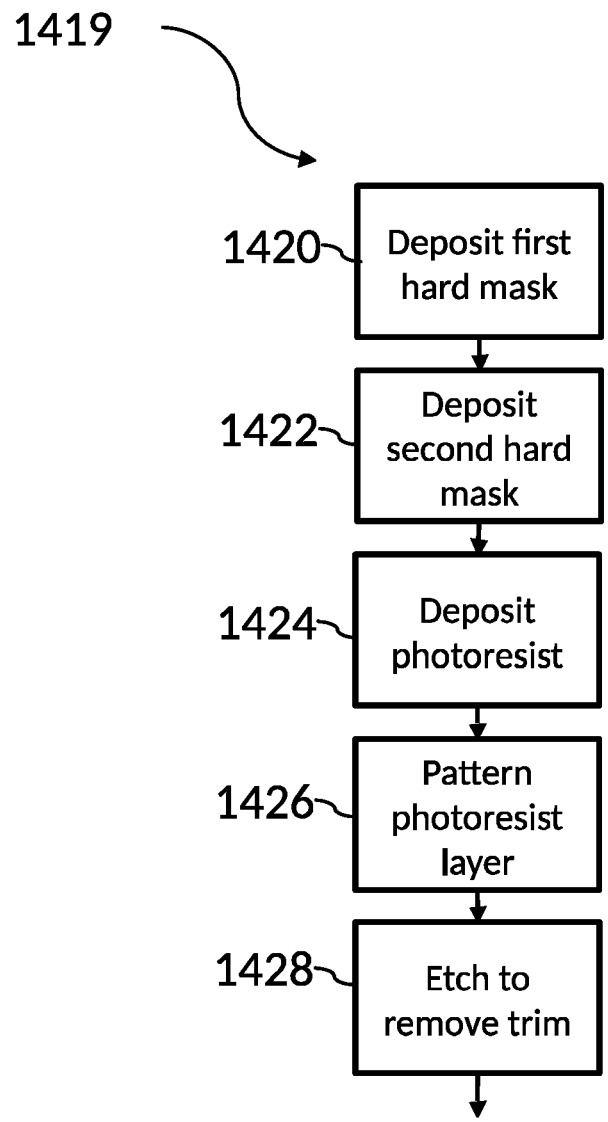
FIG. 14B is a flow chart of an example method for the trimming of the first path of FIG. 14A, in accordance with the present systems and methods.

FIG. 14B is a flow chart of an example method 1419 for the trimming of the first path 1414 of the method 1400 (FIG. 14A), in accordance with the present systems and methods. Method 1419 includes acts 1420 to 1428, though those of skill in the art will appreciate that, in alternative implementations, certain acts may be omitted and/or additional acts may be added. Those of skill in the art will appreciate that the illustrated order of the acts is shown for exemplary purposes only and may change in alterative implementations. A similar method can be used to perform a trim etch to form a second path at 1416 of method 1400 (FIG. 14A).

At 1420, the system deposits a first hard mask, and, at 1422, the system deposits a second hard mask. At 1424, the system deposits a photoresist layer, and patterns the photoresist layer at 1426. At 1428, the system performs an etch to remove material from the first path to achieve the predetermined trim and target magnitude.

While the example implementations of the present technology described above include a direct inductive communicative coupling between superconducting devices, other implementations include a direct galvanic communicative coupling between superconducting devices. The direct galvanic communicative coupling between superconducting devices may be instead, or in addition to, a direct inductive communicative coupling between the same superconducting devices. A direct galvanic communicative coupling between two superconducting devices may include a shared portion of a superconducting loop of one device with a superconducting loop of the other device. A direct galvanic communicative coupling may increase a coupling magnitude between superconducting devices. Other implementations include a capacitive coupling between superconducting devices, alone or in combination with a direct coupling in accordance with the present systems and methods, and/or a mediated coupling, and/or a combination of direct and mediated coupling in accordance with the present systems and methods. For a description of various coupling topologies, including galvanic coupling and capacitive coupling, see, for example, PCT Patent Application WO2019126396A1, "SYSTEMS AND METHODS FOR COUPLING QUBITS IN A QUANTUM PROCESSOR".

While the example implementations of the present technology described above include a direct communicative coupling between a pair of superconducting devices, other implementations include a direct communicative coupling between more than two superconducting devices. In general, a communicative coupling between two or more superconducting devices in accordance with the present technology may include a combination of inductive, galvanic, direct and mediated communicatively coupling. The layouts described above, and the selective trimming of superconducting traces to achieve a desired coupling magnitude may be adapted for use in various of these arrangements.

In some implementations, direct coupling between superconducting devices in a quantum processor is used in only a selected subset of superconducting devices in the quantum processor.

Advantages of the present technology may include the following:
- A layout implementation can be symmetric and compact, and the layout does not require additional twists in the qubit bodies (in contrast to other approaches).
- A magnitude of direct coupling can be controlled by a suitable choice of the width of trimmed metal pieces without paying a penalty in layout space. For example, continuous tuning of coupling magnitude from zero to twice that of a typical mediated coupling can be achieved. A trace can be trimmed from a width of 2 µm to a width of 0.5 µm, for example.
- The technology is expandable to more symmetric/multi-turn implementations.
- The technology is robust against fabrication misalignment and imperfections. One reason for robustness to fabrication errors (e.g., layer-to-layer misalignment) is the symmetric arrangement which provides at least a degree of protection of the magnitude of the direct coupling from fabrication errors. In one implementation, direct coupling is robust to an interlayer misalignment of up to 120 nm.

Throughout this specification and the appended claims, the term "ferromagnetic region" when used to describe, for example, the susceptibility of a coupling device is used to describe a range of flux biases that may be applied to a coupling device such that a pair of superconducting devices communicatively coupled by the coupling device are ferromagnetically coupled. Similarly, throughout this specification and the appended claims, the term "anti-ferromagnetic region" when used to describe, for example, the susceptibility of a coupling device is used to describe a range of flux biases that may be applied to a coupling device such that a pair of superconducting devices communicatively coupled by the coupling device are anti-ferromagnetically coupled.

Throughout this specification and the appended claims, the terms "coupler" and "coupling device" are used interchangeably. However, both "coupler" and "coupling device" are used to describe a coupling loop of superconducting material interrupted by at least one Josephson junction that may be used to ferromagnetically, or anti-ferromagnetically, couple a pair of superconducting devices together. Furthermore, throughout this specification and the appended claims, the phrase "a pair of communicatively-coupled superconducting devices" is used to describe a pair of superconducting devices that may be ferromagnetically, or anti-ferromagnetically, coupled together, by a direct coupling or by a coupling device.

Throughout this specification and the appended claims, the term "superconducting" when used to describe a physical structure such as a "loop of superconducting material" is used to indicate a material that is capable of behaving as a superconductor at an appropriate temperature. A superconducting material may not necessarily be acting as a superconductor at all times in all implementations of the present systems and methods.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other analog processors, not necessarily the exemplary quantum processors generally described above.

The various embodiments described above can be combined to provide further embodiments. All of the commonly assigned US patent application publications, U.S. patent applications, foreign patents, and foreign patent applications referred to in this specification and/or listed in the Application Data Sheet, including but not limited to U.S. Pat. No. 9,129,224, entitled "SYSTEMS AND METHODS FOR INCREASING THE ENERGY SCALE OF A QUANTUM PROCESSOR", issued Sep. 8, 2015; PCT Patent Application Publication No. WO2019/126396A1, entitled "SYSTEMS AND METHODS FOR COUPLING QUBITS IN A QUANTUM PROCESSOR"; and U.S. Patent Application No. 63/046,394, entitled "SYSTEMS AND METHODS FOR COUPLING BETWEEN QUBITS" are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A superconducting integrated circuit comprising:
a first superconducting device comprising a first superconducting loop, the first superconducting loop comprising a first superconducting trace in a first layer of the superconducting integrated circuit;
a second superconducting device comprising a second superconducting loop, the second superconducting loop comprising a second superconducting trace in a second layer of the superconducting integrated circuit, the second layer overlying and/or neighboring the first layer, the second layer separated from the first layer by an intervening layer; and
a crossing region in which the first superconducting loop crosses, in projection, the second superconducting loop, wherein at least a portion of the first superconducting trace inside the crossing region is narrower than at least a portion of the first superconducting trace outside the crossing region, at least a portion of the second superconducting trace inside the crossing region is narrower than at least a portion of the second superconducting trace outside the crossing region, the at least a portion of the first superconducting trace inside the crossing region follows a first circuitous path, the at least a portion of the second superconducting trace inside the crossing region follows a second circuitous path, and the first circuitous path and the second circuitous path are inductively proximate to each other for at least a portion of a length of the first circuitous path.

2. The superconducting integrated circuit of claim 1, wherein the first circuitous path and the second circuitous path at least partially overlie each other for at least a portion of a length of the first circuitous path.

3. The superconducting integrated circuit of claim 1, wherein the first superconducting loop crosses the second superconducting loop substantially perpendicularly.

4. The superconducting integrated circuit of claim 1, wherein each of the first superconducting trace and the second superconducting trace comprises a respective superconducting metal.

5. The superconducting integrated circuit of claim 4, wherein the respective superconducting metal includes a superconducting metal selected from the group consisting of niobium and aluminum.

6. The superconducting integrated circuit of claim 1, wherein the first superconducting device further comprises a first Josephson junction, the first Josephson junction interrupting the first superconducting loop, and the second superconducting device further comprises a second Josephson junction, the second Josephson junction interrupting the second superconducting loop.

7. The superconducting integrated circuit of claim 1, wherein the first superconducting device is a first superconducting flux qubit, and the second superconducting device is a second superconducting flux qubit.

8. The superconducting integrated circuit of claim 1, wherein the at least a portion of the first superconducting trace inside the crossing region includes four changes of direction.

9. The superconducting integrated circuit of claim 1, wherein a first shape of the first circuitous path is congruent with a second shape of the second circuitous path.

10. The superconducting integrated circuit of claim 1, wherein the intervening layer includes an insulating layer.

11. The superconducting integrated circuit of claim 10 wherein the insulating layer includes a dielectric material and/or an air bridge.

12. The superconducting integrated circuit of claim 11, wherein the dielectric material includes at least one of silicon dioxide or silicon nitride.

13. The superconducting integrated circuit of claim 1, further comprising a coupling device coupled to the first superconducting device and the second superconducting device and communicatively coupled to provide mediated coupling between the first superconducting device and the second superconducting device.

14. The superconducting integrated circuit of claim 1, wherein the at least a portion of the first superconducting trace inside the crossing region and the at least a portion of the second superconducting trace inside the crossing region each include one or more U-shaped profiles.

15. A superconducting integrated circuit comprising:
a first superconducting device comprising a first superconducting loop, the first superconducting loop comprising a first superconducting trace in a first layer of the superconducting integrated circuit;
a second superconducting device comprising a second superconducting loop, the second superconducting loop comprising a second superconducting trace in a second layer of the superconducting integrated circuit; and
a region in which a portion of the first superconducting loop overlaps a portion of the second superconducting loop, wherein at least a portion of the first superconducting trace within the region is narrower than at least a portion of the first superconducting trace outside the region, at least a portion of the second superconducting trace within the region is narrower than at least a portion of the second superconducting trace outside the region, the at least a portion of the first superconducting trace within the region follows a first path, the at least a portion of the second superconducting trace within the region follows a second path, and the first path and the second path are inductively proximate to each other for at least a portion of a length of the first path.

16. The superconducting integrated circuit of claim 15, wherein the first layer is a different layer from the second layer.

17. The superconducting integrated circuit of claim 15, wherein the first layer is separated from the second layer by an intervening layer.

18. The superconducting integrated circuit of claim 15, wherein the first path is a circuitous path.

19. The superconducting integrated circuit of claim 18, wherein the first path and the second path are congruent.

20. The superconducting integrated circuit of claim 15, wherein the first path and the second path at least partially overlie each other.

* * * * *